United States Patent [19]

Nomura et al.

[11] Patent Number: 5,828,375
[45] Date of Patent: Oct. 27, 1998

[54] INFORMATION PROCESSING UNIT FOR AUTOMATICALLY BUILDING WORK ENVIRONMENT FOR HOLDING INFORMATION NECESSARY TO REFLECT ACTIVITIES CARRIED OUT IN WORK ENVIRONMENT

[75] Inventors: Takahiko Nomura; Koichi Hayashi, both of Ashigarakami-gun, Japan

[73] Assignee: Fuji Xerox Co., Ltd., Tokyo, Japan

[21] Appl. No.: 856,088

[22] Filed: May 14, 1997

[30] Foreign Application Priority Data

May 17, 1996 [JP] Japan ..................................... 8-148366
Oct. 28, 1996 [JP] Japan ..................................... 8-302511

[51] Int. Cl.$^6$ ........................................................ G06F 3/14
[52] U.S. Cl. ............................ 345/339; 345/348; 345/352
[58] Field of Search .................................... 345/339, 348, 345/352

[56] References Cited

U.S. PATENT DOCUMENTS

| 4,813,013 | 3/1989 | Dunn ....................................... 345/333 |
| 4,885,704 | 12/1989 | Takagi et al. ............................ 345/166 |
| 5,159,669 | 10/1992 | Trigg et al. . | |

FOREIGN PATENT DOCUMENTS

| A 60-108975 | 6/1985 | Japan . |
| A 6-139117 | 5/1994 | Japan . |
| A 6-214989 | 8/1994 | Japan . |
| A 6-266662 | 9/1994 | Japan . |
| A 7-86820 | 9/1995 | Japan . |

*Primary Examiner*—Krisna Lim
*Attorney, Agent, or Firm*—Oliff & Berridge, PLC

[57] ABSTRACT

A work environment is expressed as an information unit set (Snap), a data object or the like to be used in the work environment is expressed as an information unit (Mediator), a plurality of information unit sets are collected into a Place and are stored in Places into an information unit set hold history storage part 3, and an information unit set to be used in a current work environment is held by an information unit set hold part 14. If a given condition such as the change of a work or the like is prepared, then the information unit set held by the information unit set hold part 14 is stored into the information unit set hold history storage part 3 by a storage instruct part 7, and selection information such as the name of a work and the like is applied to the thus stored information unit set. If a certain piece of selection information is input from a user in order that a certain information unit set can be selected and used in a current work environment, then an information unit set select part 4 uses the thus input select information to select an information unit set corresponding to the present select information from the information unit set hold history storage part 3, and the present information unit set is then read out into the information unit set hold part 14 by an information unit set read part 5.

37 Claims, 53 Drawing Sheets

FIG. 8

| USER id | user 2 |
|---|---|
| USER NAME | Aoki |
| PASSWORD | ****** |

FIG. 9

| WORK SPACE id | ws 1 |
|---|---|
| WORK SPACE NAME | Aoki HOME SPACE |
| CURRENT INFORMATION UNIT SET | set 1 |
| SELECTION INFORMATION LIST | list 1 |

FIG. 10

| JOB id | job 1 |
|---|---|
| JOB NAME | PATENT PREPARATION SPACE SET |
| PREPARATION DATE | 1995.5.12, 14:12 |
| USER | user 2 |

FIG. 11

| WORK SPACE id | ws 1 |
|---|---|
| JOB id | job 1 |

FIG. 12

| INFORMATION UNIT SET id | set 1 |
|---|---|
| BELONGING WORK SPACE | ws 1 |
| CREATION DATE/TIME | 1995.5.12, 14:12 |
| USER | user 2 |
| JOB | job 1 |
| INFLOW INFORMATION UNIT | unit 8 |

FIG. 13

| INFORMATION UNIT id | unit 5 |
|---|---|
| INFORMATION UNIT NAME | PATENT FORMAT |
| DATE/TIME | 1995.5.12, 15:20 |
| USER | user 2 |
| REFERENCE OBJECT | ~/doc/Pat-form |
| START APPLICATION | ~/bin/edit |
| COMMENT | IMPORTANCE = HIGH |
| ARRANGEMENT | {34,56} |

FIG. 14

| WORK SPACE id | ws 1 |
|---|---|
| INFORMATION UNIT SET id | unit 1 |

FIG. 15

| INFORMATION UNIT SET id | set 1 |
|---|---|
| INFORMATION UNIT id | unit 1 |

FIG. 16

| SELECTION INFORMATION id | SELECTION INFORMATION ATTRIBUTE |
|---|---|
| select 1 | JOB |
| select 2 | CREATOR |
| select 3 | INFLOW INFORMATION UNIT |
| select 4 | CREATION DATE/TIME |

FIG. 17

| | |
|---|---|
| SELECTION INFORMATION LIST id | list 1 |
| FIRST HIERARCHY SECTION INFORMATION id | select 1 |
| SECOND HIERARCHY SECTION INFORMATION id | select 3 |
| CREATION DATE/TIME | 1995.5.12, 14:12 |
| USER | user 2 |

FIG. 18

| NO. | OPERATION COMMAND |
|---|---|
| 1 | OpenWS |
| 2 | CloseWS |
| 3 | OpenWS |
| 4 | SelectJob |
| 5 | SwitchSet |
| 6 | DeleteUnit |
| 7 | CreateUnit |
| 8 | CreateJob |
| 9 | RemoveAllUnit |
| : | : |

FIG. 19

1. WHEN A NEW INFORMATION UNIT IS CREATED IN A NEWLY CREATED WORK SPACE,
   stuck(n-1)=="CreateWS" and stuck(n)=="CreateUnit";

2. WHEN A NEW INFORMATION UNIT IS CREATED AFTER ALL THE INFORMATION UNITS ARE ERASED,
   stuck(n-1)=="RemoveAllUnit" and stuck(n)=="CreateUnit";

3. WHEN AN INFORMATION UNIT IS CREATED AFTER A JOB IS SWITCHED,
   stuck(n-2)=="SelectJob" and stuck(n-1)=="SwitchSet" and stuck(n)=="CreateUnit"

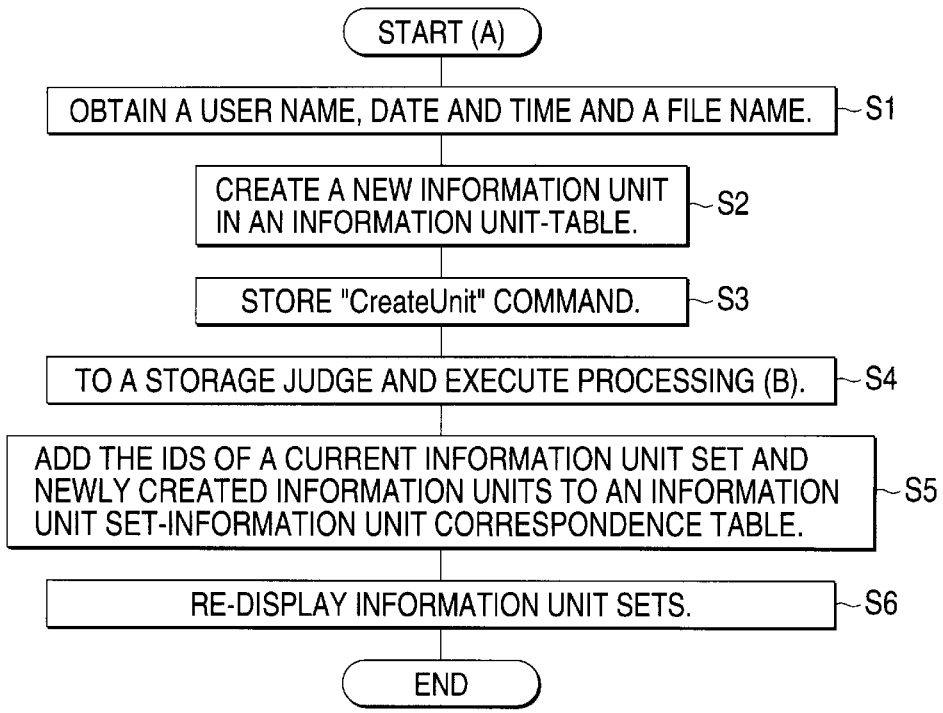

FIG. 40A
Table=Place

| placeID | int |
| --- | --- |
| createDate | abst ime |
| user | int |
| placeName | varchar (20) |
| listedSnaps | int[] |

FIG. 40B
Table=Snap

| snapID | int |
| --- | --- |
| createDate | abst ime |
| user | int |
| myJob | int |
| myPlace | int |
| mediators | int[] |

FIG. 40C
Table=Job

| jobID | int |
| --- | --- |
| createDate | abst ime |
| user | int |
| jobName | varchar (20) |

FIG. 40D
Table=Mediator

| mediatorID | int |
| --- | --- |
| createDate | abst ime |
| user | int |
| myName | varchar (50) |
| myLocation | varchar (100) |
| myMemo | varchar (400) |
| myMx | int |
| myMy | int |

FIG. 40E
Table=User

| userID | int |
| --- | --- |
| createDate | abst ime |
| userName | varchar (20) |
| password | varchar (10) |
| homePlace | int[] |

FIG. 40F
Table=IDMax

| place | int |
| --- | --- |
| snap | int |
| job | int |
| mediator | int |

INFORMATION PROCESSING UNIT FOR AUTOMATICALLY BUILDING WORK ENVIRONMENT FOR HOLDING INFORMATION NECESSARY TO REFLECT ACTIVITIES CARRIED OUT IN WORK ENVIRONMENT

BACKGROUND OF THE INVENTION

1. Field of the Invention

The present invention relates to an information processing unit which supplies a work environment (an information unit set) for holding an object (an information unit) such as a document that can be electronically accessed or the like to thereby support the execution of a work and, in particular, to an information processing unit which supplies a work environment for holding an object in connection with a plurality of works to be executed in parallel to each other.

2. Description of the Prior Art

At present, various office works can be done by means of management of files using information processing equipment such as a personal computer, a work station or the like. Resources to be handled by such information processing equipment, such as documents, electronic mails, application programs, input/out devices and the like are managed by a file system, a data base or the like. In such management, to previously arrange a set of necessary documents and a set of necessary tools in order according to works is effective in doing works smoothly. Conventionally, as a method for previously arranging the resources that can be handled by the information processing equipment in order, there are known a hierarchical directory method and a desktop method.

The hierarchical directory method is employed by a file system in an operating system such as UNIX, MS-DOS (a registered trademark). In this method, a user is able to hold necessary pieces of information in a unit called a directory and, further, a plurality of directories can be structured in a hierarchical structure. In the information processing equipment that employs the hierarchical directory, the user is able to draw up a directory in correspondence to a work and to store work-related resources in the directory.

However, in the above-mentioned conventional file system, the individual resources stored in the directory are shown to the user only by the list of file names. For this reason, it is difficult to understand by intuition what kinds of resources are used in the work.

In order to solve the above problem, an information management method called a desktop method has been developed in the Star (a trade name) by Xerox Co. The desktop method is a method which holds a personal work environment and supplies a two-dimensional plane for expressing a desktop as a metaphor. Work-associated resources are positioned on a two-dimensional plane as figures called icons corresponding to their respective kinds. Data on documents or the like, folders for collecting a plurality of documents, peripheral equipment such as a printer and the like, application programs, references, and the like are arranged as symbols which can be easily understood by the user by intuition. In addition to the above, tools such as a watch, a computer and the like as well as other resources can be arranged on the two-dimensional plane.

These icons can be arranged freely by the user at positions which are suitable for the operation of the user. Further, in the Star, in order to be able to refer to resources which are managed by a distributed file system called a file server, an icon called a reference can be drawn up and arranged on the two-dimensional plate. Depending on the function of the reference, another name can be given to a common resource according the need of the user.

In the beginning, the desktop was provided one to each person as a personal work environment but, after then, there has been developed a device which is arranged to prepare a plurality of two-dimensional planes for resource arrangement.

As a conventional technology of this type, there are known the technologies that are respectively used in Macintosh (a registered trademark) developed by Apple Computer, Inc. and in Rooms (a trade name) developed by Xerox Co.

In Macintosh (a registered trademark), this technology is applied to a file system using a hierarchical directory. That is, there are managed two-dimensional planes called folders which respectively correspond to individual directories and resources held by the directories can be positioned on the two-dimensional planes. And, if the folder is opened, then there can be further obtained the display of the two-dimensional plane.

Here, as a work area in which information to be given to a user according to the switching of one task to another, there is known a concept called a work space. Bannon et al. proposed, in "Evaluation and analysis of user's activity organization" (CHI'83), the first work space concept that, in an office, a plurality of works are executed at the same time and in order and, when returning back to a certain work, it is better that an environment in which this work was previously done is retained.

As a device which has realized the work space concept, for example, there is known Rooms (a trade name) which is developed by Xerox Co. (Japanese Patent Publication No. 7-86820 of Heisei).

In Rooms, it is possible to define a desktop called a room for each work, while the room not only collects together resources therein but also manages the states of execution of applications. Accordingly, while retaining the state of an application under execution in a room as it is, a user is allowed to move another room for execution of another work. Also, the user is able to make connections between works collected in a set, using two metaphors, namely, a door and an overview, and is able to move the rooms.

When a user uses a plurality of environments for execution of a plurality of work operations, or hands his or her works over to another person, the user must remember or understand the structures and natures of the works to be executed by the user in the such environments. In the above-mentioned hierarchical directory or desktop methods, it is possible to modify information inherent to resources such as the names, kinds and the like of the resources, positions of the resources on the two-dimensional plane, and a hierarchical structure with reference to other directories or desktops. That is, such modification can help the user in understanding the structures of the works. For example, the user can give the resources proper names and can position the closely-related resources adjacent to each other.

However, how to handle the resources in a given work or how the resources are connected with each other is not so simple that it can be expressed only by the positions and names of the resources or only by the hierarchical structures of the directories and folders. In the Rooms method, rooms can be made for the respective works, necessary resources can be arranged in the respective rooms, and the respective works can be done in their respective rooms. However, it is difficult to previously sort various pieces of information according to the works, and also it takes much time and labor to re-arrange the sorted information according to the progress of the works. For these reasons, the setting of the rooms is likely to be rough, which is out of keeping with the system of the works.

As a conventional technology to show a user the structure of information in works in a manner easy to understand, for example, there is known the invention that is disclosed in Japanese Patent Publication No. 60-108975 of Showa. According to this invention, if a given area of a rough sketch image is specified by the user, then computer resources such as another rough sketch image, a document and the like associated with the specified area are shown the user.

Also, in the present invention, a work space is expressed by two hierarchies consisting of a guide image and an element image. The element image holds one state of the work space for executing a work, while the guide image holds the meaning information of the element image and serves as a guide to switching the element image. Therefore, by selecting one of tags shown on the guide image, the display of the element image can be switched.

Also, the display of the guide image includes two modes, through which a common image and a personal image can be selected respectively. If the personal image is used, then there can be prepared a frame set which handles the common information from the viewpoint of a person.

However, the guide image must be previously set and it is difficult to build an information sorting system while executing a work. For this reason, the above-mentioned invention is effective when a consistent sorting system is used without departing from a preset work structure, but it is difficult to follow a work system which varies dynamically.

Also, in U.S. Pat. No. 5,159,669, AUTOMATICALLY CREATING A SECOND WORKSPACE OPERATION RECORD INCLUDING HISTORY DATA AND A UNIT ID BASED ON A FIRST WORKSPACE OPERATION", Trigg et al., there is proposed an invention which employs an approach to build a new work space by reusing the activity history of a certain work space.

In this invention, a card capable of holding a link with a plurality of cards is regarded as a work space, and there is generated a history work space for displaying a history list of a series of operations such as what kind of card is formed on a certain work space, what kind of change is made in the card, and the like. The portion of the list that expresses the name of the card serves as an anchor, and a card appearing on the operation history list holding the history workspace can be easily accessed. That is, all the work spaces (cards) associated with a series of operations are collected together and retained in a history work space.

However, according to this invention, although it is possible to retain the operation history, the retained history work space is quite different from a work space where a job can be done but it is an anchor which is used to retrieve information related to works previously done or to retrieve related work spaces.

As a conventional technology for retaining the progress states of a work, there are known the following technologies. However, in these technologies, a certain scene of a work in the past is retained and a programming is started again at the scene. That is, these technologies do not have a function to retain and reuse the environment of a work.

In particular, Windows 3.1 (a registered trademark) has a function to produce a dump of a desktop, as a sleep function. However, this function aims at retaining the current environment but is not able to hold the states of a plurality of works.

Also, Smalltalk-80 has a function to be able to retain the whole execution environment as a snapshot in accordance with an instruction by a user. However, this function aims at retaining a given state of a work by a snapshot, but it does cover the use of the thus retained state in another work. Therefore, Smalltalk-80 is designed such that a plurality of works are dealt with by another project and, in this respect, Smalltalk-80 is essentially the same as Rooms ("SMALLTALK-80-Interactive Programming Environment-" written by Adele Goldberg, translated into Japanese by Hideo Aiiso, published by Ohm Co.).

A debugger is a function which is able to retain the execution environment of a program in accordance with an instruction or with setting by a user. However, the debugger function aims at retaining the progress states of a plurality of modules and thus it is different in both object and structure from the invention which aims at storing the hold state of an object.

As a conventional technology to reuse the history information, there are known the following technologies. In these technologies, an operation is reused by use of the history, or information is retrieved by use of the history. That is, they treat the history only as a past state. For this reason, in these technologies, it is not possible that a state at a certain time in the past is restored and a new work is started at this state.

In particular, in a cooperative operation support device which is disclosed in Japanese Patent Publication No. 6-266662 of Heisei, the operation contents in the past can be reproduced accurately from the history of a cooperative operation and thus can be used for improvement in the efficiency of a cooperative operation to be carried out in the future. However, since the function of the present support device aims at only reproducing the operation contents, the states of the works in the past cannot be utilized in a work to be executed in the future.

Also, in a history device disclosed in Japanese Patent Publication No. 6-139117 of Heisei, by displaying a history of work operations simultaneously with a screen image for each of the operations, the selection of the history is facilitated. That is, when recording a history of work operations, a bit map image on the screen displayed at the then time was stored and, when displaying the history, the screen image is displayed at the same time. However, this can simply facilitate the remembering of the meaning of the operations carried out in the past, but the work cannot be started again from this state.

Further, in Japanese Patent Publication No. 6-214989 of Heisei, there is disclosed a document display method and a device for enforcing the same method which, in a hyper-text document, can facilitate the understanding of a history of the nodes referred to by a user and the routes of such reference. That is, a history of the movements between the nodes was stored, while symbols for representing the nodes and links are displayed in the order that document changes were made or the nodes are referred to; and, by moving and displaying a history mark in time series order to the history, the history can be shown. However, this can only display the history in time series order, but the work cannot be started again from the displayed state.

In order to be able to systematically hold in common and utilize various kinds of information which are stored in two or more different systems, it is important to understand such information accurately. For the accurate understanding of the information, it is absolutely essential to know the background information of the information that is stored in the systems, that is, the work and condition that the information was formed in. In order to know the background information of the information, it is necessary that the information is arranged in order from the viewpoint of works.

However, since the sorting and organization of the information vary dynamically with the progress of the works, in the above-mentioned conventional information processing units, it is difficult to sort and arrange the information in order and flexibly while advancing the works, in keeping up with the dynamic variations of the sorting and organization of the information.

In particular, in the above-mentioned conventional information processing units, there are found problems which are pointed out in the following articles (1) and (2):

(1) It is difficult to classify and arrange information in correspondence to works:

In order to manage various kinds of information which are related to different works, it is necessary to give meaning to the respective pieces of information from the viewpoint corresponding to the respective works. For this purpose, it is necessary that the respective pieces of information are classified and arranged in order in correspondence to the system of a work and are then managed systematically. Also, in order to support the parallel execution of a plurality of works, there must be prepared a plurality of environments which can supply the information that is arranged in order according to the works, the states of progress of the respective works must be held separately from each other, and it is necessary that the thus held works can be selected freely. Further, when leaving the sorting of a work being executed up to now and starting the work from a new point of view, it takes a great amount of labor to sort the work again.

(2) It is difficult to reuse know-how obtained through works:

In a work, there are available a lot of know-how; for example, this document is used in a certain work, the results of a certain work are to be sent to this person, a certain processing is performed in a certain work, and the like. Such kinds of know-how that can be standardized are provided in a manual so that they can be utilized in common. However, most of various kinds of know-how obtained through works are difficult to standardize and thus they are difficult to share in common. For this reason, conventionally, there is necessary a frame or a system which is able to reuse such know-how that is obtained through the execution process of the work.

SUMMARY OF THE INVENTION

The present invention aims at eliminating the above-mentioned drawbacks found in the conventional information processing units. Accordingly, it is an object of the invention to provide an information processing unit which reflects activities carried out in a work environment and automatically builds a work environment for holding information necessary for activities.

Also, it is another object of the invention to provide an information processing unit which not only builds the above work environment but also arranges information in order according to works.

Further, it is still another object of the invention to provide an information processing unit which not only builds the above work environment but also retains the progress states of works by the works.

Still further, it is yet another object of the invention to provide an information processing unit which, depending on works, restores a past state or takes out necessary information from the past state to thereby build the above work environment.

Yet further, it is a further object of the invention to provide an information processing unit which uses the above built work environment to thereby be able to start a new work.

In attaining the above object, according to the invention, there is provided an information processing unit in which the above-mentioned work environment is defined as an information unit set, a data object, an application object or the like which is used in the work environment is defined as an information unit, a plurality of information unit sets are stored in information unit set hold history storage means, and an information unit set to be operated is held in information unit set hold means.

And, if there is prepared a given condition such as change of a work, change of a user, addition or deletion of an information unit, or the like, then not only the information unit set held by the information unit set hold means is stored in the information unit set hold history storage means by storage instruction means, but also selection information apply means applies the name of a work, the name of a user, the name of an object, the date and time, and the like to the information unit set that is stored into the information unit set hold history storage means. Also, in order to specify a certain information unit set as a target to be operated, for example, when selection information is input from a user, using the selection information that is applied by the selection information apply means, selection means selects the corresponding information unit set out of the information unit sets that are stored in the information unit set hold history storage means, and the thus selected information unit set is read out by read means from the information unit set hold history storage means into the information unit set hold means.

Therefore, in the information processing unit according to the invention, by means of an operation in which the user collects the information necessary at the then time into a work space, even when the information is not classified previously, the information unit sets (work environments) can be stored and managed dynamically according to the progress conditions of works. And, since such information unit sets corresponding to the conditions of works in the past are held together with the selection information thereof, by reading out the corresponding information unit set in accordance with the selection information, the work can be started again after the work environment is returned back to the state of the work in the past, or the state of the work in the past can be restored so that the information necessary for the current work can be selected therefrom.

Also, in the information processing unit according to the invention, when the number of information units contained in the information unit set is changed, the information unit set before the number was changed is retained, which makes it possible to restore the information unit set at any time as it was before changed. For example, a time when the number of information units contained in the information unit set is changed from an increase to a decrease is defined as an end of a work, and the state of the information unit set before the work end can be restored at any time.

Further, the information processing unit according to the invention further has the following functions in order to enrich the above-mentioned functions:

(1) A function which not only holds the state of the scene of the current work but also stores time series the transition of the states of the scenes of the work in the past;

(2) a function which monitors various operations such as an increase or a decrease in the number of the information units in the work, and stores the state of the scene of the work at a timing previously defined in a rule;

(3) a function which shows the state transition using the select information that is given when the information unit set is stored;

(4) a function which, if a user specifies the select information according to the state transition shown to the user, then reads out the newest state of the scene of the work (information unit set) that satisfies this condition and makes it as the current scene state of the work;

(5) a function which specifies a work state and extracts the information that satisfies a given condition, from the information unit that is held in the thus specified work state; and, (6) a function which specifies a plurality of states of the scenes of the work, and computes a sum set, a common set, a difference and the like of the information units that are held by these work states to thereby create a new scene of the work.

In the information processing unit according to the invention, when a user carries out a plurality of works at the same time, while collecting various pieces of information necessary for the works, that is, while reflecting the natural action results, the necessary pieces of information are gradually sorted and arranged in order as the user advances the works. Therefore, even a user, who is not good at the information arrangement, is able to collect necessary objects sequentially into groups while advancing the works, with the result that the information can be sorted well. Now, let us compare the invention with Rooms. That is, according to Rooms, it is necessary to create the work environment before a work is started, whereas, according to the invention, even after the work is advanced, the work environment can be re-arranged from a different point of view.

Generally, the work system varies as the work is advanced. On the other hand, according to the invention, the state of the scene of the work is stored together with the select information necessary for the unit at a timing to be recognized as "the switching time of the work" while advancing the work. A user executes a work in such a manner that the user inputs the name of a work being currently executed, or, when starting another new work, the user selects the name of the new work. With the progress of the work, the information units that are present in the same work scene are gradually collected into groups so that they can be arranged in order according to the work.

Also, not only the state of the work is stored only at a time which the user recognizes as the switching time of the work, but also, the work state is automatically stored, for example, at a timing when the number of information units is increased or decreased in the work. Thanks to this, after the work is advanced, while branching out from the past transition of the work, a new work can be started. That is, after the works are done, it is possible to extract know-how from these works, such as meanings on the respective pieces of information stored unconsciously in the work (for example, a certain piece of information can be used in any work, a certain piece of information is peculiar to a certain work, which piece(s) of information is necessary for a certain related work, and the like), and to reuse the thus extracted meanings in the work that is executed in the future.

Further, according to the invention, "a certain scene" of a work is stored at any time at a timing which can be recognized as the switching time of the work together with the attribute thereof such as the kind of the work declared at the then time, the name of a user, a inflow resource which can be recognized as a trigger for the switching of the work, and the like. Due to this, if the work scenes are structured by the kinds of works, then there can be provided at least the same function as Rooms.

In addition, according to the invention, since the respective scenes of the works are retained in the form of "sets of information units", the information unit sets can be retrieved or a new information unit set can be created by executing a set operation.

For example, when two manuscripts are being written in separate work environments and the two manuscripts are integrated into one manuscript afterwards, if the sets of them are summed, then the respective pieces of information that are held by the two manuscripts are merged into a new manuscript. Also, when different manuscripts are being written in several work environments, if the common sets of the work environments are obtained, then there can be extracted a basic environment which is necessary to write a manuscript. Further, when information is filled in and overflows from a work environment where a manuscript on a certain theme is being written, if it is assumed that there exists another work environment where a report on the same theme is being written, then, by finding a difference between the two work environments, it is possible to know the information that is peculiar to the work environment for writing the manuscript on this theme.

The above and other objects and features of the present invention will be more apparent-from the following description taken in conjunction with the accompanying drawings.

BRIEF DESCRIPTION OF THE DRAWINGS

FIG. 8 is an explanatory view of an example of a data structure relating to a user;

FIG. 9 is an explanatory view of an example of a data structure relating to a work space;

FIG. 10 is an explanatory view of an example of a data structure relating to a job;

FIG. 11 is an explanatory view of an example of a data structure relating to correspondence between work spaces and jobs;

FIG. 12 is an explanatory view of an example of a data structure relating to an information unit set;

FIG. 13 is an explanatory view of an example of a data structure relating to an information unit;

FIG. 14 is an explanatory view of an example of a data structure relating to correspondence between work spaces and information unit sets;

FIG. 15 is an explanatory view of an example of a data structure relating to correspondence between information unit sets and information units;

FIG. 16 is an explanatory view of an example of a data structure relating to selection information;

FIG. 17 is an explanatory view of an example of a data structure relating to a selection information list;

FIG. 18 is an explanatory view of an example of a line of commands stored;

FIG. 19 is an explanatory view of an example of storage execution rules;

FIG. 20 is a flow chart of an example of a procedure for an information unit input processing;

FIGS. 40A, 40B, 40C, 40D, 40E and 40F are views to explain the schemata of a database;

DETAILED DESCRIPTION OF THE PREFERRED EMBODIMENTS

Now, description will be given below of the preferred embodiments of an information processing unit according to the invention with reference to the accompanying drawings.

Figure 1:
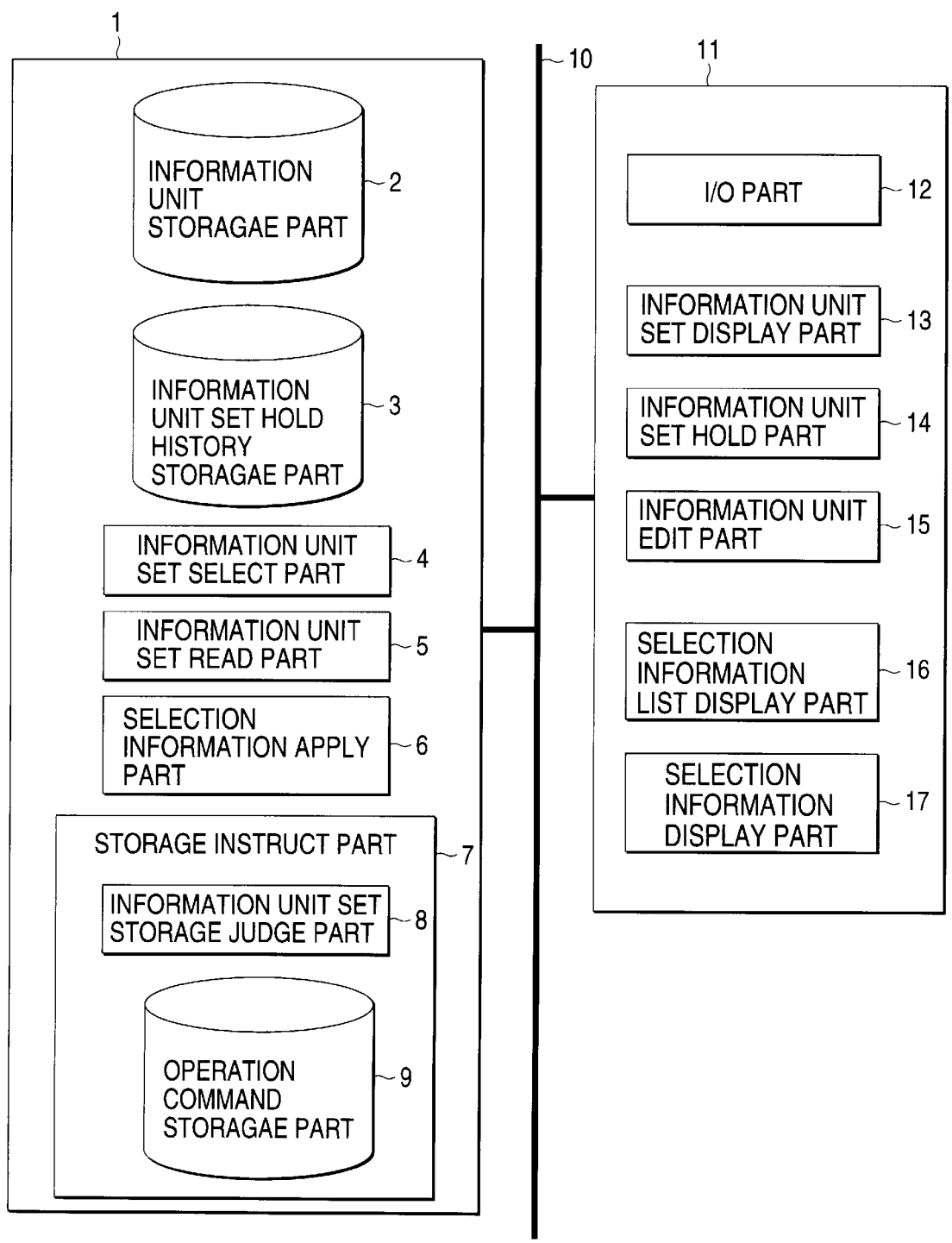
FIG. 1 is a structure view of a first embodiment of an information processing unit according to the invention.

Firstly, in FIG. 1, there is shown the structure of an information processing unit according to a first embodiment of the invention.

The present information processing unit is composed of a server 1 and a client 11 which are connected to each other through a network 10. Both of the server 1 and client 11 are composed of a workstation or a personal computer. In the present embodiment, although the information processing unit is structured such that it is composed of a client and a server, this is not limitative but, for example, an information processing unit may be structured in a computer without using a network.

In particular, the server 1 includes an information unit storage part 2, an information unit set hold history storage part 3, an information unit set select part 4, an information unit set read part 5, a selection information apply part 6, and a storage instruct part 7, while the storage instruct part 7 in turn includes an information unit set storage judge part 8 and an operation command storage part 9. Here, the server 1 manages the information that is used in common by a plurality of users (clients).

The information unit storage part 2 stores information units formed in the past in such a manner that they can be freely written in and read out. Here, the information unit is used to give reference objects their respective meanings in a work, while the information unit includes additive attributes such as pointers for the reference objects, comments on the reference objects, and the like.

The information unit set hold history storage part 3 holds a plurality of information unit sets together with selection information in such a manner that they can be freely written in and read out. And, in the present embodiment, the information unit storage part 2 and information unit set hold history storage part 3 are respectively composed of a relational database. Here, the information unit set is a work space which can hold the set of information units for reference to a document, an application and the like and also in which a plurality of information units can be positioned, for example, on a two-dimensional space (desktop metaphor) or in the form of a list.

And, the selection information apply part 6 applies the selection information such as the name of a job, the date and time of the job, the name of an implementor, the name of an information unit, and the like to the information unit set that is stored in the information unit set hold history storage part 3.

Now, the information unit set select part 4, in accordance with the select information, selects one of the information unit sets that are stored in the information unit set hold history storage part 3.

The information unit set read part 5 reads out one of the information unit sets stored in the information unit set hold history storage part 3 into the information unit set hold part 14 of the client 11.

The storage instruct part 7 is composed of the information unit set storage judge part 8 and operation command storage part 9 and is used to give an instruction to the effect that the information unit set is stored in the information unit set hold history storage part 3.

The information unit set storage judge part 8 judges whether the storage of the information unit set is executed or not, while the operation command storage part 9 stores therein the instruction contents of operations performed by a user.

That is, the information unit set storage judge part 8 monitors the operations performed by the user and, each time an instruction such as the creation or deletion of the information unit, the switching of the information unit set, or the like is given, stores the operation command into the operation command storage part 9; and, further, by previously checking the timing of storage of the information unit set against a preset storage execution rule, judges whether the storage of the information unit set is executed or not, and gives a storage execution instruction to the information unit set hold history storage part 3. For example, the storage execution instruction is given at a timing when the number of information units held by the information unit set increases or decreases.

Now, the client 11 includes, an input/output part 12, an information unit set display part 13, an information unit set hold part 14, an information unit edit part 15, a selection information list display part 16, and a select information instruct part 17. By the way, the client 11 is means through which a user does work, and the client 11 is realized by software on a workstation or a personal computer.

The input/output part 12 is composed of an input/output device including a display, a keyboard, a mouse and the like. In the input/output part 12, there are carried out standard input/output control operations such as the display of a window used in common in various applications, keyboard input, icon operations using a cursor, button operations, and the like.

The information unit set display part 13 outputs or displays the information unit set held by the information unit set hold part 14 onto a display screen to thereby show it to a user.

The information unit set hold part 14 holds an information unit set used as an environment in which a user is currently working in such a manner that the information unit set can be written in and read out freely.

And, the information unit edit part 15, in accordance with a user's instruction input from the input/output part 12, changes the arrangement of the information unit held by the information unit set hold part 14, copies an information unit into another information unit set stored by the information unit set hold history storage part 3, stores the information unit set held by the information unit set hold part 14 into the information unit set hold history storage part 3, and adds a comment to an information unit.

The selection information list display part 16 outputs to and displays on a display screen a job name given to the information unit set stored in the information unit set hold history storage part 3, or the selection information such as the date and time, the name of a creator, the name of the information unit, and the like. Here, a user can select the format of the select information to be displayed as a list by inputting an instruction through the input/output part 12.

And, the selection information instruct part 17 instructs a condition for reading out the information unit set held by the information unit hold part 14 from the selection information displayed by the selection information list display part 16. Here, the user is able to instruct the condition for the selection information through the input/output part 12.

That is, in the above-structured information processing unit, if the user instructs the selection information displayed by the selection information list display part 16 of the client 11 through the selection information instruct part 17, then the server 1 correspondingly retrieves the information unit set that satisfies all the selection information specified out of the information unit sets stored in the information unit set hold history storage part 3. And, the read part 5 reads out the information unit set having the latest implementation data and time from the information unit sets that satisfy all the selection information, into the information unit set hold part 14 of the client 11, so that the information unit set hold part 14 of the client 11 can hold the information unit set. Also, the information unit set display part 13 outputs and displays the information unit set that is held by the information unit set hold part 14.

Here, let us define the concepts of the terms "work space", "information unit", "information unit set", and "job" which are necessary for explanation of the operation principles of the invention.

The concept of the work space expresses a space in which a user can work. The work space includes not only a current information unit set for holding the current state of a scene of a work being currently executed by a user but also an information unit set for holding the past state of the scene of the same work. The work in the work space can be executed by updating the current information unit set, while the past work can be carried out continuously by making the current information unit set out of the past information unit set. The user may produce a plurality of work spaces according to the kinds of works, or produce a work space for carrying out all the works.

The information unit is a unit for referring to objects such as information, documents, applications necessary for a work and defining their correspondences to meaning defining information in the work. As the information that gives meanings to the objects of a work in the information unit, there are available pointers to the objects, comments given by the users, the arrangements of the objects on a work space, and the like.

The information unit set expresses the state of a work space at a certain time and is a set of information units. The set of information units held by the information unit set increases or decreases as the work progresses. That is, the information unit set expresses an work environment which is shown to a user at a certain time. The work space stores therein a plurality of information unit sets as a history of a work and manages them in such a manner that they can be restored as a current information unit. Storage of the information unit set is carried out with the change of state of the work as a trigger, for example, when the information units held by the information unit set increases or decreases in number. If a certain piece of selection information is instructed by a user, then one information unit set which satisfies the selection condition of the instructed selection information is retrieved from the information unit sets stored, and this is regarded as a current information unit set. Accordingly, the user can continue the work in an environment which is read out in this manner.

The job is a concept which represents a logical set of a work to be done in a work space. The job is a set of all the information unit sets that belong to the same work. If a user declares the name of a job, then information unit sets to be stored after the declaration are related to the job. On the other hand, if a job is specified as a selection condition, then the latest information unit set belonging to the job can be read out as a current information unit set. That is, the job name functions as an index for switching of a work.

Figure 2:
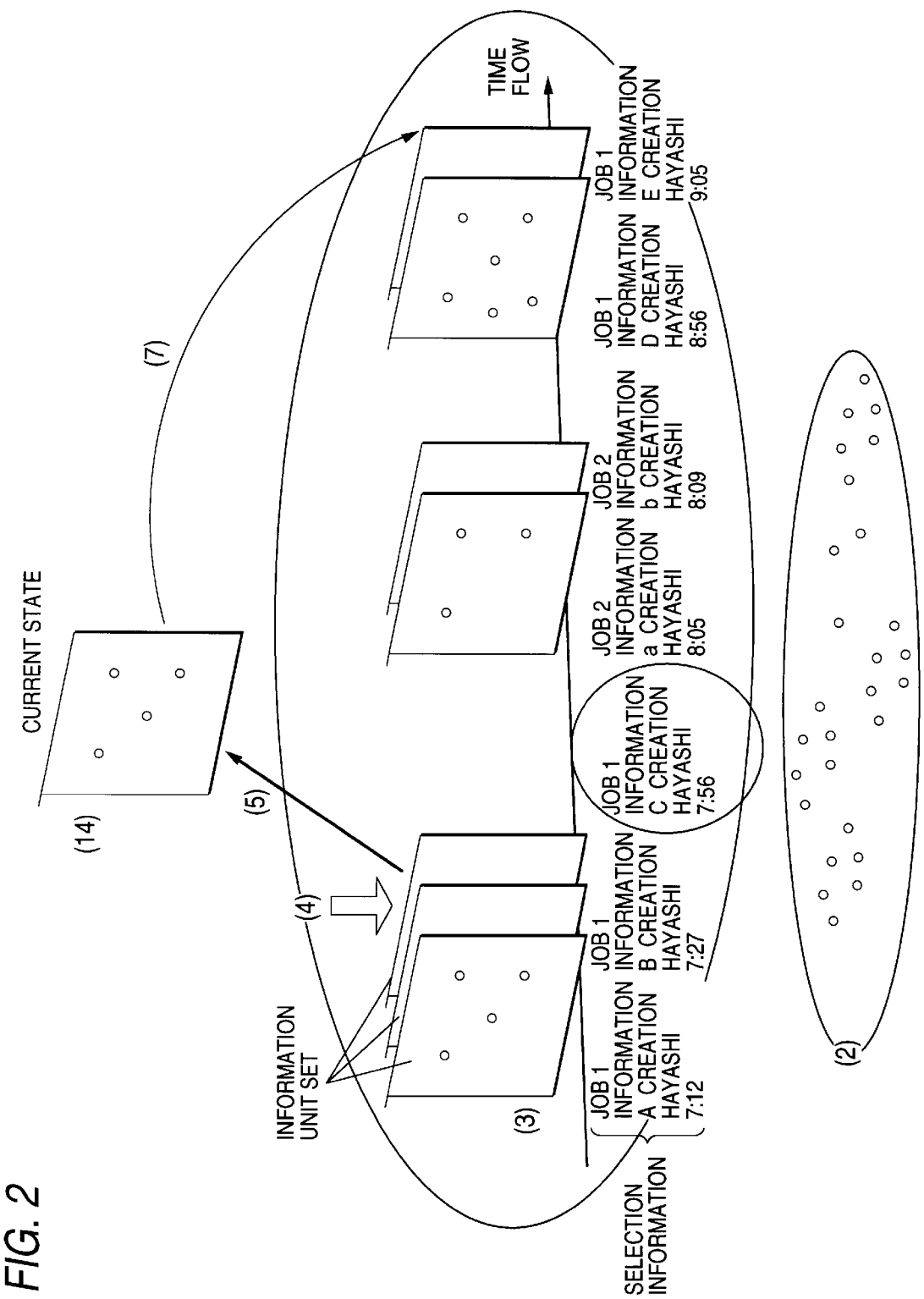
FIG. 2 is a conceptual view to explain a relationship between information unit sets and selection information.

Now, in FIG. 2, there is shown an outline of a management model relating to the transition of the states of the scenes of a work using a work space according to the present embodiment.

The information unit set hold part 14 holds the state of a work space being currently displayed to a user, that is, a current information unit set. For example, the current information unit set is held on the memory of the client. The information unit set hold history storage part 3 stores a necessary information unit set at any time in order to be able to restore an arbitrary state of the work space variable with the progress of the work of the user, that is, a past information unit set. The storage instruct part 7, triggered by an increase or a decrease in the information units of an information unit set held by the information unit set hold part 14, instructs the storage of the information unit set into the information unit set hold history storage part 3.

If the selection instruction such as a job name, an information unit name, a user's name, date and time and the like is instructed, then the information unit set select part 4 selects the information unit set that is stored in the information unit set hold history storage part 3, and the read out part 5 restores the selected information unit set, that is, this information unit set is read out to the information unit set hold part 14 as a current information unit set.

As mentioned above, the present information processing unit has a function to give selection information to the state of a work space at a certain time (information unit set), and a function to call out and restore this state and thereby provide an environment for starting the work again. Thanks to these functions, a user can execute a plurality of works while switching the states of the work space.

Also, according to the invention, by collecting various pieces of information necessary for a certain work to an information unit set having a specific job name, a user can execute the work. That is, even if various pieces of necessary information are not classified prior to the start of the work, by giving job names to the sets of information units necessary for the work, the user can gradually arrange the information units in order from the viewpoint of the work.

Further, the user can declare a job at an arbitrary timing during the operation on the work space. The declaration of the job is executed by the user operating a menu or a button, which urges the input of a job name. If the user inputs the job name, then a new job can be generated. On declaration of the job, the information unit set hold history storage part 3 gives the job name as the selection information of the current information unit set.

And, if the user specifies a job by means of the selection information instruct part 17, then the system calls up the newest information unit set having a desired job name. And, the current information unit set of the work space is rewritten to the called-up information unit set and is then displayed, so that the user can start again a work corresponding to the job. As a result of this, while switching the information unit sets displayed on the work space, the user can execute a plurality of works at the same time under the same work environment. In other words, even if the rooms are not previously defined for the respective works as in the above-mentioned Rooms, by giving job names to the information unit sets and switching them during execution of the respective works, there can be achieved the effect of movement to a work environment corresponding to the works.

Figure 3:
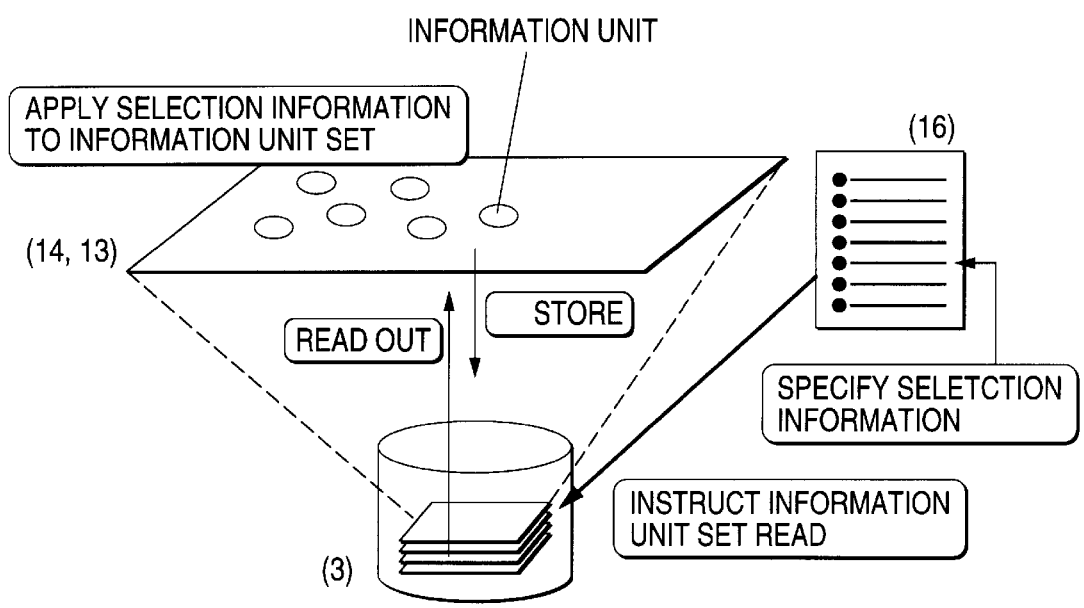
FIG. 3 is a conceptual view to explain how the information unit sets are stored into and read out from information unit set hold history storage means.

Now, in FIG. 3, there is shown an outline of the flow of data and processings when the information unit sets are stored into or read out from the information unit set hold history storage part 3.

In particular, if a user instructs one of various pieces of selection information that are displayed on the selection information list display part 16, then the selection information such as a job name and the like that has been used so far is given to the current information unit set, and the current information unit set is stored into the information unit set hold history storage part 3. After then, the information unit set that is selected by the instructed selection information is taken out onto the work space, and the present information unit set is recognized as the current information unit set and is displayed on the information unit set display part 13, so that the work can be started again at the then time.

Figure 4:
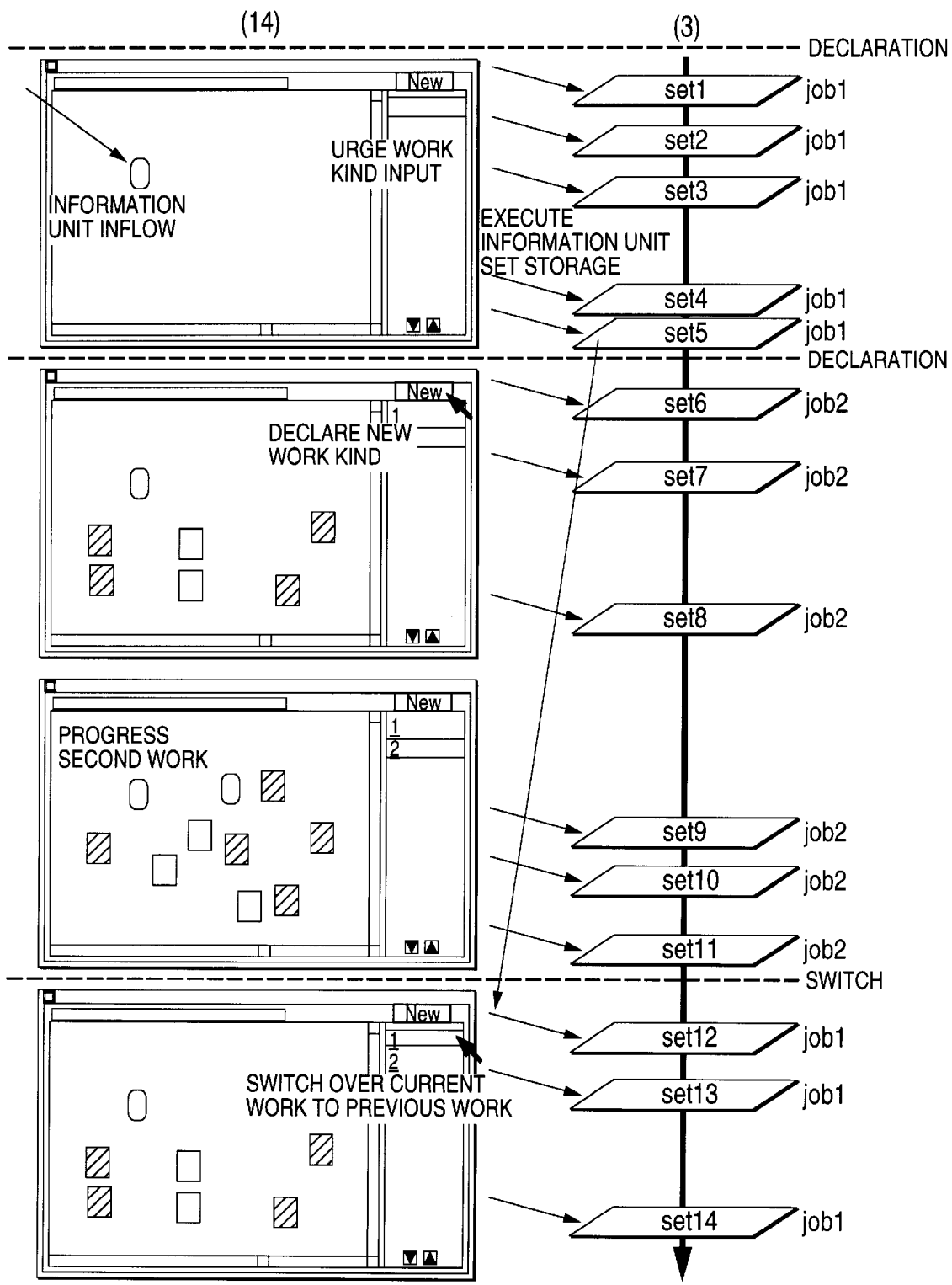
FIG. 4 is a conceptual view to explain how to declare the kind of a work and how to switch the work.

Now, in FIG. 4, there are shown time series relationships between operations to be performed on a work space and the information unit sets that are stored by the operations.

At first, if a new work space is created, since no expression has been given yet as to what work is being done there, just after a new information unit is input (that is, a work is started), a user is urged to input the kind of the work (the name of the job). And, if it is assumed that a job name "job1" is input, then the selection information "job1" is given to the information unit sets that are stored next and following times. After then, if a new information unit is input, then the then information unit set is stored. In FIG. 4, the information unit set that is stored in the information unit set hold history storage part 3 is expressed as "set1".

After then, until the next job name is declared or another job is selected, a job name "job1" is given all the information unit sets that are stored as the results of the operations performed after the above information unit set "set1" is stored. In the illustrated example, until a new job is declared, four information unit sets ("set2", "set3", "set4", and "set5") are stored, so that a total of five information unit sets are stored under the job name "job1".

And, at a time when the user interrupts the work "job1" which the user has been doing so far and starts a new job "job2" (that is, a job name "job2" is expressed), the then state of the work is stored and, further, the job name of the information unit sets that are stored after then is changed.

By the way, if the resumption of the work "job1" is instructed again, then the newest one of the information unit sets having the job name "job1" is retrieved, and the thus retrieved information unit set recognized as the current information unit set of the work space and is then displayed on the information unit set display part 13, thereby enabling the user to start the work again. Of course, the information unit sets that are stored after then are respectively given the job name "job1" when they are stored.

Figure 5:
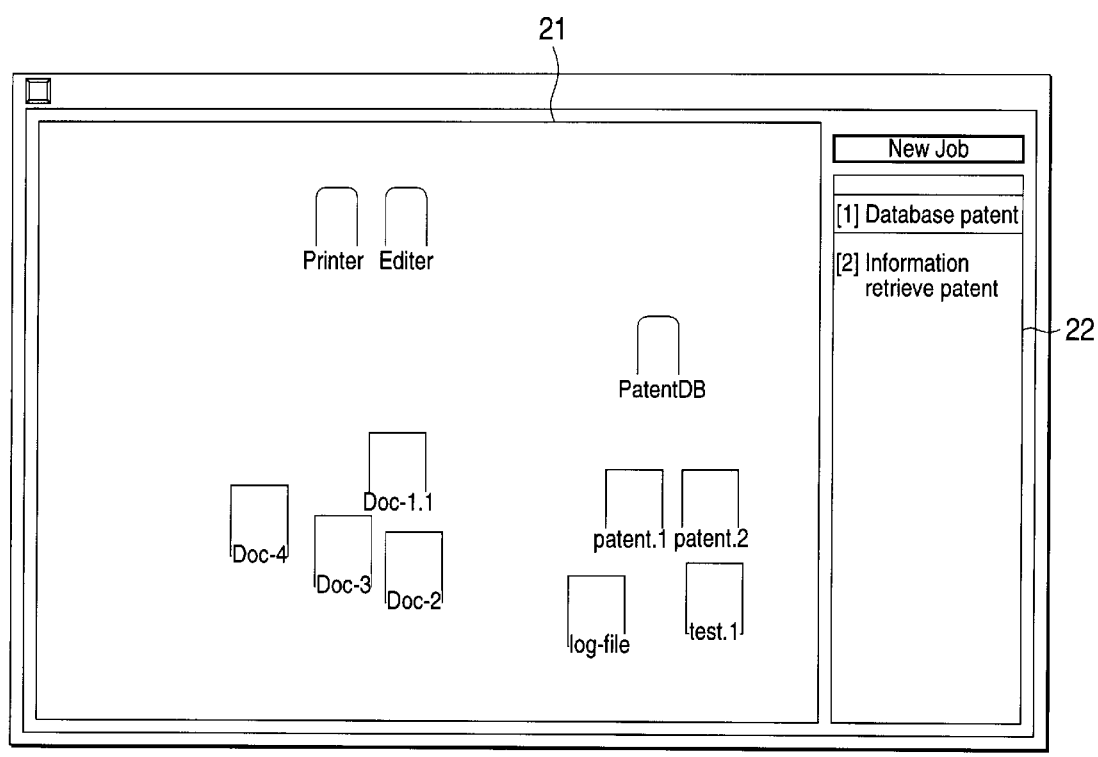
FIG. 5 is a view of an example of a display of a list of information unit sets and selection information.

Now, in FIG. 5, there is shown an example of a display to be made on a display screen.

In this display example, there are formed an information unit set display area 21 in which information units can be arranged, and a selection information list display area 22 for displaying and selecting a job. In the information unit set display area 21, the information units such as "Printer", "Doc-4", "Patent DB" and he like are arranged on a two-dimensional plane. By instructing the various information units using a pointing device such as a mouse or the like, the user can raise an object to be referred to, edit additive attributes for the information unit, and change the arrangement of the information unit.

The selection information list display area 22 is an area which is used to display selection information such as a job name for selecting necessary information unit sets, the name of a user and the like. As the selection information, a declared job, a user in charge when the information unit sets are stored, the data and time when the information unit sets are stored, an object generated just before the information unit sets are stored, and the like. In the example shown in FIG. 5, the selection information list display area 22 is set such that job names such as "Database Patent", "Information Retrieval Patent" and the like can be displayed as the selection information.

In order to know what work is related to the information unit sets displayed in the current information unit set display area 21, the selection information instructed by the user is displayed invertedly within the selection information list display area 22. By selecting the job name of the selection information list display area 22, the information unit set that is shown in the information unit set display area 21 can be switched. Due to this, while instructing a job to thereby switch the information unit set, the user can execute a plurality of works at the same time.

Figure 6:
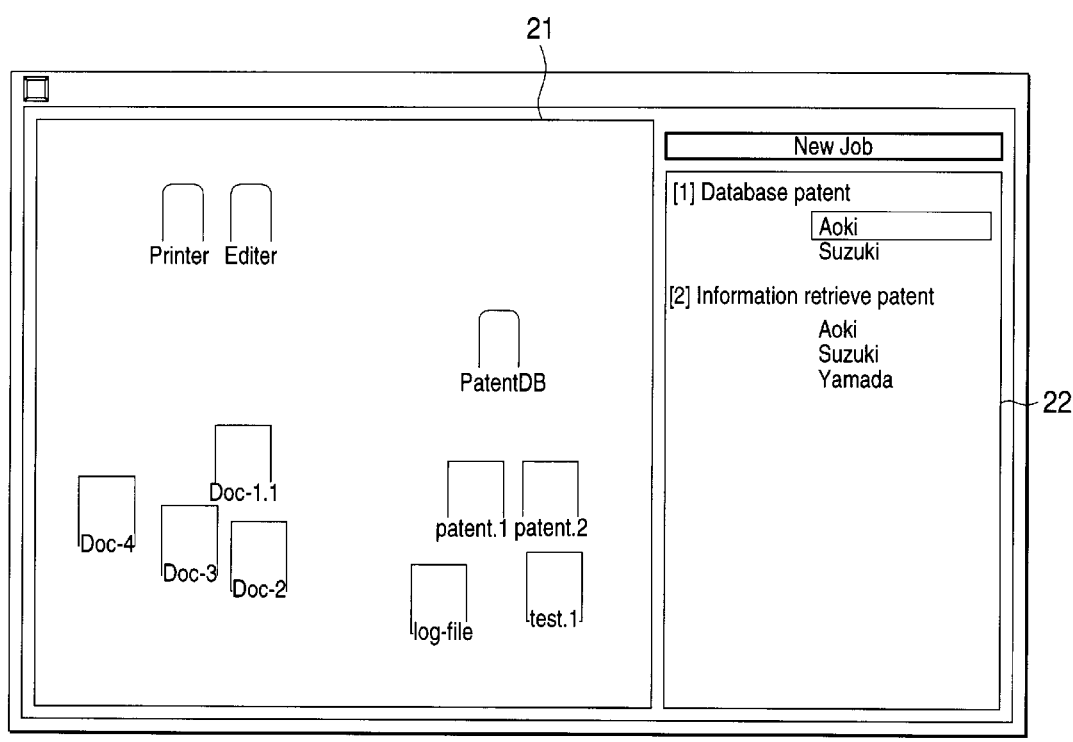
FIG. 6 is a view of another example of a display of a list of information unit sets and selection information.

Also, the selection information that is given to the information unit set includes, in addition to the job name, the name of a user in charge when the information unit set is stored, the name of an information unit input, and the like. For example, in FIG. 6, there is shown a display example in which the information unit set is structured by the job names and the names of users.

A job "Database Patent" tells that two users "Aoki" and "Suzuki" execute the work, while a job "Information Retrieval Patent" shows that another user "Yamada" also participates in executing the work. As in FIG. 6, by specifying "Aoki" of the job "Database Patent" in this list, the job "Database Patent" calls up the newest information unit set of the implementor "Aoki". This is to call up the newest state in which Aoki is executing a work "Database Patent", that is, by specifying his or her name all the time, Aoki is able to execute the work without being influenced by the operation to be executed by Suzuki.

Of course, by specifying "Suzuki", Suzuki also can call up the newest state in which Suzuki is executing the work and can know easily the current progress of the work being executed by Aoki. Also, when it is desired to know the newest state of the work regardless of users, if the job name "Database Patent" is specified, then the newest information unit set of the Database Patent can also be called up regardless of the names of users.

Figure 7:
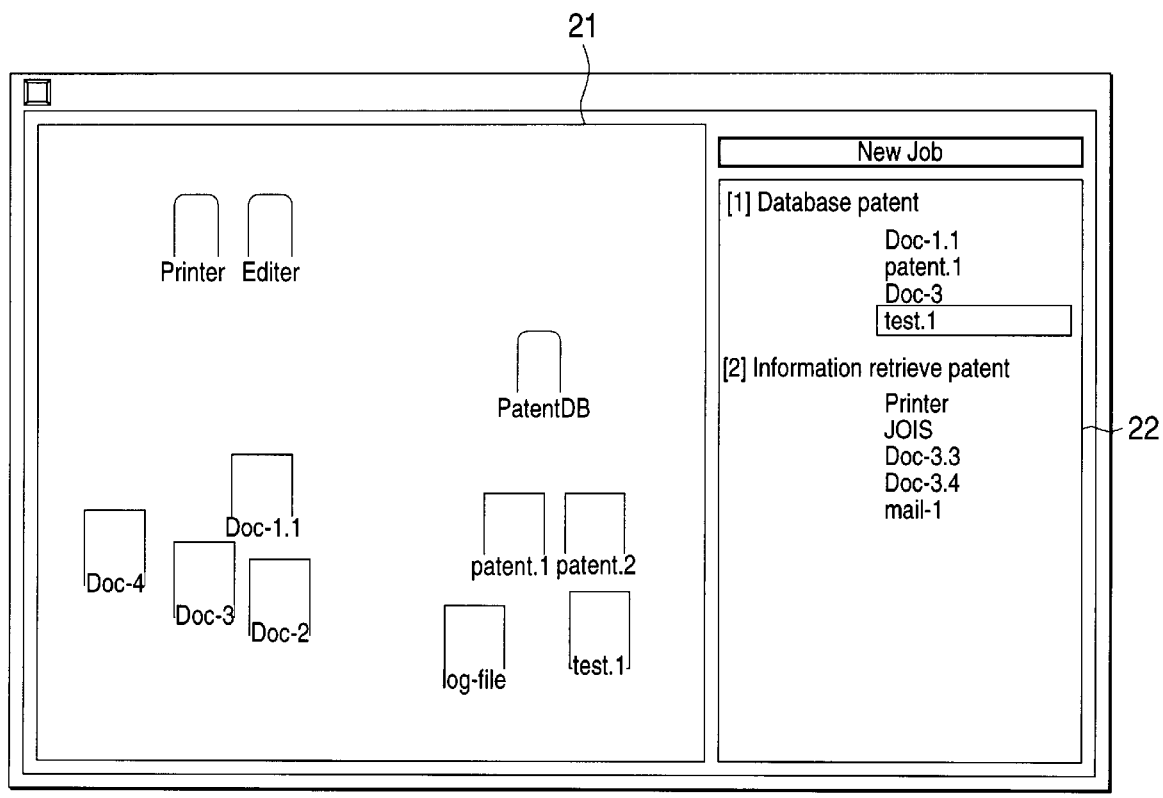
FIG. 7 is a view of still another example of a display of a list of information unit sets and selection information.

Further, for example, as shown in FIG. 7, by structuring the information unit set by the job name and the name of the information that is input and displaying the same on the screen, the selection information can be instructed in more detail. For instance, by presetting a restriction that a display is limited to the information units that have been input in the latest one week, the recent progresses of the work can be confirmed while referring to the state of an arbitrary scene of the work.

Next, there are shown below concrete data structures according to the present embodiment.

In these data structures, although no description is given of version control of the information units and objects referred to by the information units, by using a version control technology which has been used conventionally, the changes of the information units and objects to be referred to by the information units may also be all recorded. In this case, the states of the information units contained in the information unit set in a history called up and objects to be referred to by the information units can be restored as they were in the past. By realizing such function, there can be provided a help for a joint writing activity.

In FIG. 8, there is shown an example of a data structure for managing the names of users (user names), in which the management of the user names can be achieved according to a conventional management technology using user ids, user names, and passwords.

In FIG. 9, there is shown an example of a data structure in a work space. The work space includes a work space id, a work space name, the id of a current information unit set which is currently displayed in a work space area, and the id of a display format contained in a selection information list. The work space is a subject which holds a plurality of information unit sets, and the work space can be used in various ways. For example, the work space may be used one for one user, or may be allotted one to each of logical tasks.

In FIG. 10, there is shown an example of a data structure in a job. The job includes a job id, a job name, the date and time of implementation, and the name of implementor. The job is the name of the work that is declared by a user in a work space, and job data is generated each time the user declares.

In FIG. 11, there is shown an example of a data structure which represents correspondence between work spaces and jobs, that is, FIG. 11 is a table in which correspondences between work spaces and jobs contained in the respective work spaces are expressed by their respective ids. The correspondence data is added each time the job is generated.

In FIG. 12, there is shown an example of a data structure in an information unit set. The information unit set includes not only an information unit set id, the id of a work space to which the information unit set belong, the date and time of creation, and the name of creator, but also the job name of the present information unit set and the id of the information unit that is input to the present information unit set.

In FIG. 13, there is shown an example of a data structure in an information unit. The information unit includes not only an information unit id, the name of the information unit, the date and time of creation, and the name of creator, but also a reference object, a start application, a given comment, and the arrangement of the information unit on a work space.

In FIG. 14, there is shown an example of a data structure showing the correspondence between a work space and an information unit set, that is, FIG. 14 is a table which represents the correspondence between mutually related work spaces and information unit sets by use of their respective ids. By the way, each time an information unit set is generated, the corresponding data is added.

In FIG. 15, there is shown an example of a data structure showing the correspondence between an information unit set and an information unit, that is, FIG. 14 is a table which represents the correspondence between mutually related information unit sets and information units by use of their respective ids.

Also, for display of a selection information list, there are provided a table for selection information shown in FIG. 16, and a table for a selection information list shown in FIG. 17.

In particular, the selection information table of FIG. 16 shows that, as the selection information, there are available a job, a creator, an input information unit, and the date and time of creation. On the other hand, the selection information list of FIG. 17 holds a display format for the selection information list display part 16. For example, the list table of FIG. 17 shows that selection information id1 (that is, a job, as shown in FIG. 16) is set as a first hierarchy selection information and selection information id3 (that is, an input information unit, as shown in FIG. 16) is set as a second hierarchy selection information.

Next, description will be given below of rules to be observed when the information unit set is stored.

The storage of the information unit set into the information unit set hold history storage part 3 is executed when an operation command chain including a user's instruction forms a given combination. A timing for execution of the storage can be set in various manners by setting a storage execution rule.

In particular, if a user performs an operation on a work space, then a command for this operation is firstly stored into the operation command storage part 9. Next, with reference to the storage execution rule and the thus stored command, the information unit set storage judge part 8 judges whether the storage of an information unit set is executed or not.

In more particular, the storage of the information unit set can be executed by a user's direct instruction "information unit set storage", for example, by pressing down a button. Or, the information unit set storage can be executed in the following manner: that is, by detecting a timing related to the switching of the work, such as when a new job is declared, when information units on the work space are all cleared, when an information unit is input into the information unit set, or the like, an operation command related to the thus detected timing is stored in the operation command storage part 9 as shown in FIG. 18. The operation command storage part 9 stores therein sequentially the contents of operations executed by the user, such as an operation to open the work space (OpenWS), an operation to close the work space (CloseWS), an operation to select a job (SelectJob), an operation to switch the current information unit set (SwitchJob), an operation to delete an information unit (DeleteUnit), an operation to create an information unit (CreateUnit), and the like.

And, a rule to decide whether an information unit set is stored or not can be set, for example, in such a manner as shown in FIG. 19.

That is, at a timing when a new work is started on the work space or when a work is switched, the state of a work just before such start or switching must be always stored. As the timing for the switching of the work, there can be employed a timing when an information unit is input into an information unit set on a work space which is newly created, at a timing when a new information unit is formed after the information units that are held by the current information unit set are all removed, at a timing when a new information is created after the current information unit set is switched by specifying a job, and the like. These timings are regarded as timings at which new works are respectively started. The storage of the information unit set is instructed at such timings that can be regarded as the change of the works.

Next, description will be given below of the processing operations to be carried out in the information processing unit according to the present embodiment with reference to flow charts which are respectively shown in FIGS. 20 to 24.

In FIG. 20, there is shown a processing procedure for an information unit input processing (A) in which an information unit is input into an information unit set.

The input of the information unit can be executed by an a command given from a file control tool provided by OS, by an instruction from a pointing device, or the like. Also, the input of the information unit can be executed by an instruction from another application, or by the file control tool in accordance with a command given from an information processing unit.

If an instruction for input of an information unit is given, the information processing unit, at first, obtains information necessary for execution of this instruction, such as the name of a user who has given the instruction, the date and time of the instruction, the name of a file to be input, and the like (Step S1).

Figure 21:
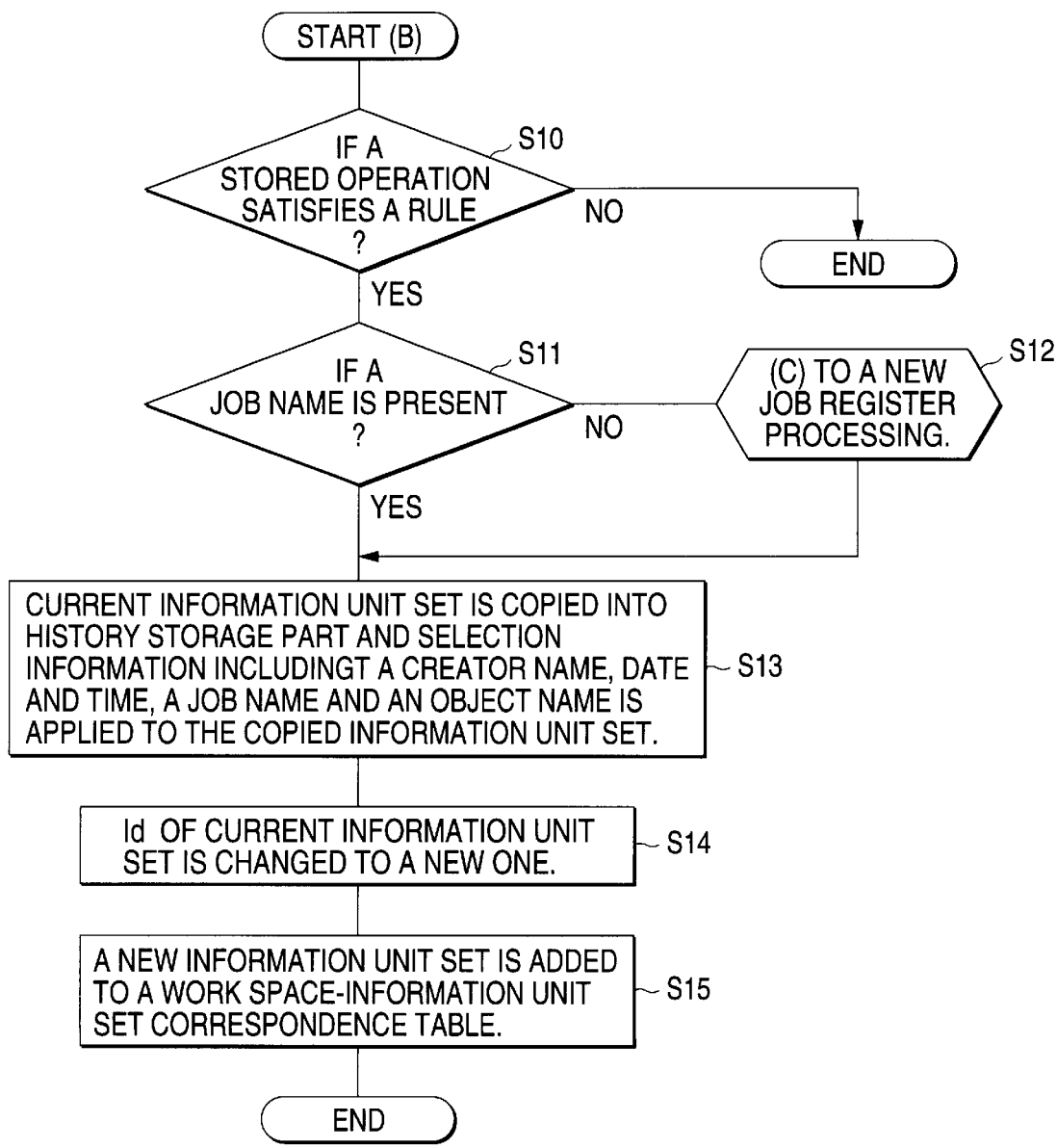
FIG. 21 is a flow chart of an example of a procedure for an information unit set storing and judging processing.

Next, the information processing unit creates a new data into an information data table (Step S2), adds "CreateUnit" to the operation command storage part 9 (Step S3) and, after then, moves to a storage judgment/execution processing (B) shown in FIG. 21 (Step S4).

And, after completion of the storage judgment/execution processing (B), the information processing unit adds a newly created information unit to the current information unit set (Step S5). That is, it adds the correspondence between id of the current information unit set and id of the newly created information unit to an information unit set-information unit correspondence table. After then, the present information unit set is displayed again, thereby ending the information unit input processing (A) (Step S6).

In FIG. 21, there is shown a processing procedure for the storage judge/execute processing (B) of the information unit set.

This processing judges whether the stored operation content (command) conforms to the storage execution rule or not and, if it is found that the command conforms to the storage execution rule, then executes the storage of the information unit set in accordance with the rule. For example, the command is called when the user instructs one of operations such as generation of an information unit, deletion of the information unit, editing of the information unit, storage instruction of an information unit set, read-out of the information unit set, and the like. That is, in the present processing, it is checked whether the state of a line of operation commands stored in such a manner as shown in FIG. 18 satisfies the storage execution rule shown in FIG. 19 or not.

In the present embodiment, it is checked whether any of the operation commands satisfies the rules or not starting at the Rule-1 and, if there is found any operation command which satisfies the rule, then the storage of the information unit set is executed. Here, the Rule-1 shown in FIG. 19 expresses "when a new information unit is created in a newly created work space". In this case, if two commands are arranged successively in the last portion of the command line, that is, if a command "A work space is newly created (CreateWS)" is arranged next to last in the line of commands that are stored in the operation command storage part 9, and a command "An information unit is created (CreateUnit)" is arranged last in these commands, then the condition for the storage execution can be satisfied and thus the storage execution of the information unit set can be carried out.

In other words, it is checked whether the stored operation satisfies the storage execution rule or not (Step 10) and, if it is found that the operation satisfies the rule, then it is checked whether a job name is declared or not (Step S11). If a work space is just created but a job name is not declared yet, then the processing moves to a new job registration processing (C) shown in FIG. 22 (Step S12).

On the other hand, if the job name is found declared, the information unit set held in the information unit set hold part 14 is copied into the information unit set hold history storage part 3, and selection information such as the name of a creator, the date and time of creation, the name of a job, and the name of an object is given to the thus copied information unit set (Step S13). Next, the id of the current information unit set held in the information unit set hold part 14 is changed to a new one (Step S14) and, after then, the id of the newly created information unit set is added to a work space-information unit set correspondence table which is used to manage the information unit sets stored in the work space (Step S15), thereby ending the processing.

Figure 22:
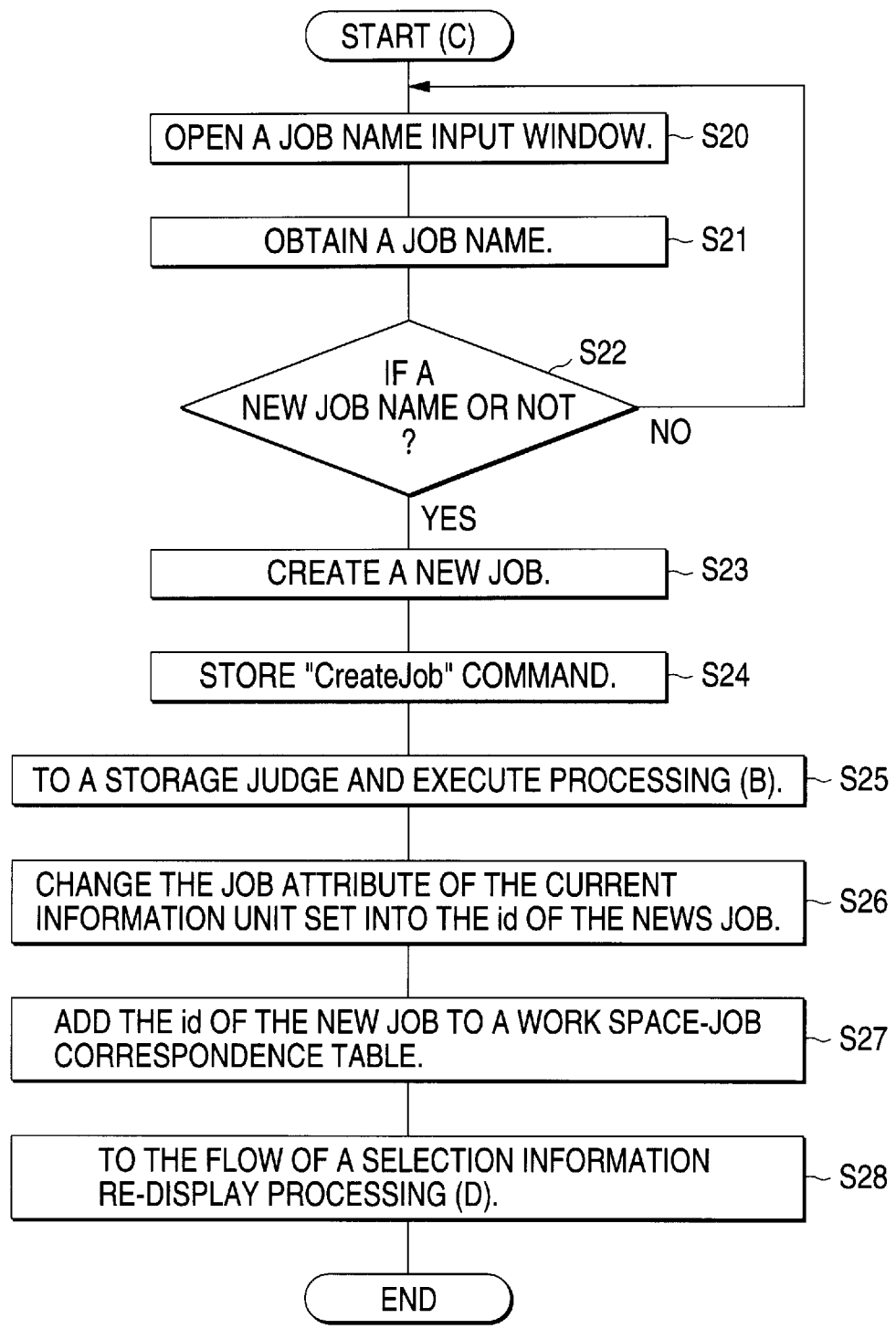
FIG. 22 is a flow chart of an example of a procedure for a new job registering processing.

In FIG. 22, there is shown a processing procedure for the new job registration processing (C).

This processing is called from the storage jude and execute processing (B), or it is called when a user declares a new job.

The information processing unit, at first, opens a job name input window into a display screen to thereby urge the user to input a job name (Step S20). If the job name is input (Step S21), then it is checked whether the present job name is in use in the same work space or not (Step S22) and, if it is found in use, then the information processing unit displays a message "the job is already in use" on the display screen, and returns back to the step of urging the input of a job name.

And, if a new job name is input, then a new job data is created (Step S23), "CreateJob" is added to the operation command storage part 9, and the storage judge and execute processing (B) is called (Step S25).

Next, the job attribute of the current information unit set held in the information unit set hold part 14 is changed to the id of the new job (Step S26), and the id of the new job is added to a work space-job correspondence table for managing jobs in the work space (Step S27). After then, in order to allow the selection information list display part 16 to display again the selection information, the processing advances to a selection information sort and display processing (D) shown in FIG. 23 (Step S28).

Figure 23:
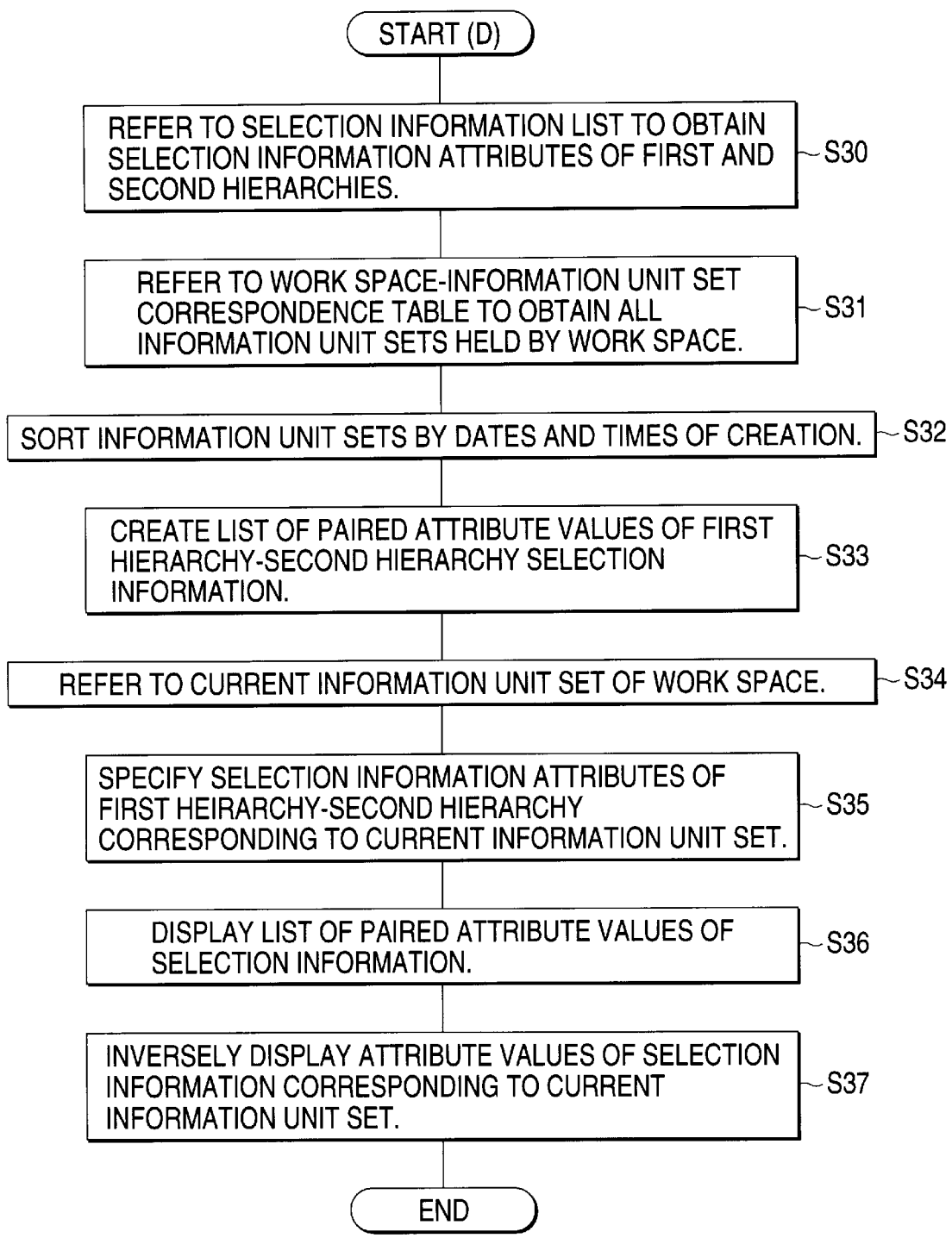
FIG. 23 is a flow chart of an example of a procedure for a selection information sorting and displaying processing.

In FIG. 23, there is shown a processing procedure for the selection information sort and display processing (D).

In this processing, at first, the selection information list table shown in FIG. 17 is referred to, thereby obtaining the selection information attributes of the first and second hierarchies (Step S30). And, by referring to the work space-information unit set correspondence table, there are obtained the ids of all the information unit set that is held in the work space (Step S31), and the thus obtained information unit sets are sorted according to the dates and times when they were created (Step S32).

Next, based on the thus sorted information unit sets, there is created a list of the paired attribute values of the first and second hierarchies (Step S33). Then, in order to show the selection information that corresponds to the current information unit set, by referring to the current information unit set in the work space (Step S34), there is specified the selection information attributes of the first and second hierarchies that correspond to the current information unit set (Step S35). After then, there is displayed the list of the paired attribute values of the selection information (Step S36), and there are invertedly displayed the attribute values of the selection information corresponding to the current information unit set (Step S37).

Figure 24:
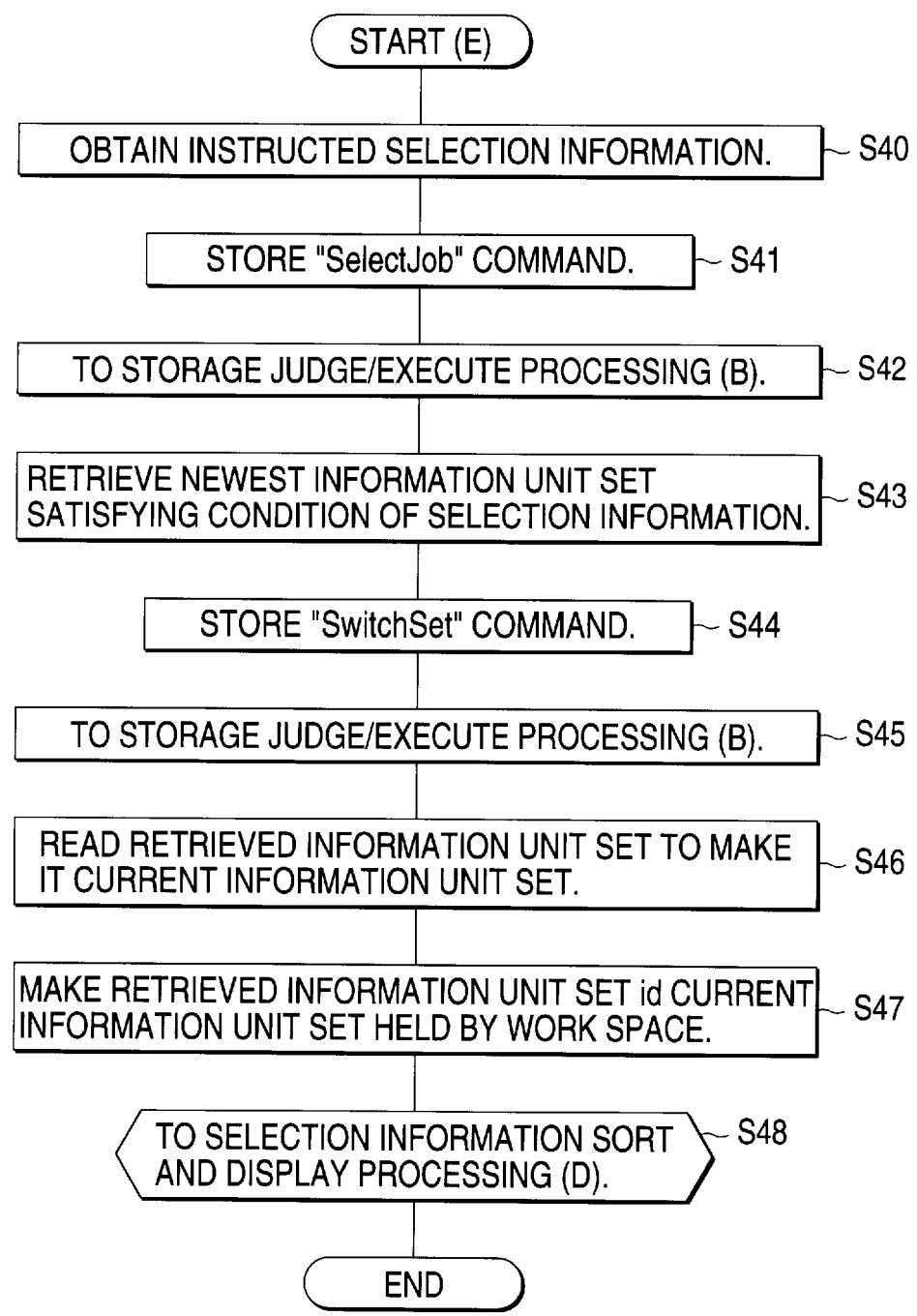
FIG. 24 is a flow chart of an example of a procedure for an information unit set inputting processing.

Now, in FIG. 24, there is shown a processing procedure for an information unit set read-out processing (E) which is performed when switching the state of the scene of a work.

This processing is called up when a user instructs the selection information of the selection information list display part 16. In this processing, at first, instructed selection information is obtained (Step S40). And, "Select Job" is added to the operation command storage part 9 (Step S41), and the storage judge and execute processing (B) is called (Step S42).

And, the newest information unit set that satisfies the condition of the selection information is retrieved (Step S43), a command "SwitchSet" is added to the operation command storage part 9 (Step S44), and the storage judge and execute processing (B) is then called (Step S45).

Next, the retrieved information unit set is read out into the information unit set hold part 14 (Step S46), and the id of the retrieved information unit set is regarded as the id of the current information unit set that is held in the work space (Step S47). And, for the sorting and display of the selection information, the processing moves again to the selection information sort and display processing (D) (Step S48).

Next, description will be given below of the concrete application examples of the information processing unit according to the present embodiment with reference to FIGS. 25 to 29.

Figure 25:
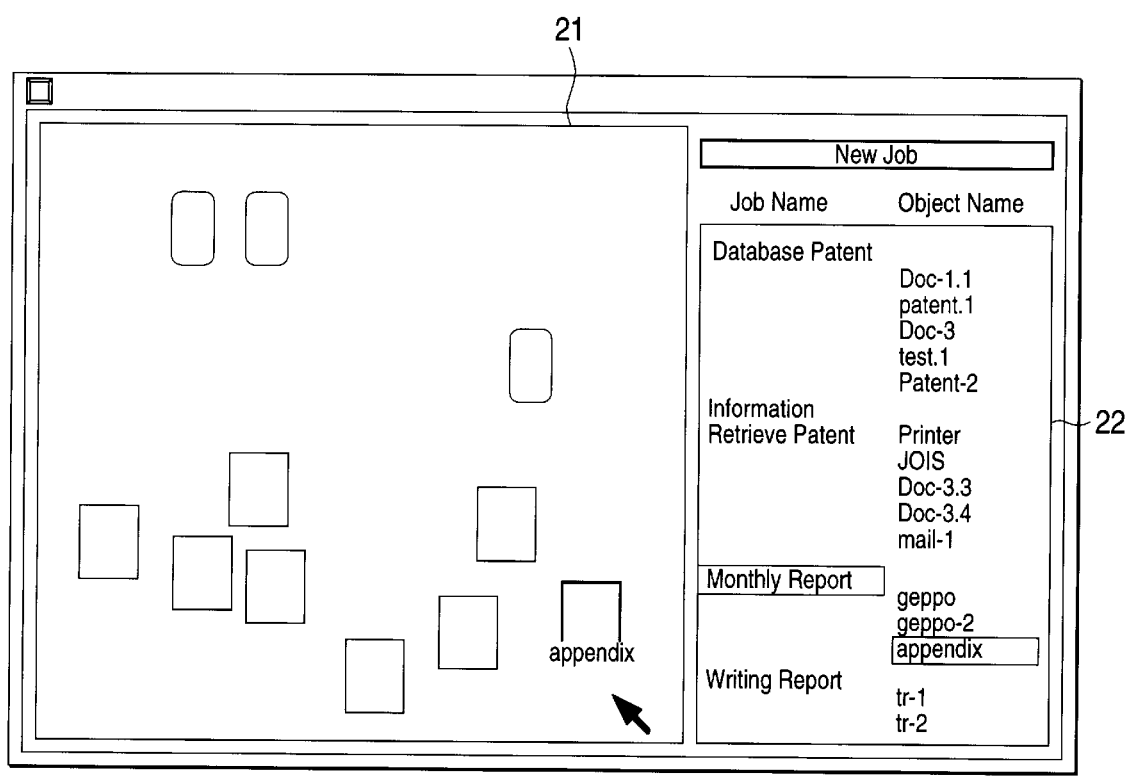
FIG. 25 is a view of an example of a display of a list of information unit sets and selection information.

In FIG. 25, there is shown an example of a display of the present information processing unit at a time when it starts. The present information processing unit displays the information unit sets in a wide display area 21 on the left side of FIG. 25, while the information units that are the elements of the information unit sets are documents, applications, or icons used to refer to an external equipment such as a printer or the like. Also, the right area 22 of FIG. 25 is a selection information list display part and, in this example, the selection information is shown by a hierarchical structure including job names and input object names.

In the current state, the user declares four works in this work space and, in particular, the four works are respectively "Database Patent", "Information Retrieval Patent", "Monthly Report Information", and "Report Writing". For example, in a job "Database Patent", it is shown that there are generated five documents, that is, "Doc-1.1", "patent.1", "Doc-3", "test.1", and "Patent-2". Also, the state of the scene of the work, which is currently shown, is a state which occurs after a document "appendix" is generated under the job name "Monthly Report Information".

For example, let us assume that a work to write a new patent document is started from now. It is also assumed that the patent relates to a knowledge data base and a conventional technique examination relating to a previous job "Database Patent" can be used.

Figure 26:
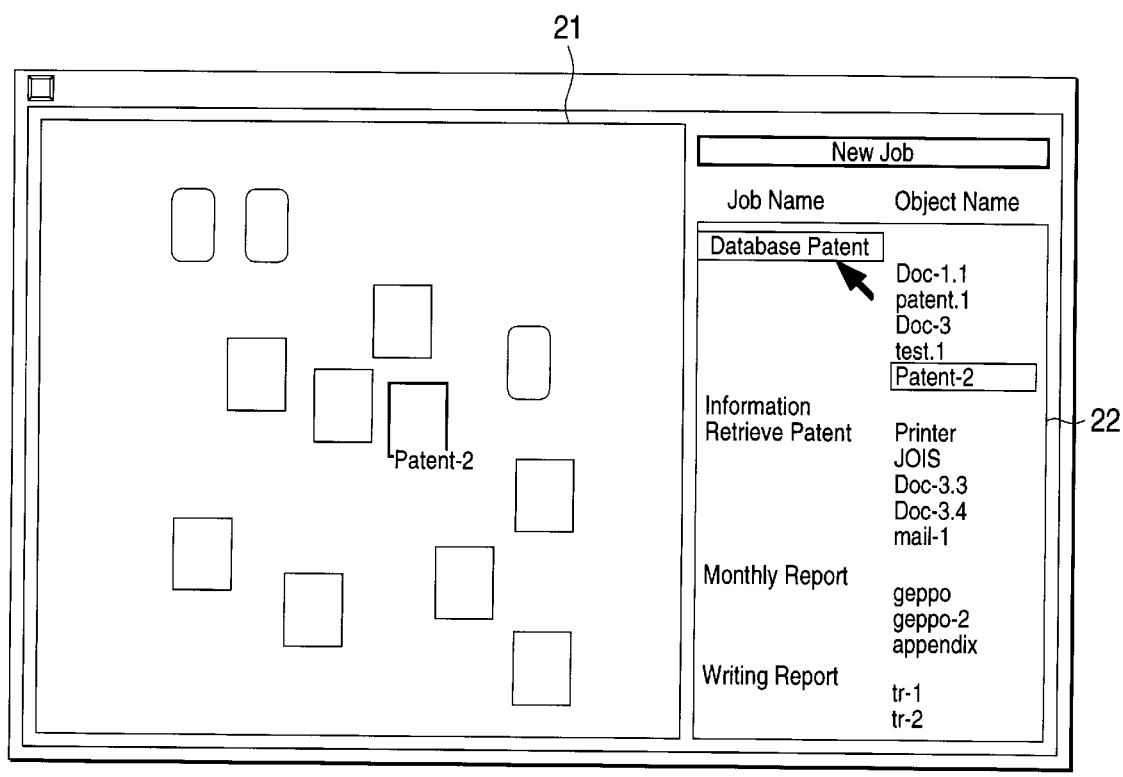
FIG. 26 is a view of an example of a display of a list of information unit sets and selection information.

As shown in FIG. 26, by selecting the job name "Database Patent" as the selection information, the state of the scene of the work can be returned to the newest state of the job name "Database Patent". Here, it can be confirmed from the display of a selection information list 22 that the state of the work has been returned to the state occurring after "Patent-2" is generated last in the job "Database Patent".

Figure 27:
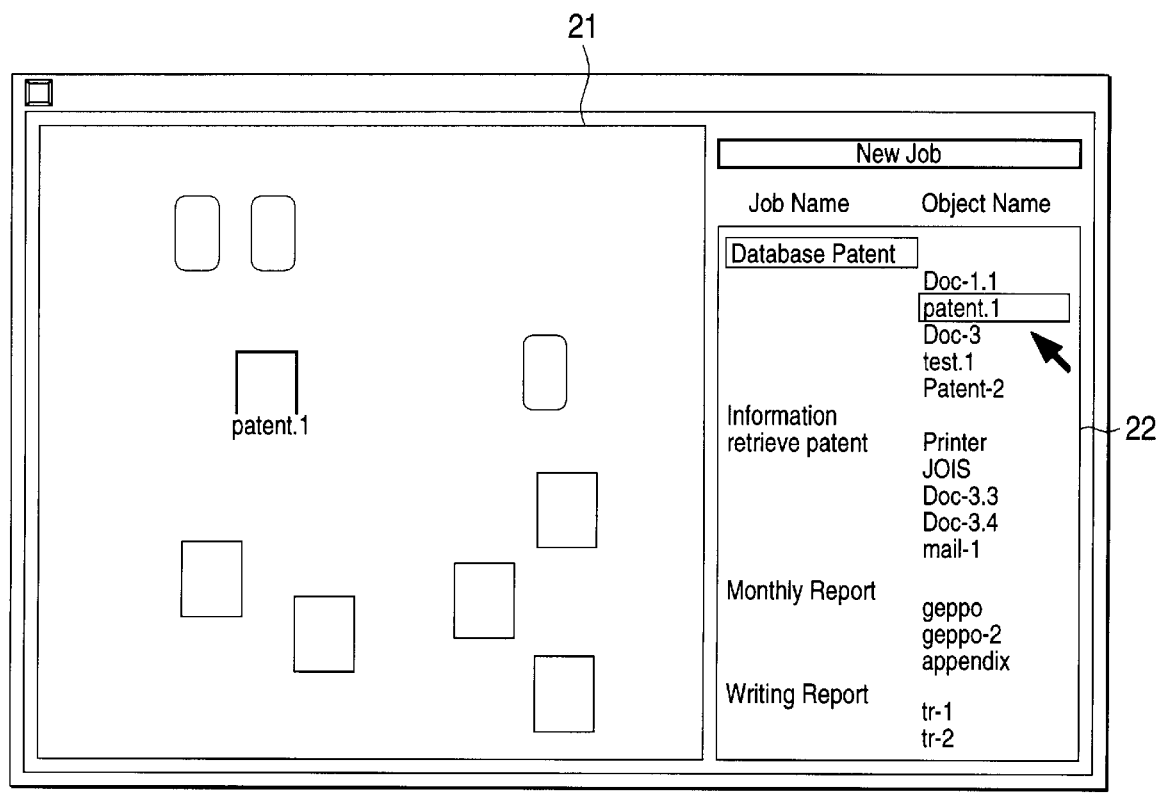
FIG. 27 is a view of an example of a display of a list of information unit sets and selection information.

On the other hand, let us assume that, since two patent documents are being written in the job "Database Patent", not the conventional technique examination of the document "Patent-2" but that of the document "patent.1" is desired for use. In this case, as shown in FIG. 27, the document "patent.1" is selected from the selection information list 22 and the scene of the work can be returned to the intermediate state of the job "Database Patent". Due to this, the information relating to the document "Patent-2" can be excluded from the scene of the work.

In other words, this can be achieved due to the fact that the transition of the states of the work is stored in the present embodiment, not that the scenes of the work are sorted logically. This function makes it possible to re-arrange the branching of the scenes of the work afterwards from a different viewpoint. Also, if a user's name is used as the selection information, then only the operation performed by the user can be sliced out from the scene of the work being jointly done and the sliced operation can be branched to a new operation from the sliced state.

Figure 28:
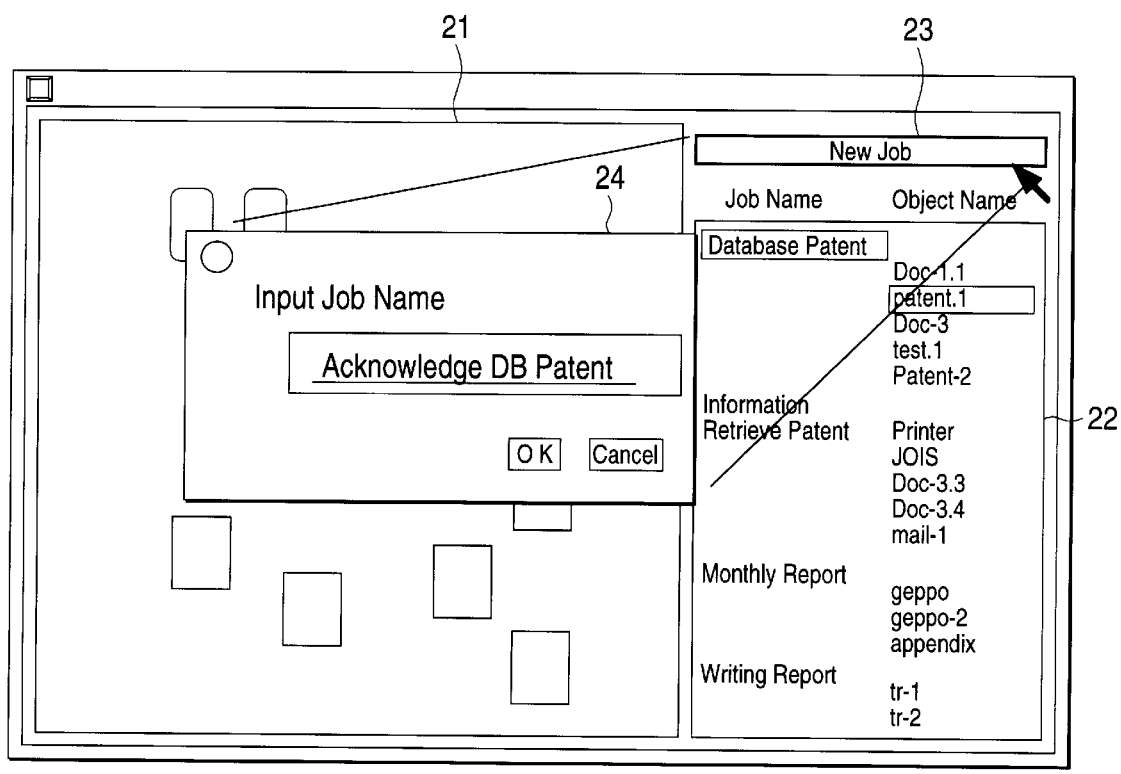
FIG. 28 is a view of an example of a display of a list of information unit sets and selection information.

Next, when a new work is started from that state, as shown in FIG. 28, for example, by pressing down a button 23 "New Job", a window 24 for declaration of a job name is popped up to urge the declaration of a job name. In this example, the user has input "Knowledge DB Patent". And, if a button "OK" is depressed, then "Knowledge DB Patent" is applied to the current information unit set as a job name.

Figure 29:
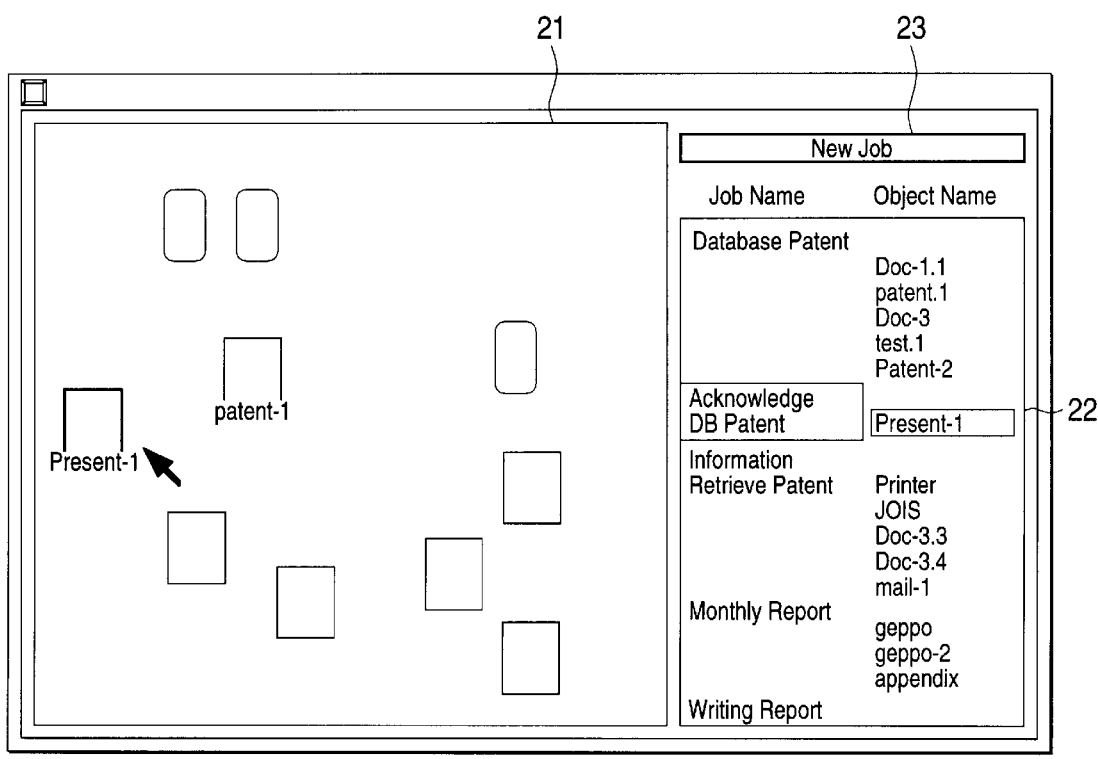
FIG. 29 is a view of an example of a display of a list of information unit sets and selection information.

After then, as shown in FIG. 29, for example, if a document "Present-1" is created, then "Knowledge DB Patent" as a job name and "Present-1" as an object name are added to the selection information list display part 22.

Here, description will be given below of differences between the characteristics of the invention and the prior art.

In Rooms, the room "Datatbase Patent" is firstly provided and the work is done in this room. And, when trying to do the next work, the room "Information Retrieval Patent" is then provided and a new environment is built in this room. Here, since a printer and an editor necessary for writing a patent manuscript, an application such as a patent DB or the like, and documents to be referred to in common are used in both of the works, they are copied in Rooms.

However, this copying operation is complicated because the necessary information units must be copied between the rooms. For this reason, when executing a plurality of similar jobs such as a job to write a plurality of patent manuscripts as in the present example, the user is apt to use the same room.

On the other hand, according to the invention, differently from provision of a new room, a given name is given to the state of a work at a certain time and, as the need arises, the state is called up by means of the name. This can save the time and labor to build a similar room and the work can be subdivided easily. That is, if a new work is derived from the current work, the previous state of the current work just before such derivation can be left as it is. Just after a new job is declared, the work space is held in the same state as the final state of the previous job. Therefore, information units not necessary for the next job may be cleared (that is, unnecessary information units may be erased), and information units necessary for the next job may be collected, which makes it possible to build a new job environment.

When this is compared to a desk which is used in the real world, Rooms has a large number of desks which can be used for the respective works. On the other hand, according to the invention, the states of a desk on which a work is being done are respectively snapshot whenever necessary, work or job names are respectively given to the states, and, by declaring any one of the names, the state of the desk can be returned to the previous state in which the job was being executed.

Of course, in the desks, there are included some which can be used in common for every work and there are also included some which can be used or cannot depending on the contents of the information units of the works. It is difficult to previously know the characteristics of the information units. However, according to the invention, the information units can be naturally classified while advancing the work.

Also, according to the invention, after clearance of all the unnecessary information units in the job "Information Retrieval Patent", when trying to execute the work "Database Patent" again, simply by specifying the job name of the selection information list, the previous state of the work can be restored.

It should be noted here that the object of the invention is to create a new state by use of the past state of the work, not to simply restore the past state. Of course, if the invention is structured such that it can carry out the version control of the objects themselves, then the editing state of a document can be returned to the state of the work at the storage time of the work space, which is effective when supporting joint authorship.

To the above-mentioned first embodiment, there can be added various modifications as follows.

The storage instruct part 7 may be structured such that it does not include the operation command storage part 9 but the information unit set storage judge part 8 can execute the storage of the information unit sets in accordance with a storage instruction from a user.

Also, the storage instruct part 7 may be structured such that it does not include the operation command storage part 9 but the information unit set storage judge part 8 monitors operations performed by the user and executes the storage of the information unit sets when the creation or deletion of the information unit sets is instructed.

Further, the information unit set display part 13 may display the information unit set two- or three-dimensionally using a rough sketch image, or may sort the information unit sets in the alphabetical order of the names of the information units or by the dates and times of creation of the information units and then display them in a list.

And, as a method for realizing the history storage of the information unit sets, there may be employed a method in which the information unit set held by the information unit set hold part 14 is always made identical with the newest information unit set stored in the information unit set hold history storage part 3, the information unit set within the history storage part 3 is copied at a timing when the storage of the information unit set is executed, new id is given to the thus copied information unit set, and the information unit set having a new id is then read out into the information unit set hold part 14.

Also, in the above-mentioned embodiment, as a method for realizing the history storage of the information unit sets, there is used a method which retains the state of the work always just before the work is switched. However, there may be employed another method which retains the state of the work always just after the work is switched.

The information unit set hold part 14 may also be structured such that it controls the version of the information units. This can be attained easily according to an existing version control technique. In this case, the information unit set hold part 14 controls the set of the respective versions of the information units together with the updated dates and times thereof. Due to this, when the information unit set is restored, the information that is held by the information unit can also be returned to the state thereof at the time when the present information unit set was stored.

Also, there may be provided an object control part which is used to control the version of the object that is referred to by the information unit. This can be achieved easily according to an existing version control technique. In this case, the object control part controls the set of the respective versions of the object together with the updated dates and times thereof. Thanks to this, when the information unit set is restored, the object to be referred to by the information unit can also be returned to the state thereof at the time when the present information unit set was stored.

There may be provided a storage execution rule instruct part which is used to customize the storage execution rules of the information unit set according to the use aspects of the information unit set. As a timing for the storage execution, it is desirable to employ a timing when the work is changed: for example, a timing when the attribute of the information unit is changed; in particular, at a timing when the position of the information unit is changed, or, if it is assumed that information representing the progress statuses of the work (such as an unstarted status, an in-progress status, a completed status, and the like) is given to the information unit, then at a timing when the information is changed.

Also, the storage instruct part 7 may also be structured such that it does not include the operation command storage part 9 but the information unit set storage judge part 8 stores periodically the information unit sets every given time. This makes it possible to leave or retain the outline of the flow of the work.

Further, the information unit set storage judge part 8 may also be structured such that, if a given number of information units are input therein, then it stores the information unit set. This can leave or retain the history of the information unit set each time a given operation progresses. Further, it is possible to retain the properly thinned-out states of the work and thus the outline of the flow of the work regardless of the density of the work.

And, the storage execution rules relating to the storage judgment of the information unit sets may be checked sequentially, or, in confirming Rule-1, may be checked at the same time when checking whether the other rules satisfy the storage execution condition or not. Also, the operation command storage part 9 may be previously referred to and the operations thereof may be checked in the reversed order starting from the last one, thereby being able to focus on the rules that can satisfy the storage execution condition.

Also, the operation command storage part 9 may be structured such that it can store not only the operations performed by the user but also the following events. In this case, the information unit set storage judge part 8 judges in accordance with the events whether the information unit set is to be stored or not. The events include: an event executed by another application on the same computer, in particular, an event started by another application or an event to the effect that another application gained access to an external device such as a network, a printer or the like; an event relating to the reception or transmission of an electronic mail; an event relating to the arrival and start of a work in a work flow tool in operation on the same computer; and, other events. That is, in the present modification, by inputting the events that are generated in all the remaining applications, the timing for switching the work can be grasped in more detail.

Figure 30:
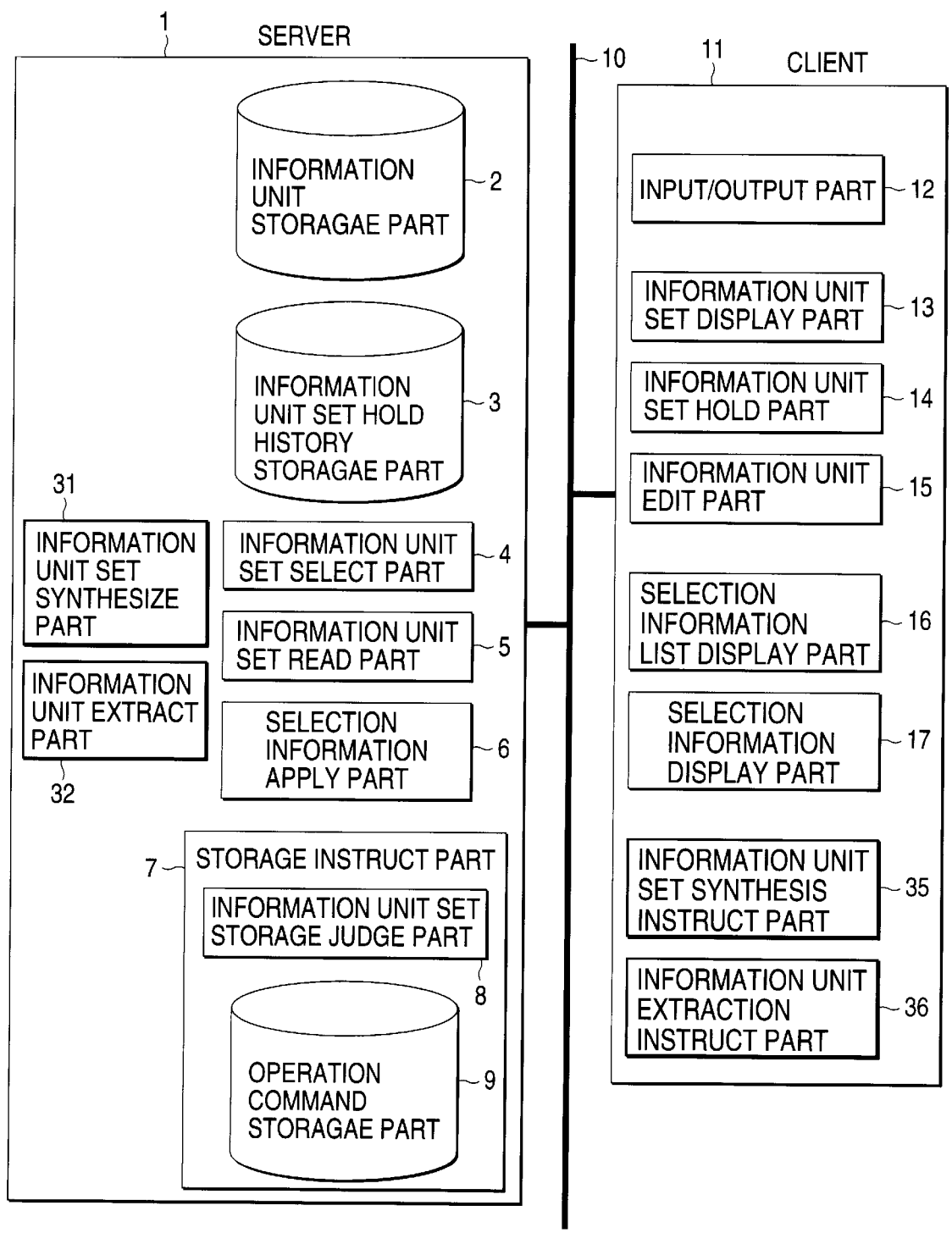
FIG. 30 is a block diagram of the structure of a second embodiment of an information processing unit according to the invention.

Now, FIG. 30 shows the structure of an information processing unit according to a second embodiment of the invention. In this embodiment, the parts thereof used in common with the previously described first embodiment are given the same designations and the duplicated description thereof is omitted here.

In the second embodiment, description will be given below of a structure in which the information units that are held by a plurality of specified information unit sets are synthesized according to a set operation to thereby create a new information unit set.

A server 1 includes, in addition to the structure of the first embodiment, an information unit set synthesize part 31 for performing a set operation on the information units that are held by a plurality of information unit sets, and an information unit extract part 32 for filtering the information units that are held by the information unit sets.

The information unit set synthesize part 31 performs a set operation such as a sum set operation, a common set operation, a difference set operation or the like on the information units held by a plurality of selected information unit sets.

The information unit extract part 32 filters variously the information units held by the selected information unit sets according to the creators' names, the dates and times of creation, comments, start applications, positions and the like which are held by the present information units, thereby creating a new information unit set.

Now, a client 11 includes, in addition to the structure of the first embodiment, an information unit set synthesis instruct part 35 for instructing a set operation, and an information unit extract instruct part 36 for instructing a filtering operation.

Figure 31:
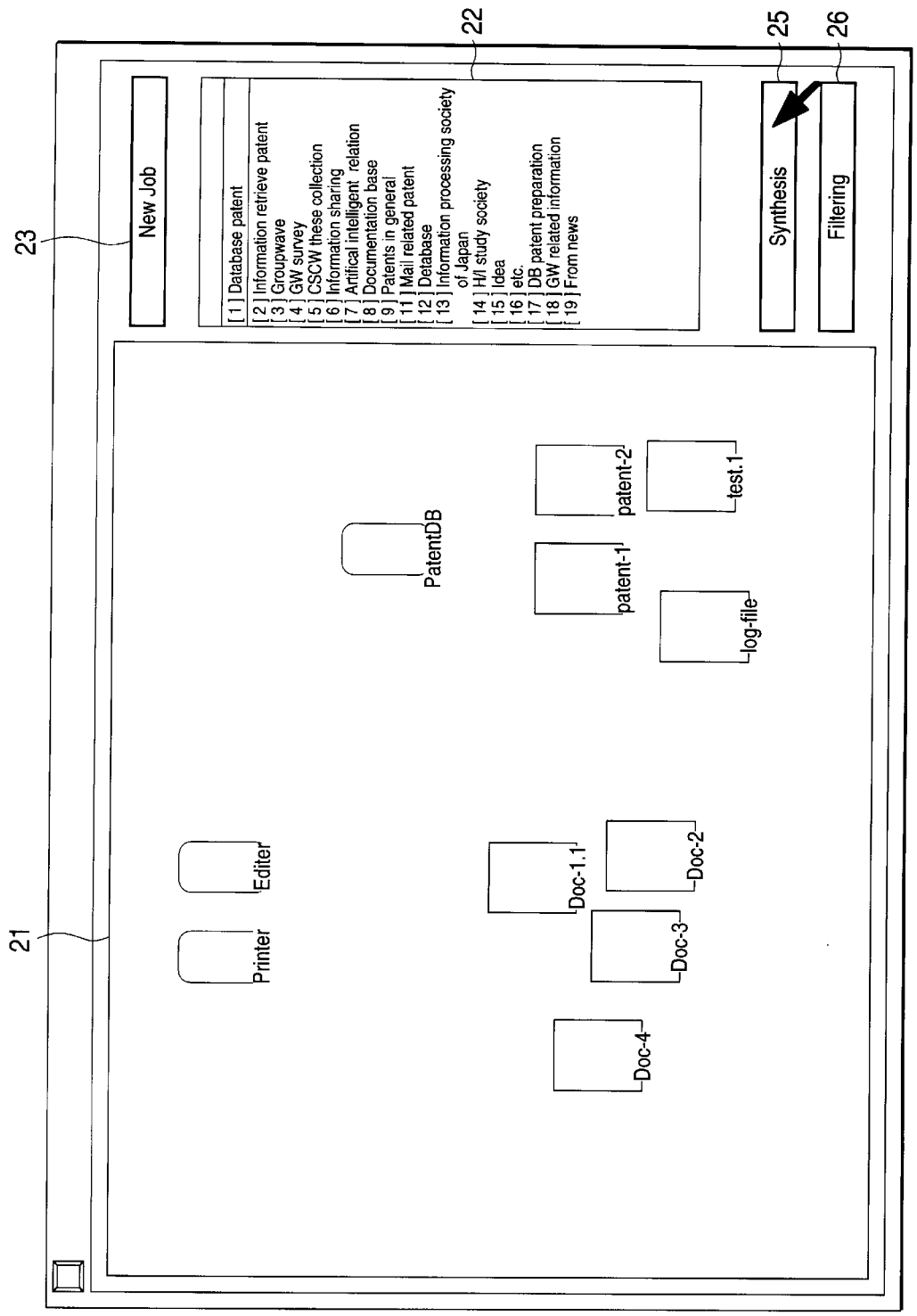
FIG. 31 is an explanatory view of an instruction to synthesize a plurality of information unit sets.
Figure 32:
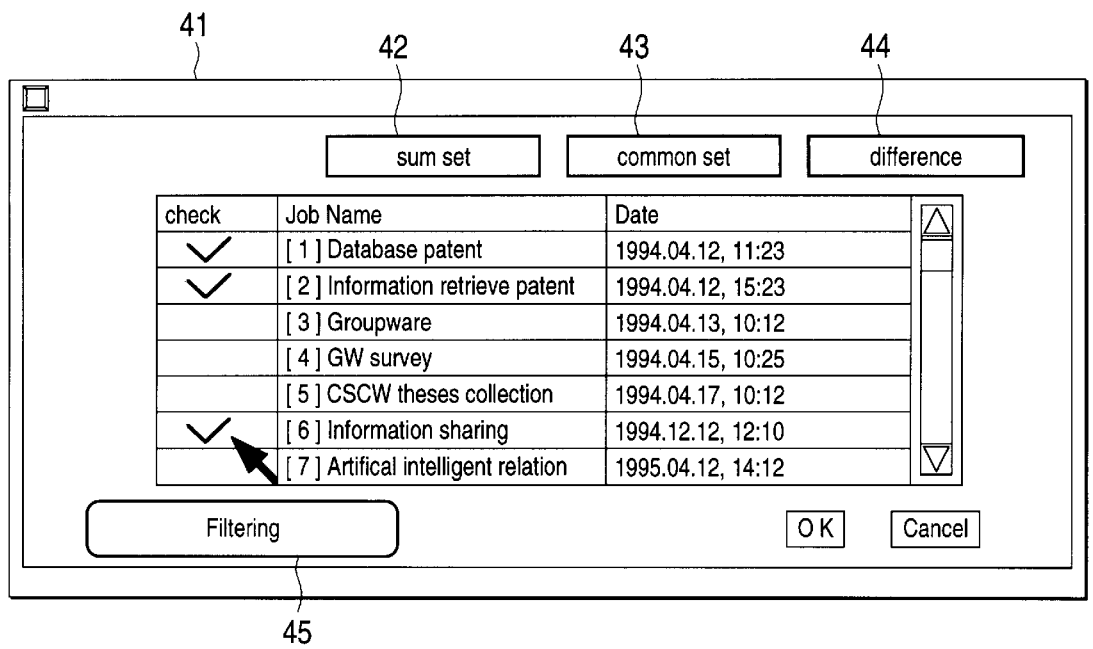
FIG. 32 is an explanatory view of an instruction to select information unit sets to be synthesized.

The information unit set synthesis instruct part 35, as shown in FIG. 32, specifies a plurality of information unit sets to be synthesized and, in response to this, if a module for instructing a synthesize method, for example, a "synthesize" button 25 shown in FIG. 31 is depressed, then a window 41 shown in FIG. 32 is initiated.

And, the information unit set synthesis instruct part 35 has a function to instruct a sum set operation 42, a common set operation 43, a difference operation 44, and a filtering operation 45 on the selected information unit sets. Thus, the user is able to specify two or more information unit sets and instruct a set operation, that is, a sum set operation or a common set operation on the information units that are held by the specified information unit sets. Also, the user can specify one information unit set serving as a standard and one or more other information unit sets and instruct a "difference" set operation.

Figure 33:
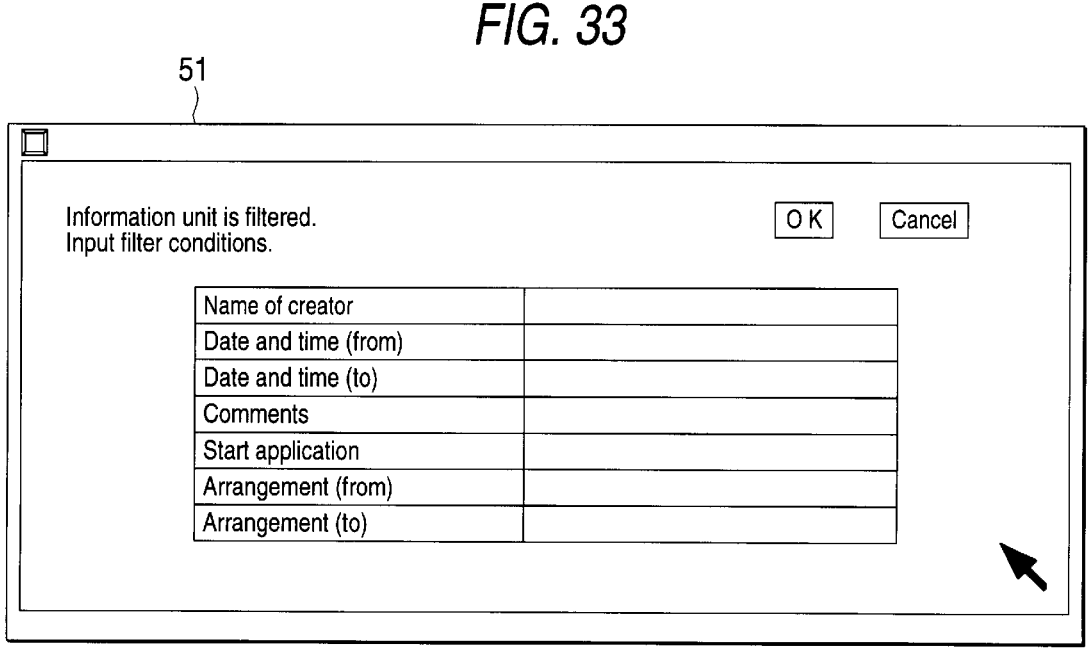
FIG. 33 is an explanatory view of a filtering instruction.

On the other hand, the information unit set extraction instruct part 36 calls up a window 51 shown in FIG. 33, for example, by pressing down a "filtering" button 26 shown in FIG. 31 or a "filtering" button 45 shown in FIG. 32. And, if the user inputs a condition into this window 51, then the user can extract the information units that are held by the information unit sets. For example, if a user inputs his or her name into the "name of creator" for filtering, then the information units that have been created by other users than himself or herself are all deleted from the current information unit set.

Also, when the synthesis instruct window 41 shown in FIG. 32 is called up, the information units to be synthesized are previously selected or limited to those which can satisfy a filtering condition, before a set operation is executed. For example, if, as the filtering condition, an editor which the user is using is specified as a start application, then the information unit sets synthesis can be carried out limitatively or by confining the synthesis range only to the documents that can be referred to by the editor.

Further, the filtering of the information units can be instructed under the following conditions: that is, the range of the dates of creation of the information units is specified as the "date and time"; the information units are limited to those which include such comments as specified as the "comments"; the information units are limited to those which are arranged in a range in a two-dimensional space specified as the "arrangement", and the like. Also, the filtering of the information units can also be instructed by other means than the conditions shown in FIG. 33: for example, according to the attribute as to whether the kind of a resource to be referred to by the information unit is the "document" or "application", or according to the attribute of the resource to be referred to, or according to a character line contained in the resource to be referred to, or the like.

Figure 34:
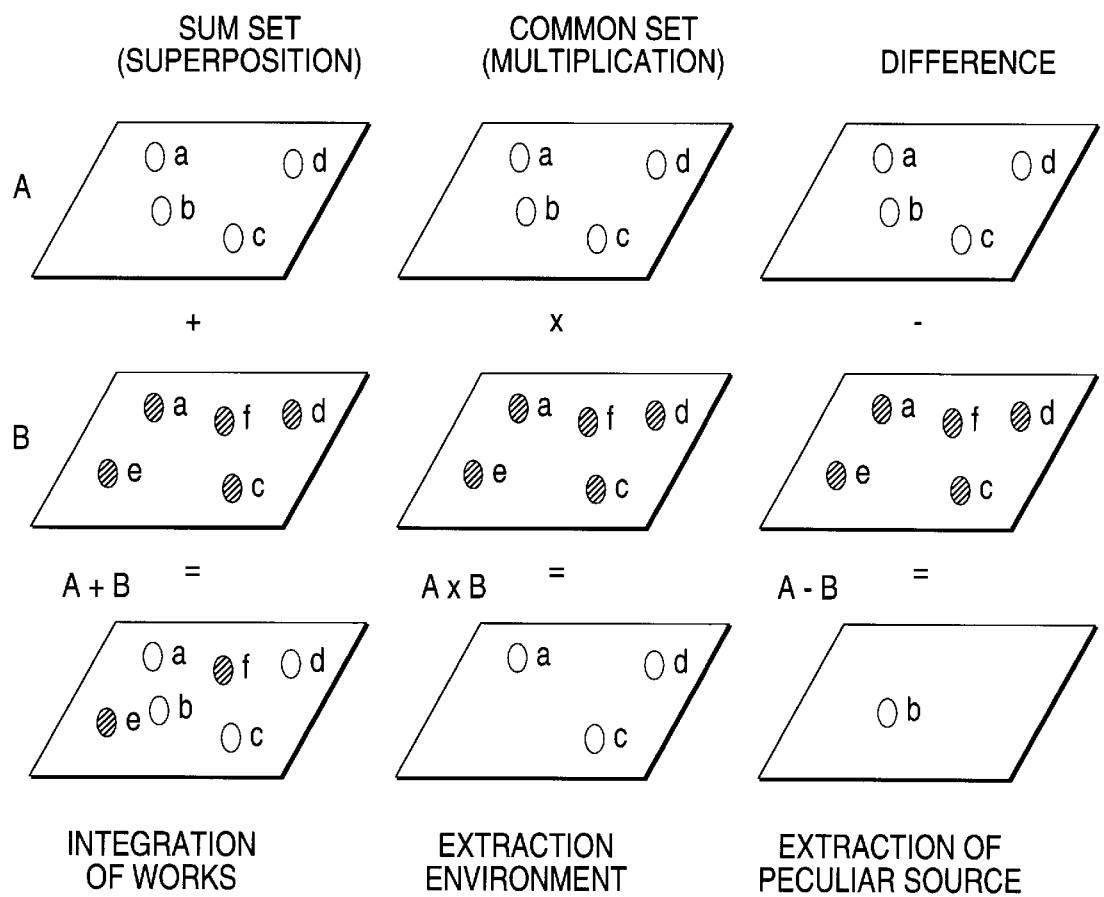
FIG. 34 is a conceptual view to explain a processing for synthesizing a plurality of information unit sets.

Now, in FIG. 34, there are shown the concepts of a synthetic operation as to the sum set, common set, and difference.

The "sum set" operation can be used for integration of a plurality of works, the "common set" operation can be used to extract an environment shared in common with a plurality of works, and "difference" operation can be used for extraction of a resource peculiar to a certain work.

In the sum set operation, a plurality of information unit sets are ORed and, if a set A={a, b, c, d} and a set B={a, c, d, e, f}, then A+B={a, b, c, d, e, f}. Also, in the common set operation, the information unit sets are ANDed to produce A*B={a, c, d}. Further, a difference between A and B can be obtained by deducting the information units contained in B from the information units contained in A, that is, A−B={b}. Here, in this operation, the information units that are not contained in A but are contained in B are ignored.

Next, description will be given below of processings relating to the sum set, common set, difference and filtering operations of the information unit sets with reference to flow charts shown in FIGS. 35 to 38.

Figure 35:
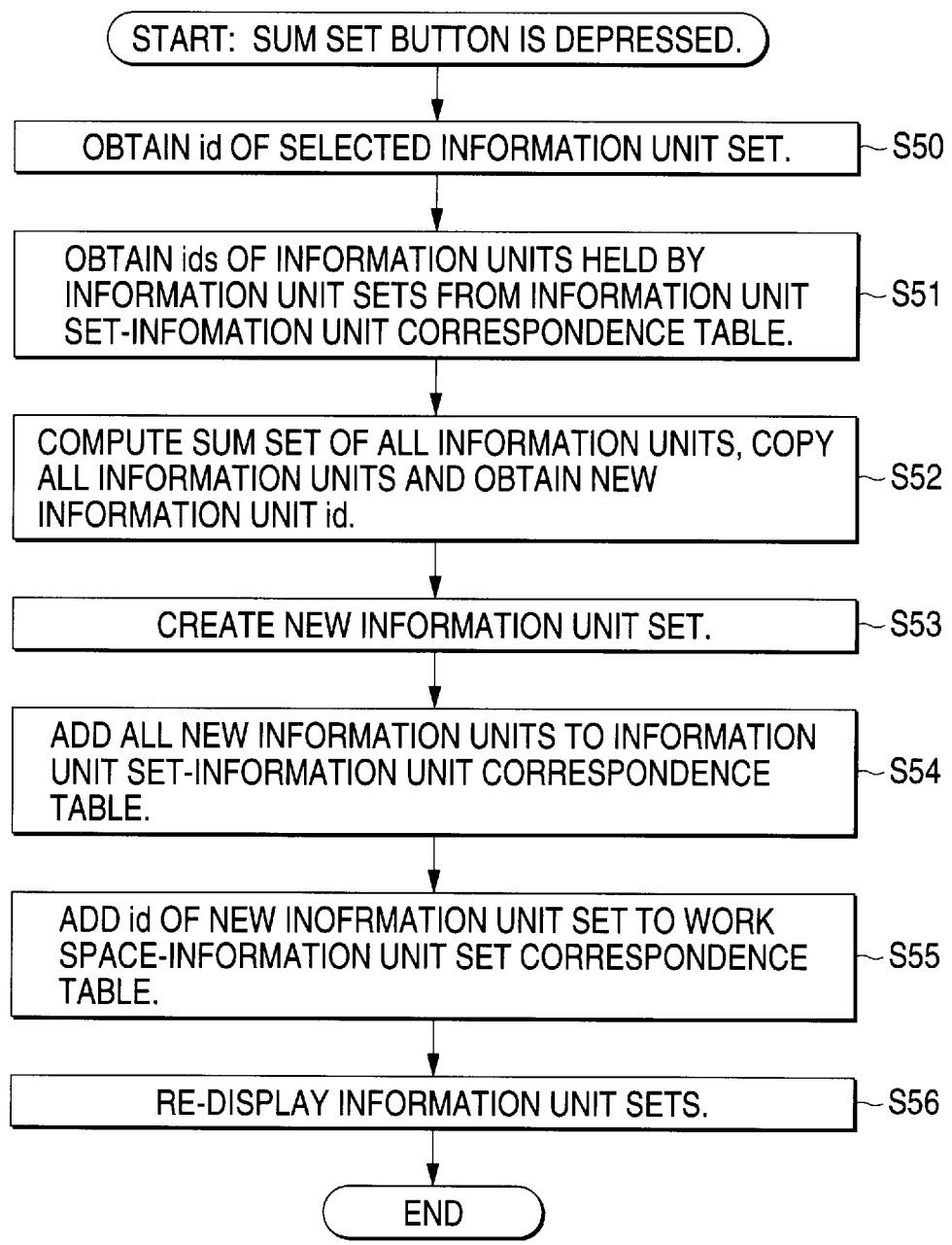
FIG. 35 is a flow chart of an example of a procedure for a sum set operation processing.

In FIG. 35, there is shown a procedure for a processing to be performed on the information unit sets for the sum set thereof.

At first, if some information unit sets are selected and a sum set button 42 is pressed down in a synthesis instruct screen 41 shown in FIG. 32, then ids of the selected information unit sets are obtained (Step S50). For example, in FIG. 32, job names "Database Patent", "Information Retrieval Patent" and "Information Sharing" are selected and the respective newest information unit sets thereof are retrieved.

Next, the ids of the information units held by the respective information unit sets retrieved are obtained from the information unit sets-information units correspondence table (Step S51), and there are created the sets of the information units ids for the respective information unit sets.

And, by performing a processing in which the ids of these information units are merged and the same ones are deleted, there is obtained the sum set of the sets of the respective information units, the respective information units contained in the sum set are copied, and new information ids are given to the respective information units (Step S52).

Next, a new information unit set is created (Step S53), and the information units that are copied and given new ids in Step S52 are all added to the information unit sets-information units correspondence table (Step S54). After then, the id of the new information unit set is added to a work spaces-information unit sets correspondence table (Step S55) and the information unit sets are displayed again (Step S56).

Figure 36:
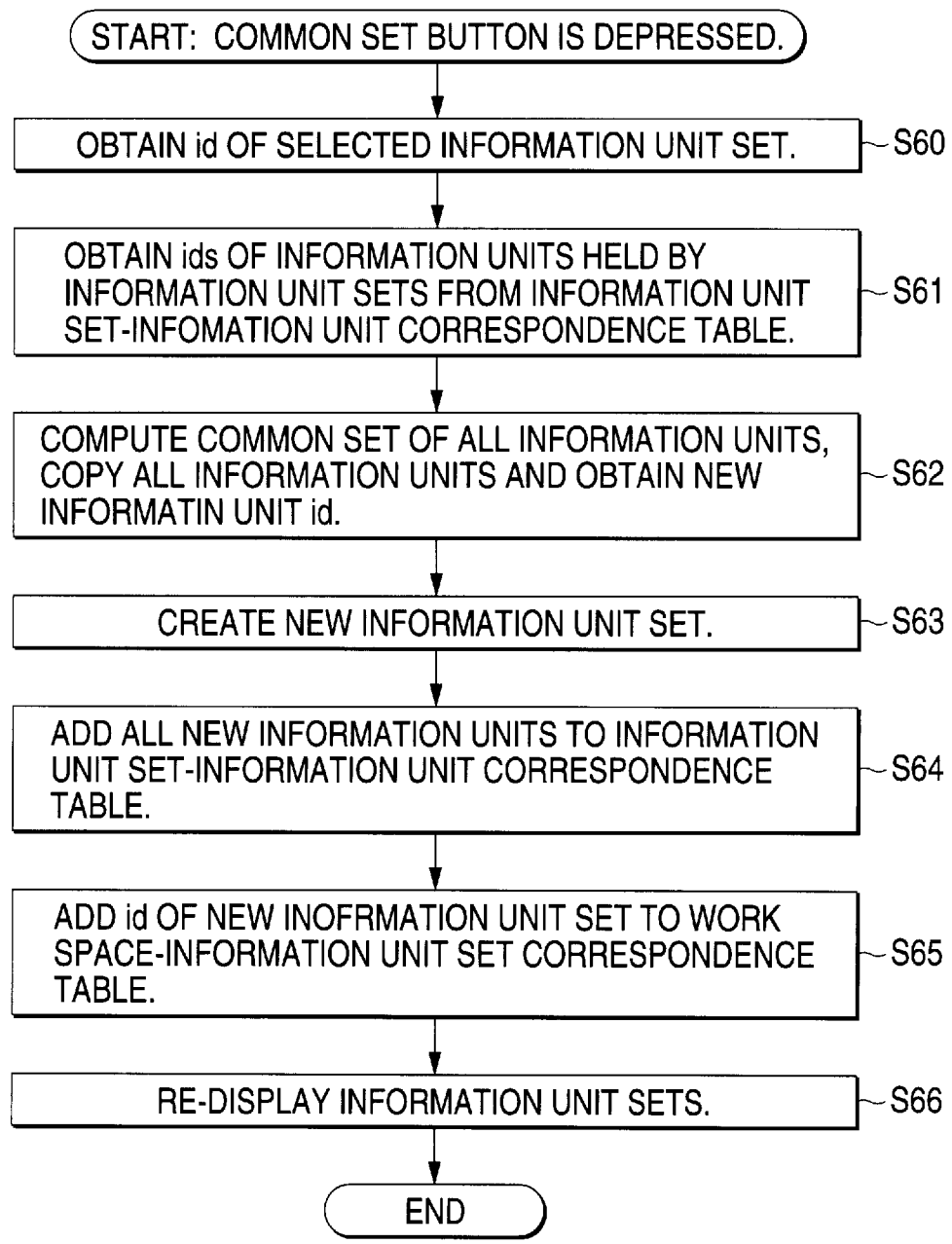
FIG. 36 is a flow chart of an example of a procedure for a common set operation processing.

In FIG. 36, there is shown a procedure for a processing to be performed when there is obtained a common set for the information unit sets.

At first, in the synthesis instruct screen 41 shown in FIG. 32, if some information unit sets are selected and a common set button 43 is pressed down, then, similarly to the sum set operation, the ids of the selected information unit sets are obtained (Step S60), and the ids of the information units held by the respective information unit sets are obtained from the information unit sets-information units correspondence table (Step S61), thereby creating their respective sets.

Next, there are obtained the AND set of all the information units, the respective information units of the AND set are copied, and new information unit ids are given to the respective information units (Step S62).

And, a new information unit set is created (Step S63), and the information units copied and given new ids in Step S62 are all added to the information unit sets-information units correspondence table (Step S64). After then, the id of the new information unit set is added to the work spaces-information unit sets correspondence table (Step S65), and the information unit sets are displayed again (Step S66).

Figure 37:
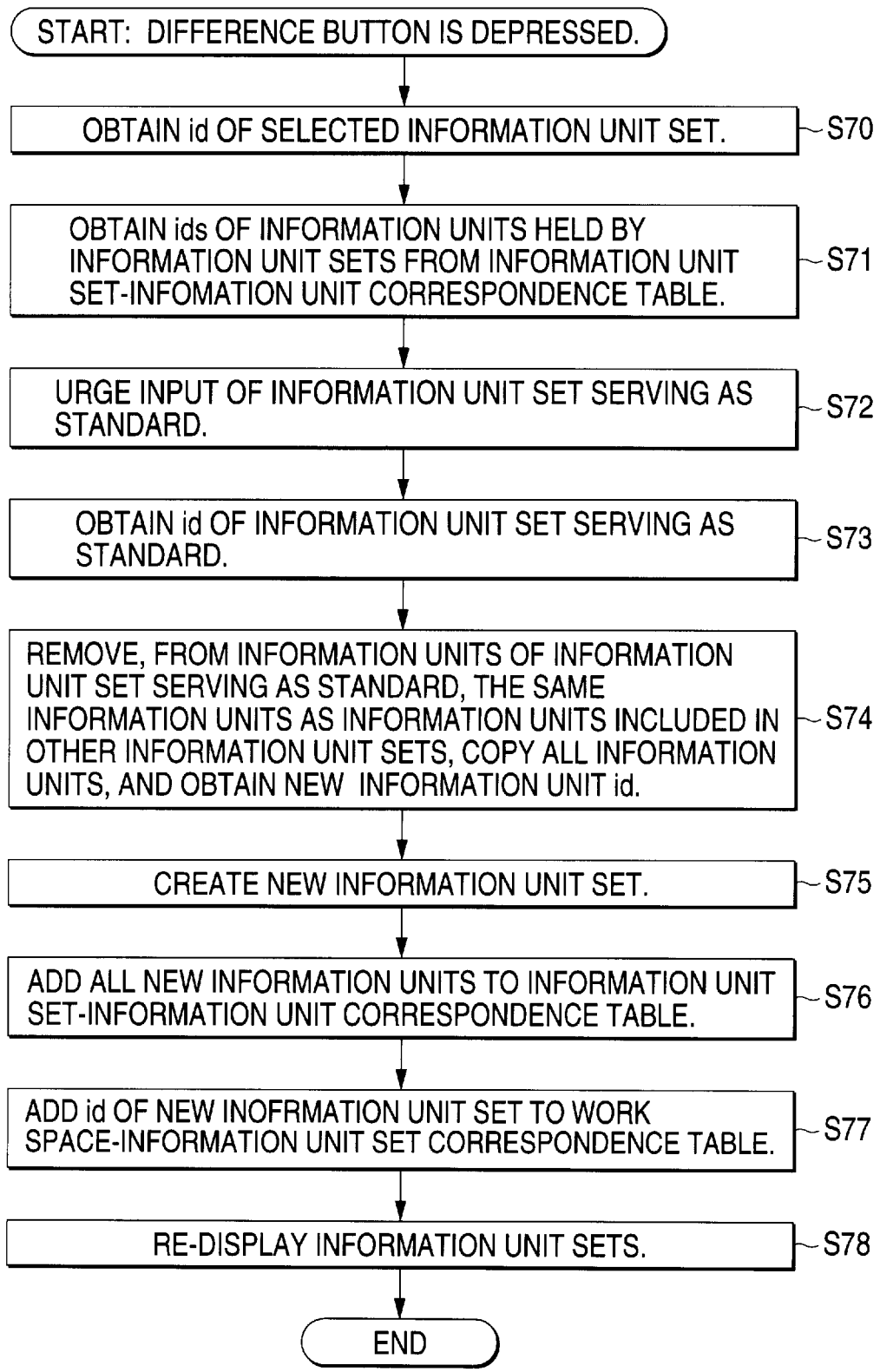
FIG. 37 is a flow chart of an example of a procedure for a difference operation processing.

Now, in FIG. 37, there is shown a procedure for a processing to be performed when a difference between the information unit sets is obtained.

At first, in the synthesis instruct screen 41 shown in FIG. 32, if some information unit sets are selected and a difference button 44 is pressed down, then, similarly to the sum set operation, the ids of the selected information unit sets are obtained (Step S70), and the ids of the information units held by the respective information unit sets are obtained from the information unit sets-information units correspondence table (Step S71).

Next, an user is urged to input the information unit sets that serve as the standard for the synthetic operation (Step S72). For example, the information unit sets checked are all output to and displayed on the display screen together with a message "which is the information unit set that serves as the standard?". In the case shown in FIG. 32, the three information unit sets "Database Patent", "Information Retrieval Patent" and "Information Common Collection" are selected and a user selects one of them and finds a difference with the user selected information unit set as the standard.

For example, when "Database Patent" is selected as the standard (Step S73), from the list of the information units ids held by the information unit set serving as the standard (that is, the newest information unit set of the "Database Patent"), there are deducted the information units that are included in the list of the information units ids held by the other information unit sets (that is, the respective newest information unit sets of the "Information Retrieval Patent" and "Information Common Collection").

And, the information units left after the above deduction are all copied and are respectively given new information units ids (Step S74). Next, a new information unit set is created (Step S75), and the information units copied and give new ids in Step S74 are all added to the information unit sets-information units correspondence table (Step S76). After then, the id of the new information unit set is added to the work spaces-information unit sets correspondence table (Step S77), and the information unit sets are displayed again (Step S78).

Next, description will be given below of a procedure of a processing to be performed when the information unit sets are filtered.

A filter condition input screen 51 shown in FIG. 33 can be displayed by pressing down a filtering button 26 in the screen shown in FIG. 31 or a filtering button in the screen shown in FIG. 32. This different manner of display of the screen divides the function of the filtering operation is divided into the following two functions:

(1) a function to filter the current information unit set when the filter condition input screen 51 is called up from the information unit set display screen shown in FIG. 31; and, (2) a function, when the information units are synthesized in the above-mentioned manner, to limit the information units to be synthesized according to the filter condition when the filter condition input screen 51 is called up from the synthesis instruct screen shown in FIG. 32.

Figure 38:
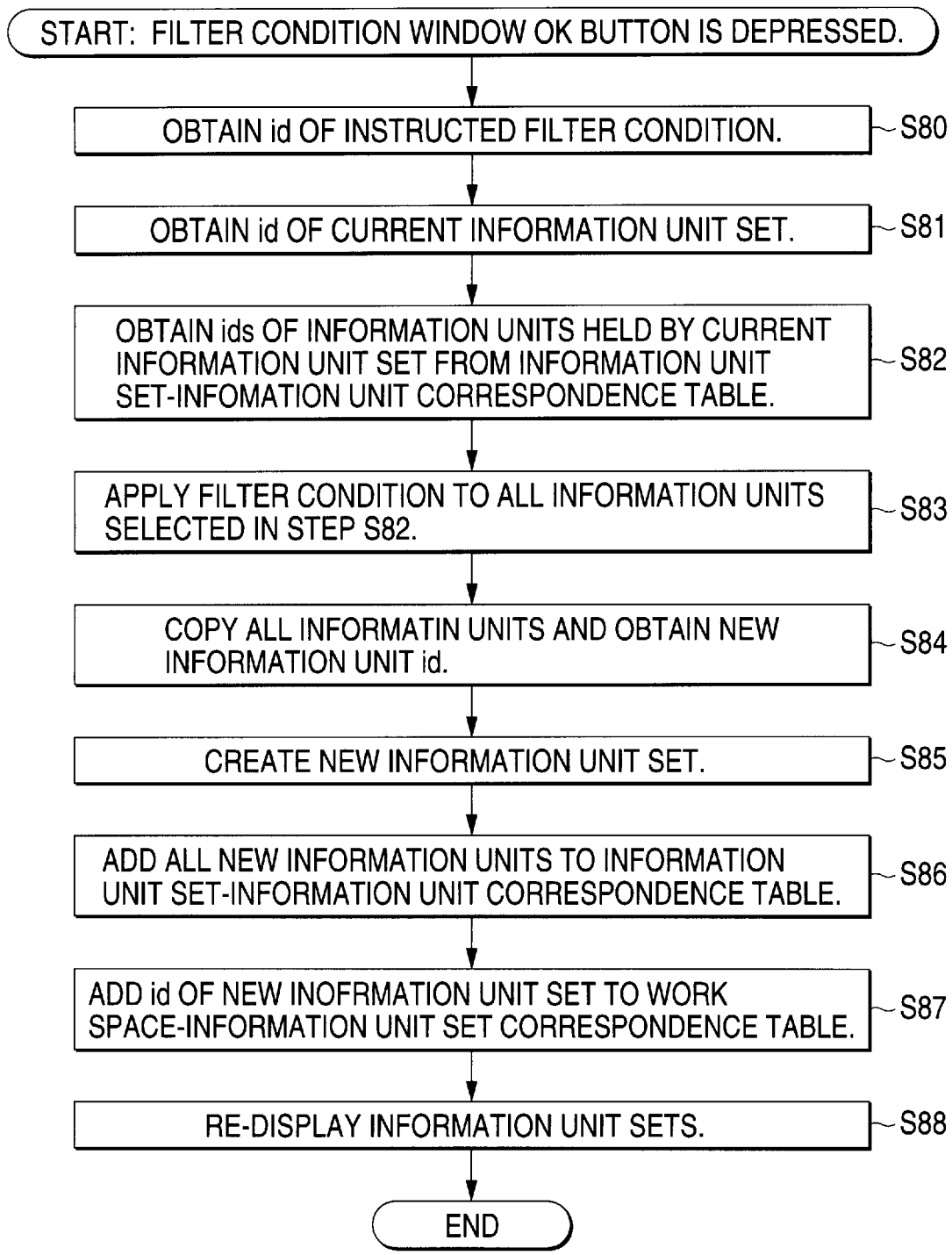
FIG. 38 is a flow chart of an example of a procedure for a filtering processing.

Now, in FIG. 38, there is shown a procedure for a filtering processing relating to the former function (1).

In particular, if an OK button is pressed down in the filter condition input screen 51 shown in FIG. 33, then there is obtained an instructed filter condition (Step S80). Next, the id of the current information unit set is obtained from the work space table (Step S81), and the ids of the information units held by the current information unit set are obtained from the information unit set-information unit correspondence table (Step S82).

And, the respective information units are checked from the viewpoint of the filer condition (Step S83). For example, if the filter condition is "Creator=Aoki", then there are selected only the information units in which the creator ids thereof are the user's name Aoki.

Next, the thus selected information units are all copied and are respectively given new ids (Step S84), a new information unit set is created (Step S85), and the information units copied and given the new ids in Step S84 are all added to the information unit set-information unit correspondence table (Step S86). After then, the id of the new information unit set is added to the work space-information unit set correspondence table (Step S87), and the information unit sets are displayed again (Step S88).

On the other hand, referring to the latter function (2), when carrying out the synthetic operation for sum set, common set and difference, the same filtering processing as in the function (1) is performed on the set that is obtained by the synthesis, thereby being able to achieve the expected operation.

Next, description will be given below of the effects of the second embodiment of the invention by use of a concrete example of a combination of the "sum set (superposition)", "common set (multiplication)", and "difference" operations with the "filtering" operation.

The "sum set (superposition)" operation is an operation to find a sum set with respect to information units which are held by a plurality of information unit sets. It is effective to use the sum set operation when a plurality of works are integrated. For example, when two patent manuscripts are being written in different work environments and they are later integrated into one patent manuscript, if a sum set is obtained from the two patent manuscripts, then different pieces of information respectively holding the states of the two patent manuscripts are merged with each other, thereby creating a new environment.

Concretely speaking, when two patent manuscripts are being written in different jobs and they are later integrated into one patent manuscript, the newest information unit set of one patent manuscript is superposed on the newest information unit set of the other patent manuscript. As a result of this, the information units in common with the two jobs are merged with the information units peculiar to each of the two jobs, that is, the information units are displayed in the merged condition.

For example, let us assume that there are available two information unit sets, that is, one is an information unit set 1={a printer, an editor, a reference patent A, a reference patent B, a reference patent C, a document under writing 1, and a document under writing 2}, and the other is an information unit set 2={a printer, an editor, a graphic tool, the reference patent A, a reference patent D, a reference patent E, a document under writing 3, a document under writing 4, and a document under writing 5}, and a writer is writing different patent manuscripts in the respective information unit sets. When the writer suddenly makes up his or her mind to integrate the two different patent manuscripts into one, then the writer can superpose the two information unit sets on each other.

As a result of the superposition, there is provided an information unit set (1+2)={the printer, editor, graphic tool, reference patent A, reference patent B, reference patent C, reference patent D, reference patent E, document under writing 1, document under writing 2, document under writing 3, document under writing 4, and document under writing 5}.

Use of this function makes it possible to synthesize the information unit sets without paying attention to which information units are used in common and which information units are peculiar.

In this case, if "application" is previously selected as the filtering condition, then there can be obtained the information unit set (1+2)*("application")={printer, editor, graphic tool}, so that applications to be used in writing a patent manuscript can be all extracted.

In the present example, description has been given of a case in which the two information unit sets are superposed on each other. However, according to the present embodiment, other examples can also be realized. For example, when ideas are under development in a plurality of spaces (by a plurality of persons) and the ideas are synthesized to thereby make up a proposal, or when literatures are under collection and comments are given to the literatures in a plurality of space (by a plurality of persons) and the literatures and comments are then summed up, it is necessary to synthesize a larger number of information unit sets. If the present function is used in this case, there can be provided much greater effects.

Now, the "common set (multiplication)" is a function to extract the secondary information units that are used in common with a plurality of snaps. For example, let us assume that several persons are writing patent manuscripts in several jobs respectively. If the snaps of these jobs are multiplied by each other, then there can be extracted the secondary information units that are necessary to write the patent manuscripts. In this manner, there can be obtained a basic environment for writing the patent manuscripts.

Here, if the above-mentioned information unit sets are multiplied by each other, then there can be extracted a new information unit set, namely, an information unit set (1*2)= {a printer, an editor, and a reference patent A}. The thus extracted information unit set can be employed a standard model for an information unit set which is used to write a new patent manuscript. For example, let us assume that a first person refers to the work space of a second person who is writing a large number of patent manuscripts. Because the work space is a work space which is used by another person, it is not easy to find which environment is suitable for the person's object. Therefore, for example, if some job names that seem to being related to a patent manuscript are selected and multiplied by each other, then it is possible to extract the know-how of the second person, such as the lowest-level environment that is always used by the second person when writing the patent manuscript, or which documents the second person always refers to, or the like. Further, the first person can create a new information unit set with the know-how reflected thereon, and can start a work there.

The "difference" function is a function to extract the information peculiar to the snaps. If the snap of a basic state is deducted from a snap in which a certain work is being done, then the information that is peculiar to the work can be sliced out.

For example, let us assume that an information unit set 3={a printer, a mail, an editor, a database, a memo pad, a watch, an idea note, and a schedule pad} is used in a normal state. And, if there are extracted information units which are peculiar to a manuscript under writing in the information unit set 3, then there is selected an information unit set (1−3)={a reference patent A, a reference patent B, a reference patent C, a document under writing 1, and a document under writing 2}. This shows that the thus selected information units, that is, the information units of the information unit set (1−3) are information units necessary to write the present patent manuscript.

With use of the above-mentioned "difference" function, during execution of mutually similar works in a plurality of jobs, when a user cannot recognize which information units are necessary for the current job, if the difference operation is executed with respect to the current job, then the essential elements of the job can be extracted and arranged in order. Also, for example, let us assume that there is present a first work environment in which the patent manuscript of a certain invention is under writing and there is also present a second work environment in which a report with the same theme as the above patent manuscript is under writing. In this case, if there is found a difference between the first and second work environments, then it is possible to know what kinds of information are peculiar to a work environment for writing the patent manuscript.

By the way, when these operations are performed, the information units are matched to each other. In this matching, whether the information units are identical with each other or not can be decided not only according to the method illustrated in the present embodiment in which the ids of the information units are checked for the identity thereof, but also according to a method in which the information unit names thereof and/or the reference objects thereof are checked for the identity thereof. Or, as a method for checking the information units for the identity thereof, there is also available a method in which several choices are given to a user and the user himself or herself selects a matching method out of the choices according to cases.

Here, description will given below of differences between the prior art and the present invention. In the conventional systems such as the folder system, the Rooms system and the like, it is necessary that a user has previously classified information according to works. On the other hand, according to the invention, while proceeding with a work, the user is able to arrange necessary information in order for each of works. Thanks to this, the information can be systematized flexibly according to the works.

Referring in particular to such information systematization, while the Rooms system holds the "current state of a plurality of work scenes", whereas the present invention stores the "state of one current work scene" and the "states of a plurality of past work scenes" separately from each other. Due to this, according to the invention, there can be provided two advantages as follows:

(1) The state of the current work scene can be stored with freedom that it can be related to an arbitrarily selected work. This makes it possible that, after a work is proceeded to a certain degree, the state of the present work can be retained with the selection information that is related to a different work from the present work.

(2) By applying a plurality of attributes to the states of the past work scenes, it is possible to change the choices of the past states that can be read out into the current work scene. For example, while the Rooms system can distinguish and store the states of the work scenes only by means of the names of "rooms". On the other hand, the present invention can previously apply the two attributes, namely, "the names of the works" and "the names of the users" to the states of the work scenes. That is, if a work is specified only by "the name of the work", then the scene of the newest work scene of the work can be used as the current state. Also, if both of "the name of the work" and "the name of the user" are used for specification, then it is possible to call up the state of the work in which the user (or another person) was executing the work.

Also, the present invention is most greatly different from the history-work space patent by Trigg et. al. in that the present invention can leave the history of a work and can thus reuse the scene of the work.

In particular, in the history-work space patent, the operation history is used to form a new work space as a list. With use of the thus formed new work space, a user can refer to the process of a work previously done, and find out the information from the history. That is, in the history-work space patent, by providing the operation history of the work as a list, the relationship between the work spaces can be shown to the user.

In the history-work space patent, as described above, there is stored the call-up relationship between the work spaces. However, in the present invention, the contents of storage are different from those of the history-work space patent and, in particular, there are stored the object operations executed on the work spaces and the states of the work spaces. That is, the present invention stores more detailed information than the history-work space patent, thereby being able to reproduce more detailed scenes. Further, this makes it possible to start a new work by making use of a past state called up.

Referring now to the invention relating to the storage of the work progress states and the reuse of the work history, the invention is different from the previous inventions in the viewpoint of the use of the history. However, when a new work environment is generated by use of the history information, the operations are reused only, but the invention does not make full use of the system and know-how of the work that can be extracted from the work history.

On the other hand, according to the present invention, the work history is not considered simply as a scene in the past, but the respective scenes in the past are considered as individual sets, whereby objects held by the scenes are classified in groups. Also, according to the invention, the related information and know-how can be referred to and can be reused and, by storing a plurality of states of the work spaces in which the same work is under way, the past states of the work and related information can be referred, or, while returning back to the past work state, a new work can be started there. That is, since the history of the operations executed on the work spaces are stored, it is possible to extract and reuse the know-how of the work, such as what information is necessary for a certain work, what information is frequently used in a certain work, what information is peculiar to a certain work, and the like.

Figure 39:
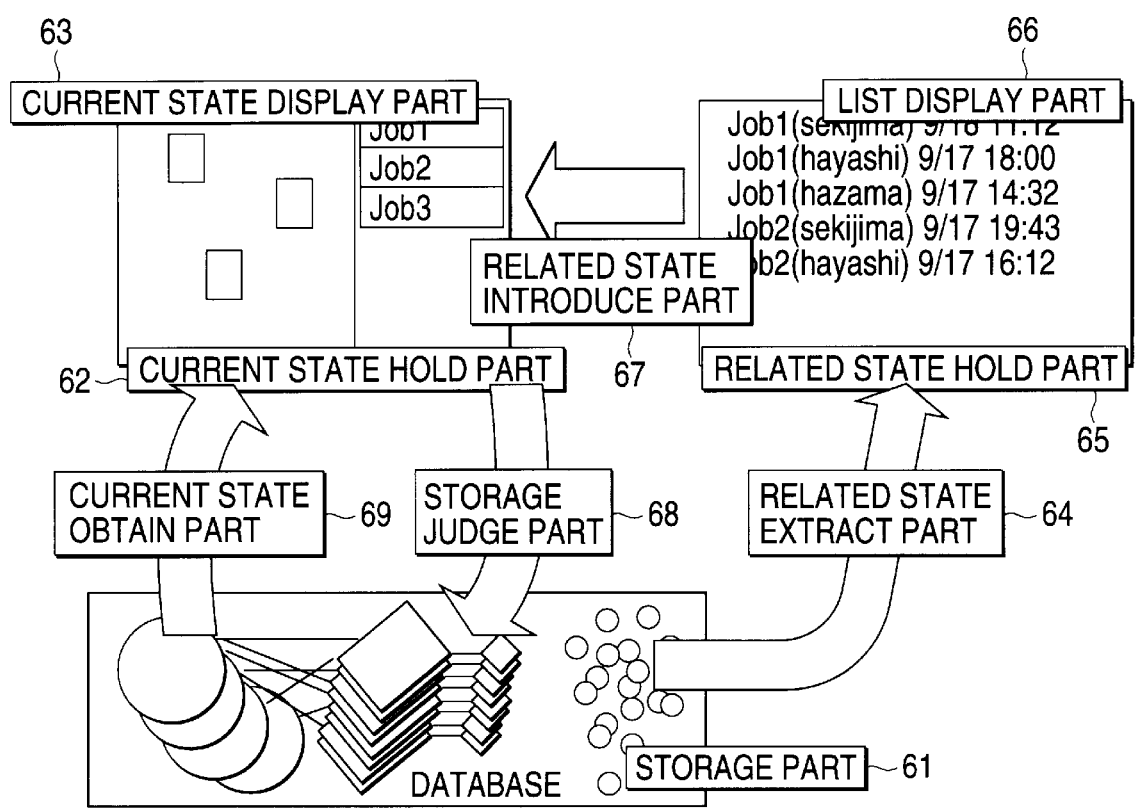
FIG. 39 is a schematic view of the structure of a third embodiment of an information processing unit according to the invention.

Now, in FIG. 39, there is shown the structure of an information processing unit according to a third embodiment of the invention. It should be noted here that the present embodiment mainly corresponds to the invention as set forth in claims 24 to 37.

The information processing unit according to the present embodiment includes a storage part 61 for storing a plurality of places which can be obtained by further collecting or setting a plurality of information unit sets, a current state hold part 62 for holding a plurality of information unit sets to be displayed together with their respective pieces of selection information, a current state display part 63 for outputting and displaying, onto a display screen, one of the information unit sets held by the current state hold part 62 which corresponds to the selection information input by a user, a related state extract part 64 for extracting from the storage part 61 the information unit set that corresponds to a previously set extract rule of the selection information, a related state hold part 65 for holding the thus extracted information unit set, a list display part 66 for outputting and displaying the list of the selection information of the thus extracted information unit set, a related state introduce part 67 for reading out a specified information unit set from the related state hold part 65 and allowing the current state hold part 63 to hold the specified information unit set, a storage judge part 68 for judging in accordance with preset rules whether the information unit set held in the current state hold part 62 is stored in the storage part 61 or not, and a current state obtain part 69 for allowing the current state hold part 62 to hold one of the places held in the storage part 61 that is selected by a user.

Here, in the present embodiment, the above-mentioned information unit is defined as an object which is called Mediator, the information unit set is defined as an object called Snap, and several snaps are collected as an object called Place.

Also, in the present embodiment, the storage 61 almost corresponds to the previously described information unit set hold history storage part 3, while the related state introduction part 67 almost corresponds to the previously described information unit set read part 5. Further, the current state hold part 62 in the present embodiment almost corresponds the information unit set hold part 14. Still further, in the present embodiment, there are provided the current state display part 63 and current state obtain part 69 as the functions of the information unit set hold part 14. And, the storage judge part 68 in the present embodiment almost corresponds to the storage instruct part 8, while the storage judge part 68 further includes the function of storage means for storing the information unit set (Snap) into the storage part 61. Also, the related state extract part 64, related state hold part 65, list display part 66, and related information specify means to be discussed later almost correspond to the information unit set select part 4 and are used to select the information unit set (Snap) that corresponds to the selection information specified by a user.

By the way, the information processing unit according to the present embodiment is structured as a server-client type in which only the storage part 61 is arranged on the server side and the remaining modules 62 to 70 are arranged on the client side, while both the server and client are composed of a workstation or a personal computer. However, the present invention is not limited to the structure which is divided into a server and a client. For example, there can be employed a structure in which the storage part 61 is also arranged on the client side and the information held by the storage part 61 is exchanged between a plurality of clients.

The above-mentioned storage part 61 is a relational database and includes database schemata such as Place, Snap, Job, Mediator, User, and IDMax which are respectively shown in FIGS. 40(a)–(f).

In particular, Place is an object which represents a place where several works are executed, while Place includes the identifier of Place (placeID), the date and time of creation of the Place (createDate), the id of a user who created the Place (user), the name of the Place (placeName), and a set of the newest states of a plurality of work environments (Snap) under execution in the Place (listSnap) in a set. For example, Place has a structure that Place={1, 'Wed Jul 10 15:00:00 JST 1996', 1111, 'Nomura home', '{1,2,6}'}.

Snap is an object which represents the state of a work environment, and Snap includes the identifier of the Snap (snapID), the date and time of creation of the Snap (createDate), the id of a user who created the Snap (user), the id of Job representing a work which is under execution in the Snap (myJob), the id of Place where the Snap was created (myplace), the set of the information units (mediators) held by the Snap, in a set. For example, Snap has a structure that Snap={1, 'Wed Jul 10 15:00:00 JST 1996', 1111, 1, 0, '{1,3,4}'}.

Job is an object which represents the kind of a work, and functions as a label for selecting Snap. Job includes the identifier of the Job (work) (jobID), the date and time of creation of the Job (createDate), the id of a user who created the Job (user), and the name of the work (jobName), in a set. For example, Job has a structure that Job={1, 'Wed Jul 10 15:00:00 JST 1996', 1111, 'CSCW survey'}. Here, even when two or more works have the same name, if they are different objects, then they are judged to be different works.

Therefore, in order to execute a work jointly in a plurality of Places, Job must be copied. In the present embodiment, such copy can be realized by introducing Snap into Place.

Now, Mediator is an object used to represent an information unit and includes the identifier of Mediator (mediatorID), the date and time of creation of the Mediator (createDate), the name of the Mediator (myName), a reference destination address such as URL (Uniform Resource Locators) pointed by the Mediator (myLocation), a memo held by the Mediator (myMemo), an X coordinate for representing the Mediator (myMX), and a Y coordinate for representing the Mediator (myMY), in a set. For example, Mediator is structured such that Mediator={1, 'Wed Jul 10 15:00:00 JST 1996', 1111, 'report draft', 'http://abc.www.abcdef.co.jp/', 'This is the first draft of the report. (nomura)', 1, 3}.

Now, User is an object used to represent a user and includes the identifier of the User (userID), the date and time of creation of the User (createDate), the name of a user who created the User (UserName), the password of the user (password), and the identifier of home Place (homePlace), in a set. For example, User is structured such that User={1111, 'Wed Jul 10 15:00:00 JST 1996', 'nomura', '******', 1}. Here, the home Place means Place which is mainly used by the user, for example, it is a Place which is opened when the user logs in the present system, or which provides the destination of delivery of a Mediator when the Mediator is delivered to the user from an external system by an electronic mail or the like.

Now, IDMax is a table which, even when a plurality of clients create any one of Place, Snap, Job, and Mediator at the same time, allows the ids of the created objects (id: identifier which is used herein to mean a label representing the uniqueness of an object) to consist with themselves within the database. For example, IDMax is structured such that IDMax={3, 12, 7, 23}.

Referring here to the maintenance of such consistency, for example, when a client creates one Mediator, at first, the client performs a processing to set the Mediator as a provisional one. The id is in the first place used to restore a relationship between objects when the objects are created by reading in from the database. Within the same session of the client, since reference to Mediator and the like is executed in the unit of objects, the id is not necessary, that is, it is necessary that an id is allocated to an object only when storing the object into the database.

Accordingly, when a storage instruction is given to the database by a user, the client searches all the Mediators within the Place that is opened, knows the number of Mediators newly created, obtains the value (in this example, 23) of the "mediator" of IDMax, and updates this value into a number consisting of the sum of this value and the number of Mediators newly created. That is, after an id is reserved in advance, the id is actually allocated and stored. Due to this, even if a plurality of clients create objects at the same time, there is no possibility that the ids of the objects can be butted against each other.

However, a method for deciding an id is not limited to the above-mentioned method but, for example, it is also possible to employ a method in which parameters such as the date and time of creation, user ids and the like are combined together to thereby compute an id dynamically.

Figure 41A:
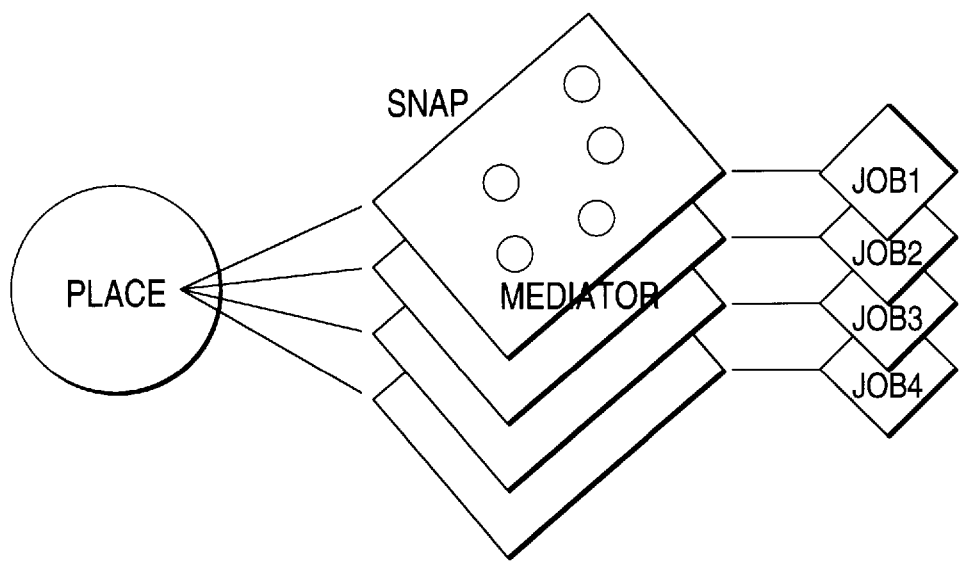
FIGS. 41A and 41B are views to explain a data structure.
Figure 41B:
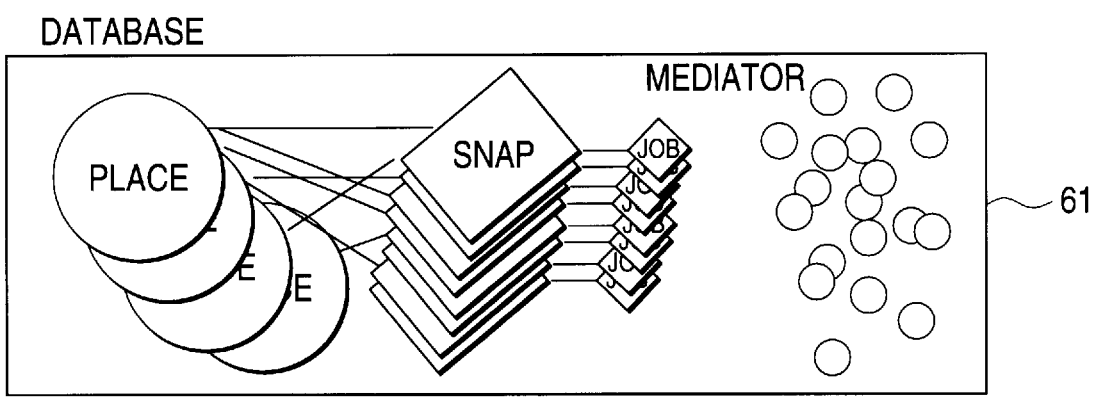

Now, data consisting of the above-mentioned Place, Snap, Job, and Mediator are held in the current state hold part 62 in such a model structure as shown in FIG. 41(*a*). That is, data are held in the current state hold part 62 in Places, and data in Places are shown to a user.

Here, a Place holds the states of a plurality of works which are being executed in the Place and, as the data structure, holds a plurality of Snaps or indicates them by use of a pointer. By the way, the respective Snaps indicate Jobs and, as a result of this, a Place also indicates a plurality of Jobs.

On the other hand, within the storage part 61 (database), Place, Snap, Job, and Mediator are managed separately from each other, while they are connected with each other through their ids.

Figure 42:
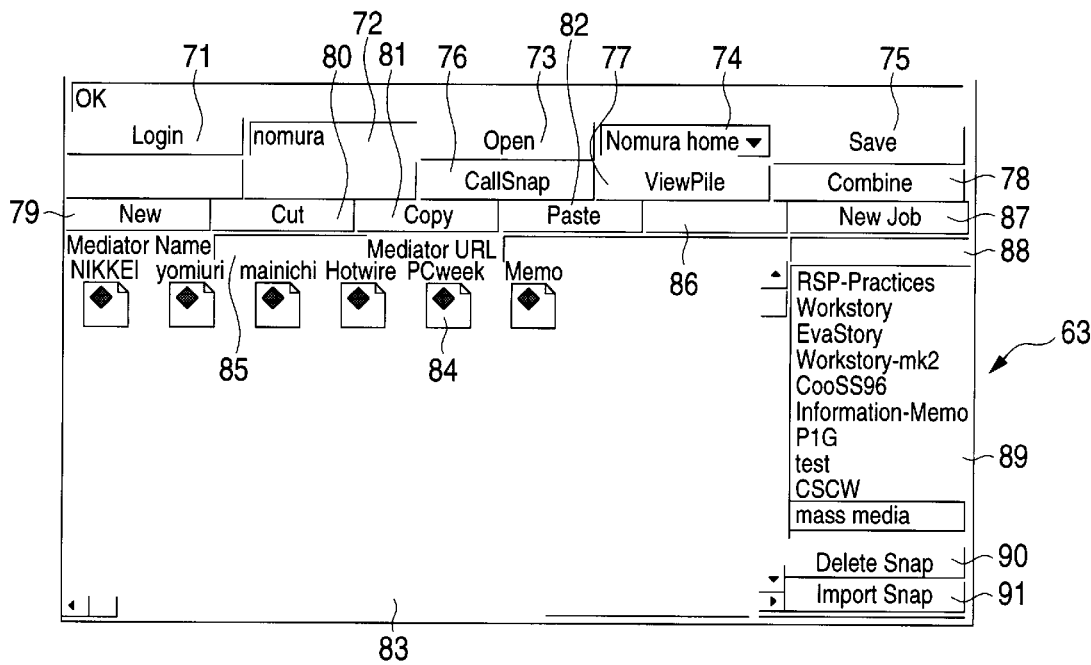
FIG. 42 is a view of an example of a display of a main screen.

The above-mentioned current state display part 63, in the present embodiment, includes such a display screen as shown in FIG. 42, while the current state display part 63 serves not only as the output and display part of the present embodiment but also as an interface for accepting an input from a user. The present screen has the following functions.

After a log-in name is input into a log-in field 72, if a log-in button 71 is pressed down, then a log-in operation is executed, with the result that the home Place of the user is displayed as the default of a Place selection menu 74.

Also, if an open button 73 is pressed down, then a Place selected by the Place selection menu 74 is opened, a Job specified by the opened Place is display in the job list, the set of Mediators held by the Snap that specifies the leading job of the job list is displayed on a snap view.

The list of all the Places that can be selected is displayed on the Place selection menu 74 and, by selecting one of them, the user can open an arbitrary Place on the screen.

Figure 44:
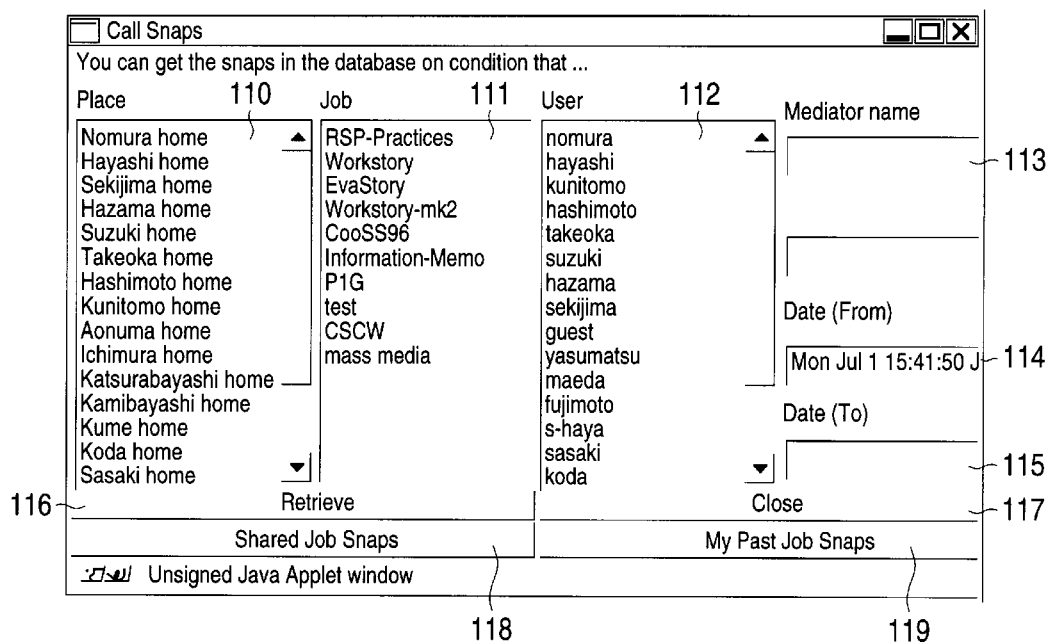
FIG. 44 is a view of an example of a retrieval instruct screen for extraction of related states.

If a Save button 75 is depressed, then there is given an instruction to the effect that all the information updated after the Place was opened are written into and stored in the database 61. Also, if a CallSnap button 76 is pressed down, then a window shown in FIG. 44 is called up and displayed on the screen. In this window, the user gives an instruction to extract the Snaps stored in the database 61.

Figure 43:
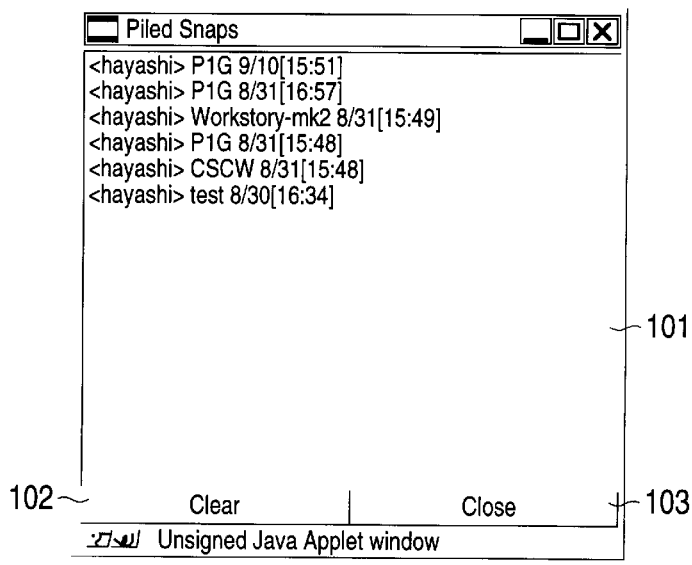
FIG. 43 is a view of an example of a screen for displaying a list of Snaps respectively held as related states.

And, if a ViewPile button 77 is depressed, then a related state window shown in FIG. 43 is called up and displayed on the screen. In this window, there is displayed the list of the attributes of the Snap set held by the related state hold part 65.

If a Combine button 78 is pressed down, then a window shown in FIG. 59 (which will be discussed later) is called up and displayed on the screen. In this window, if the user inputs an instruction to synthesize a plurality of Snaps, as will be described in a fourth embodiment (which will be discussed later) according to the invention, a given set operation processing is then executed in accordance with the instruction.

And, if a New button 79 is depressed, then there is executed a processing to create a new Mediator and, in this new Mediator creating processing, characters respectively written in the Mediator name field and URL field are read and, after then, there is executed a processing to set the thus read characters as the attributes of the new Mediator.

Also, if a Cut button 80 is pressed down, then the Mediator is removed from the Snap to be currently processed and, further, if a Copy button 81 is depressed, then the Mediator is held in a copy buffer.

If a Paste button 82 is pressed down, a Mediator that is Cut or Copied is pasted and the Cut or Copied Mediator is Pasted on the same coordinates as the X, Y coordinates where it was originally. However, if another Mediator is already present on the coordinates, the Mediator to be pasted is arranged at the next position on the right side thereof; and, if still another Mediator is already present at this position, the Mediator is arranged at the further next position on the right side thereof. If this operation is repeatedly executed and, as a result of this, the operation reaches the right end of the display screen, then the Y coordinate is carried up by one and the X coordinate is moved back to the left end of the display screen, where the same operation is repeated again, thereby arranging the Mediator at a vacant position.

A snap view 83 is an area in which the Mediators can be displayed by icons 84. That is, in the snap view, there are displayed the Mediators held by the Snap that indicates the Job selected in a job list 89. The displayed Mediators are selected or the memos or references thereof are referred to by a pointing device such as a mouse. Also, the Mediators can be moved by dragging and dropping the pointing device.

A Mediator icon 84 is an icon for representing a Mediator and the display of the icon is changed according to the kinds of references. For example, in the Windows (a registered trademark of Microsoft Inc.), a given extension element is allocated to each of formats such as ". txt" and the like and, therefore, different icons can be displayed for the individual formats. Also, a line of characters of URL may be parsed. That is, if it is found an in-house URL, then an in-house document icon may be used and, if it is found an external URL, then an external document icon may be used.

A Mediator name field 85 is an area in which the name of a Mediator selected in the snap view 83 is displayed, while an URL field 86 is an area in which the URL of a Mediator selected in the snap view 83 is displayed.

If a NewJob button 87 is depressed, then there is executed a processing to create a new Job having a name (a line of characters) input to A NewJob name field 88 by a user. Here, a Snap representing this new Job can be created by copying a Snap which is selection displayed when the NewJob button 87 is depressed. Due to this, when a work is derived, or when a user takes over another person's work, the user is able to create a different work environment while leaving the work environment of the previous Job as it is.

A job list 89 is an area in which all the Job names indicated by the Place that is opened on the screen are displayed and, in the job list 89 area, if a user selects one Job by means of a pointing device such as a mouse or the like, then the Snap that is displayed in the snap view 83 can be switched. By the way, such Job selection allows the user to execute a plurality of works in parallel with each other.

If a DeleteSnap button 90 is pressed down, then there is executed an instruction to delete a Snap indicating the Job that is selected in the job list 89 from this Place. And, if an ImportSnap button 91 is depressed, then there is issued an instruction to introduce one related state Snap selected in the related state list window shown in FIG. 43 into this Place.

The above-mentioned related state hold part 65 holds the set of Snaps as related states and, if the Snaps are retrieved from the database 61 by the related state extract part 64, then the related state hold part 65 adds these Snaps one after another to the Snap set and holds them. Here, in the present embodiment, since there are held the objects of the Snaps, if a user specifies one of the objects by means of a pointing device in the list display part 66, then the set of Mediators held by the present Snap are displayed in the snap view 89. Also, as will be discussed later, if it is judged that the state of the present Snap just before it is updated by the current state hold part 65 is to be stored, then the present Snap is moved to the related state hold part 65 and there is erected a flag "isModifiedFlag" which shows that the Snap is updated; and, if a Save button 75 is depressed, then there is performed a processing to store it into the database 61 at a time.

The list display part 66 displays such a screen as shown in FIG. 43 and, on the screen, displays a list of the attributes (selection information) of the Snap set held in the related state hold part 65.

That is, the list display portion 101 of the present screen is an area in which the selection information of the Snap set is displayed in the form of a list and, if a user selects one of items in this list using a mouse or the like, then the selected Snap can be displayed in the snap view 83 shown in FIG. 42.

By the way, in this example, as the selection information of the Snap set, there are displayed the name of a user who created the Snap, a job name, and the date and time of creation of the Snap.

And, if a Clear button 102 is pressed down, then there is performed a processing to clear all the Snaps that are held by the related state hold part 65 and are displayed in the list display part 66. Also, if a Close button 103 is depressed, then there is executed a processing to make the present window (FIG. 43) invisible to the user. However, even when the window is Closed in this manner, the hold contents of the related state hold part 65 will never be reset.

The related state introduce part 67 selects one of the Snaps held by the related state hold part 65 from the Snap list displayed in the list display part 66 and, if the ImportSnap button 91 on the screen of the current state display part 63 is depressed, then the selected Snap is started. And, the related state introduce part 67 executes a processing to allow the current state hold part 62 to hold the selected Snap (which processing will be described later in detail), thereby making it possible to change a Snap which is regarded as a current state.

The storage judge part 68 judges whether the state of a Snap just before the content thereof is changed is stored or not, when the elements (individual Mediators) of a Mediator set indicated by the Snap held in the current state hold part 62 increase or decrease in number, or when a user gives an instruction to refer to or copy the Mediator. If it is judged that the state is to be stored, then the state of the Snap just before the content thereof is changed is stored in the database 61, thereby allowing the past work to be restored and the like.

The current state obtain part 69, when a Place is opened on the screen, reads out all the Snaps indicated by the Place from the database 61, further reads out the Jobs that are indicated by the respective Snaps, further reads out all the Mediators that are indicated by the respective Snaps, and executes a processing to create objects from the Mediators. Also, the current state obtain part 69 carries out a processing to allow the current state hold part 62 to hold the thus created objects, whereby a Snap to be used as a current state can be output and displayed onto the current state display part 63.

The related state extract part 64 extracts, from the data that are stored in the database 61, the data that is identical with the selection information specified by the user, and allows the related state hold part 65 to hold the thus extracted data. In order to execute the data extract processing, the related state extract part 64 displays such a window screen as shown in FIG. 44 and, on the present screen, the user gives a retrieval instruction for extraction of the related state. And, the respective parts of the present screen have the following functions.

That is, a Place selection list part 110 is an area for displaying a list of Place names as a retrieval condition for extraction of the related state and, in the Place selection list part 110, the user selects the desired Place in the Place name list using specifying means such as a mouse or the like.

A Job selection list part 111 an area for displaying a list of Job names as a retrieval condition for extraction of the related state, and, in the Job selection list part 110, the user selects the desired Job in the Place name list using specifying means such as a mouse or the like.

By the way, in the present embodiment, there is displayed in the list only the Job that is indicated by the Snap indicated by the Place opened on the screen when the CallSnaps button 76 is depressed. Here, it does not matter if the Jobs belonging to the other Places are listed. In this case, although the number of the Jobs displayed is very large, the Jobs of the currently opened Place may be given preference over the others, for example, they may be displayed high in the list.

A User selection list part 112 is an area for displaying a list of User names as a retrieval condition for extraction of the related state and, in the User selection list part 112, the user selects a desired User in the list using specifying means such as a mouse or the like.

And, a Mediator name input field 113 is a field for inputting Mediator names as a retrieval condition for extraction of the related state and, in the Mediator name input field 113, the user inputs a desired Mediator name using specifying means such as a key board or the like.

Also, a Date (From) input field 114 is a field for inputting the start of the date and time of creation of a Snap as a retrieval condition for extraction of the related state and, in the Date (From) input field 114, the user inputs the desired date and time using specifying means such as a key board or the like.

On the other hand, a Date (To) input field 115 is a field for inputting the end of the date and time of creation of a Snap as a retrieval condition for extraction of the related state and, in the Date (To) input field 115, the user inputs the desired date and time using specifying means such as a key board or the like. Therefore, a Snap, which is created (in a period) between the dates and times respectively input by the Date (From) input field 114 and Date (To) input field 115, is retrieved by the related state extract part 64.

If a Retrieve button 116 is depressed, then the retrieval of the Snap from the database 61 is started in accordance with the above-mentioned condition (selection information) and, if a Close button 117 is pressed down, then the present window is closed.

And, if a SharedJobSnaps button 118 is depressed, then there is executed a processing which, with respect to the Job that is indicated by the currently opened Place, retrieves the newest Snap indicating the present Job of another user who has the same Job in common. This retrieve processing will be described later in detail.

If a MyPastSnaps button 119 is pressed down, then there is carried out a processing in which, except for the Jobs indicated by the currently opened Place, with respect to all the Jobs that were executed in the present Place in the past, the newest Snaps indicated by the respective Jobs are retrieved. This retrieve processing will also be described later in detail.

Next, description will be given below of the operation of the information processing unit according to the present embodiment.

At first, description will be given of a timing for storing a work environment (Snap) into the database 61 (that is, the operation of the storage judge part 68).

Figure 45:
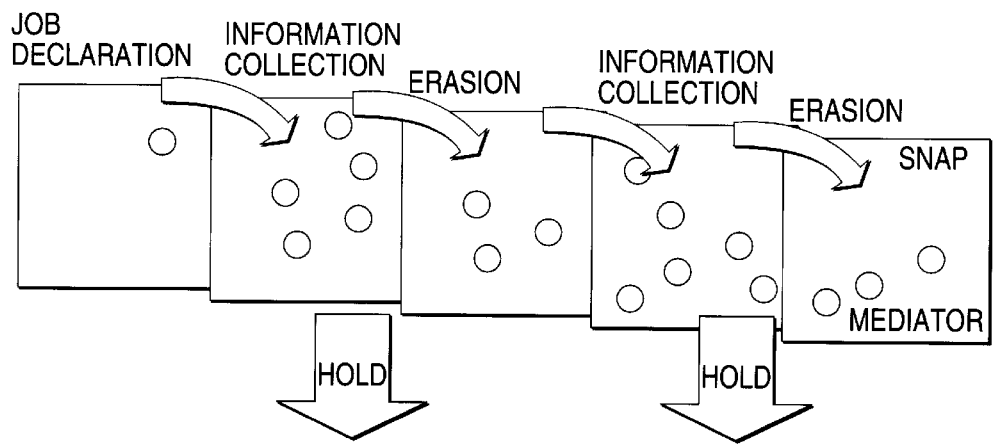
FIG. 45 is an explanatory view of timings for storage of work environments.

As shown in FIG. 45, if a work is started (Job declaration), then information is collected, that is, various pieces of information (Mediator) are collected into the work environment (Snap). On the other hand, some information can be erased from the work environment according to cases and such information erasure can be considered as a timing for switching the work, for example, a timing for straightening up a desk.

Accordingly, when the Mediators on the Snap are changed from an increase to a decrease in number, the Snap before such change is stored into the database 61, whereby the state of a work at a stopping point thereof can be stored and reused again. Also, by employing algorithm relating to this state storage, it can be guaranteed that all the Mediators can never vanish. Therefore, the user can delete, without hesitation, the information that becomes unnecessary at a certain time from the work environment. As a result of this, there is eliminated the need to leave the information in case it is used afterwards, which in turn lightens the work burden of the user.

Figure 46:
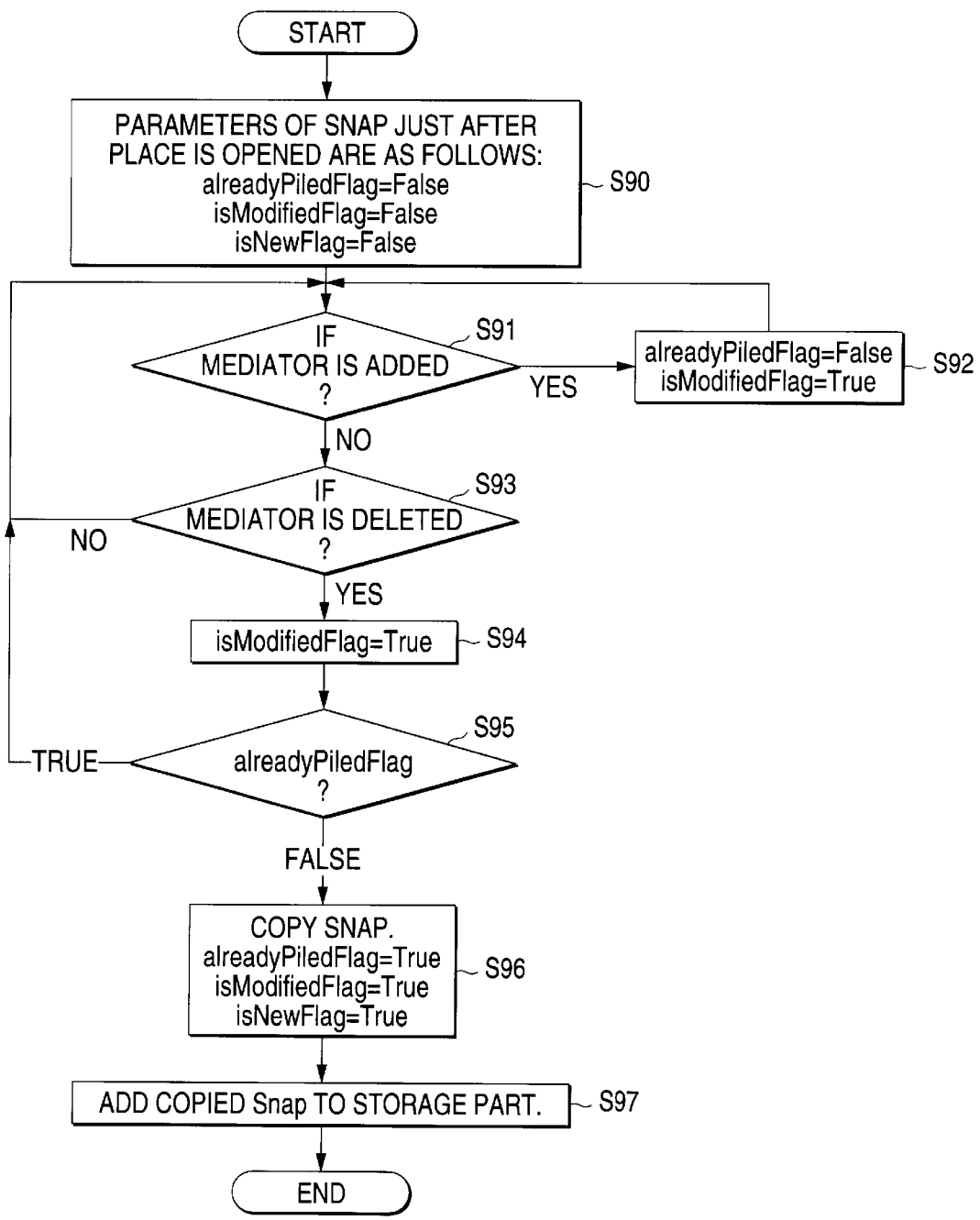
FIG. 46 a flow chart of a procedure for a storage timing processing.

Here, description will be given below in more detail of the processing relating to the storage timing by the storage judge part 68 with reference to a flow chart shown in FIG. 46.

Each of the Snaps of a Place includes three Flag parameters, that is, "alreadyPiledFlag" showing whether the Snap is already stored or not, "isModifiedFlag" showing whether Mediators held by the Snap have changed or not, and "is NewFlag" showing whether the Snap has been stored or not after it was newly created. The storage judge part 68 manages such parameters with respect to all the Snaps that are held by the current state hold part 62 (Step S90). Here, each of the Snaps, just after the Place is opened, includes state Flag parameters such as alreadyPiledFlag=False, isModifiedFlag=False, isNewFlag=False, and the like.

Next, it is judged whether a Mediator is added to the Snap or not (Step S91). If it is found added, then the Flag parameters of the Snap are changed to alreadyPiledFlag=False and isModifiedFlag=True (Step S92). That is, this expresses that, although the Flag parameter of the Snap was alreadyPiledFlag=True once, if a Mediator is added after then, then the state of the Snap becomes different from the state in which the Snap was stored before.

On the other hand, if it is found not added, it is judged whether a Mediator is deleted or not (Step S93) and, if it is found deleted, then the Flag parameter of the Snap is changed to isModifiedFlag=True (Step S94). In this case, the parameter alreadyPiledFlag is not changed.

After the Mediator is deleted in this manner, it is checked whether the storage of the Snap is executed or not, that is, it is checked whether "alreadyPiledFlag" is True or not (Step S95). If it is found True, then it means that the Snap has been already stored and, therefore, the Snap storage processing is not executed. On the Other hand, if it is found False, then it is necessary to store the state of the Snap just before the Mediator was deleted, that is, the Snap is copied (Step S96) and the copied Snap is stored into the database 61 (Step S97).

Here, the Snap stored into the database 61 is then processed by the related state extract part 64, so that the Snap can be held by the related state hold part 65. Also, in the above-mentioned copy processing (Step S96), the Flag parameters of the Snap just before copied are set for alreadyPiledFlag=True, isModifiedFlag=True, and isNewFlag=True.

Figure 47:
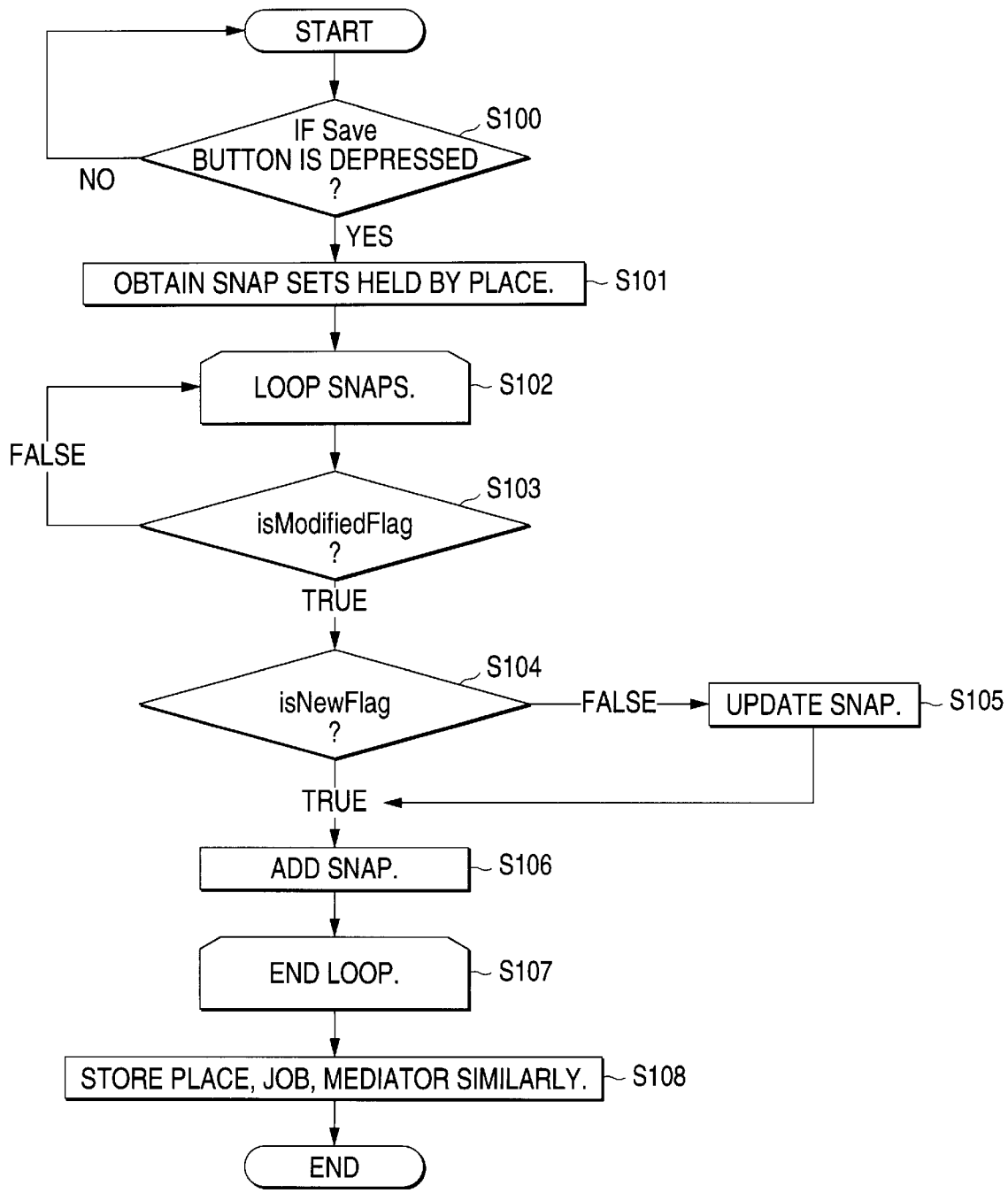
FIG. 47 a flow chart of a procedure for a processing for storing Snaps, Places, Jobs, and Mediators into a database.

Next, description will be given below of a processing in which the storage judge part 68 stores updated data into the database 61 with reference to a flow chart shown in FIG. 47.

If the Save button 75 is depressed and the storage judge part 68 receives a database storage instruction (Step S100), then it obtains the set of the Snaps indicated by the currently opened Place (Step S101). And, the respective Snaps are looped sequentially (Step S102), thereby checking the respective Snaps for their "isModifiedFlag" (Step S103).

As a result of this check, if it is found False, then the loop check continues as it is and, on the other hand, if it is found True, then "isNewFlag" is further checked (Step S104).

If it is found that "isNewFlag" is False, then the database 61 is updated with respect to the present Snap (Step S105). On the other hand, if "isNewFlag" is found True, then it means that the Snap is a new Snap and, therefore, this Snap is added to the database 61 (Step S106).

The above-mentioned series of processings are executed repeatedly by looping the Snaps until checking of all the Snaps is completed (Step S107). Further, the currently opened Place, Jobs and Mediators are similarly checked and stored (Step S108). For reference, referring to the ids of objects when they are to be retained, the above-mentioned processings are performed on the schemata of an IDMax.

Next, description will be given below of a retrieval processing to be performed by the related state extract part 64.

Figure 48:
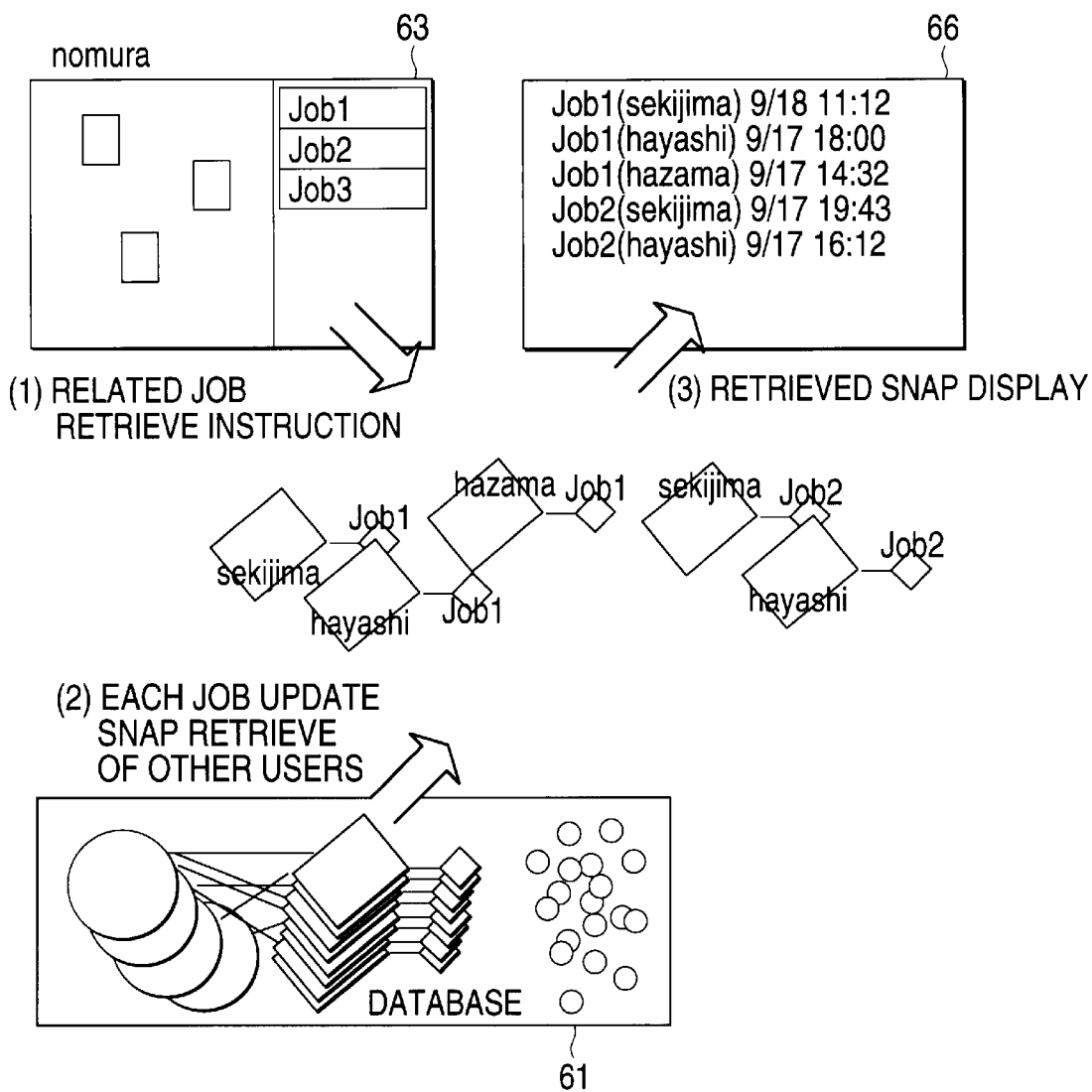
FIG. 48 is an explanatory view of a retrieve processing in which a user extracts the work environments of the works of other users related to the work of the present user.

While a user is executing a work, there sometimes arises the need to extract the work environment of a work related to the work of the user. As an example of this, in FIG. 48, there is shown a case in which, in a scene that a user nomura has three Jobs, that is, Job1, Job2 and Job3, there is issued an instruction to retrieve related Jobs. By issuing this instruction, the newest Snaps of other users related to the respective Jobs, that is, Job1, Job2 and Job3 are retrieved from the database 61 by the related state extract part 64. And, the thus retrieved Snaps are then held by the related state hold part 65 and the list of them is shown on the list display part 66.

Figure 49:
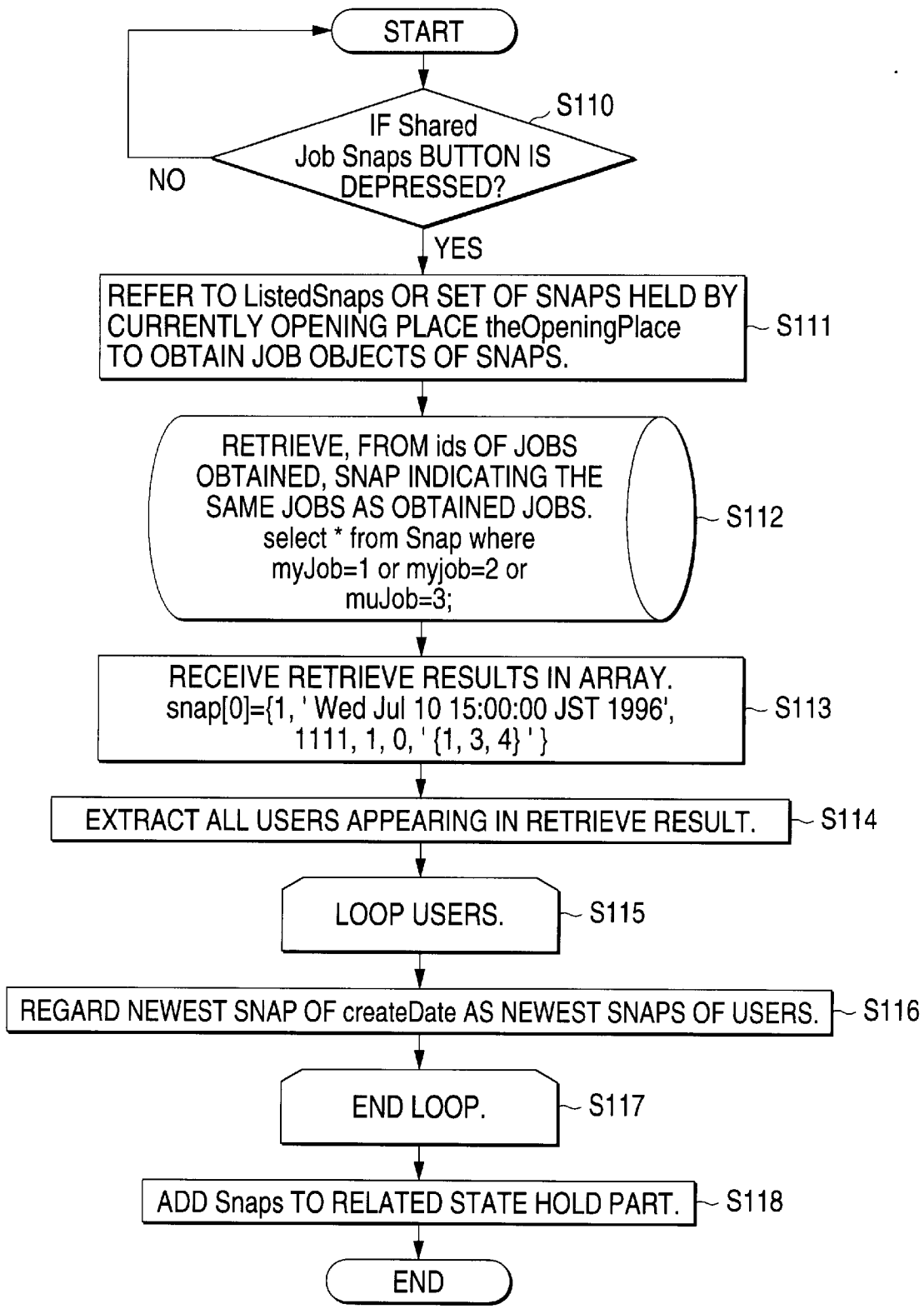
FIG. 49 is a flow chart of a procedure for a related environment extract processing.

Now, description will be given below in more detail of this extract processing with reference to a flow chart shown in FIG. 49.

At first, if a SharedJobSnaps button 118 is depressed (Step S110), then "listedSnaps", which is a set of Snaps held by the currently opened Place (that is, theOpeningPlace), is referred to to thereby obtain the Job objects of the respective Snaps (Step S111). And, from the ids of the thus obtained Jobs, there are retrieved a Snap which indicates the same Jobs as the obtained Jobs (Step S112). Here, a retrieval equation to be used in this retrieval can be expressed, for example, by using an SQL statement in such a manner that select * from Snap where myJob=1 or myJob=2 or myJob=3.

And, the related state extract part 64 receives the retrieval results in an array or the like (Step S113) and extracts all the users that appear in the retrieval results (Step S114). By the way, the retrieval results are data such as snap[0]={1, 'Wed Jul 10 15:00:00 JST 1996', 1111, 1, 0, '{1, 3, 4}'.

After then, the related state extract part 64 loops the retrieval results according to the users (Step S115), picks up a Snap having the newest "createDate", and decides this Snap as the newest Snap of the respective users (Step S116). At the time when the above-mentioned loop processings are all ended (Step S117), all the extracted Snaps are additionally stored into the related state hold part 65, and the list display part 66 is allowed to display the extracted Snaps (Step S118).

Next, description will be given below of a processing to be executed by the related state extract part 64 for retrieving a work executed previously.

Figure 50:
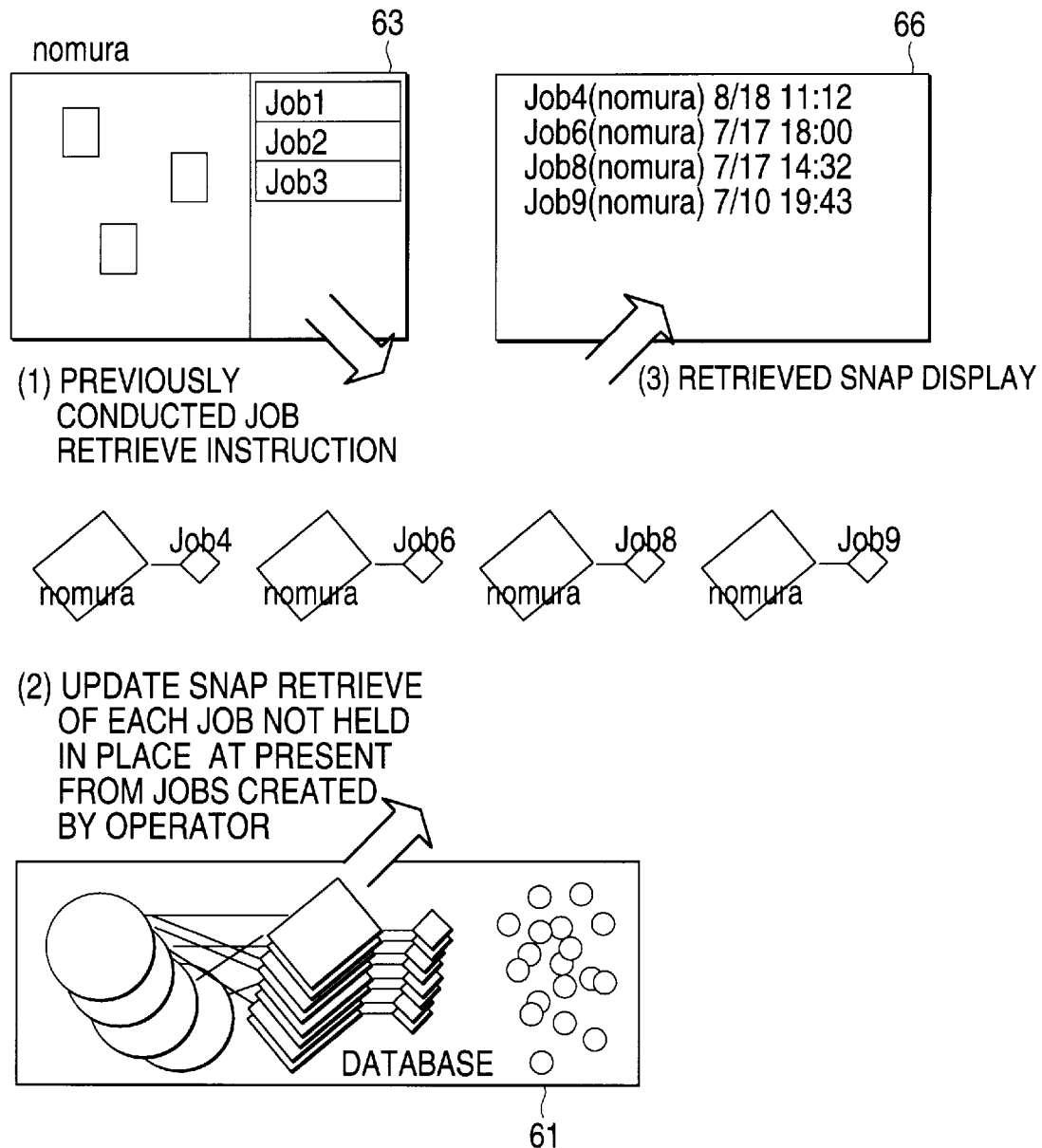
FIG. 50 is an explanatory view of a retrieve processing in which a user extracts the work environments of the work that the present user executed in the past.

While a user is executing a work, sometimes, there arises the need to extract (reproduce) the work environment of a work executed previously. As an example of this, in FIG. 50, there is shown a case in which, in the scene where a user nomura has three Jobs, that is, Job1, Job2, and Job3 as the current states, there is issued an instruction to retrieve a previously executed Job. By issuing this instruction, out of all the Snaps that were created by the user nomura, the newest Snaps related to all the Jobs except for Job1, Job2 and Job3 are retrieved from the data base 61 by the related state extract part 64. And, the retrieved Snaps are then held in the related state hold part 65 and a list of the retrieved Snaps is displayed on the list display part 66. Due to this, the user can have a look at what other works the user executed in the past.

Figure 51:
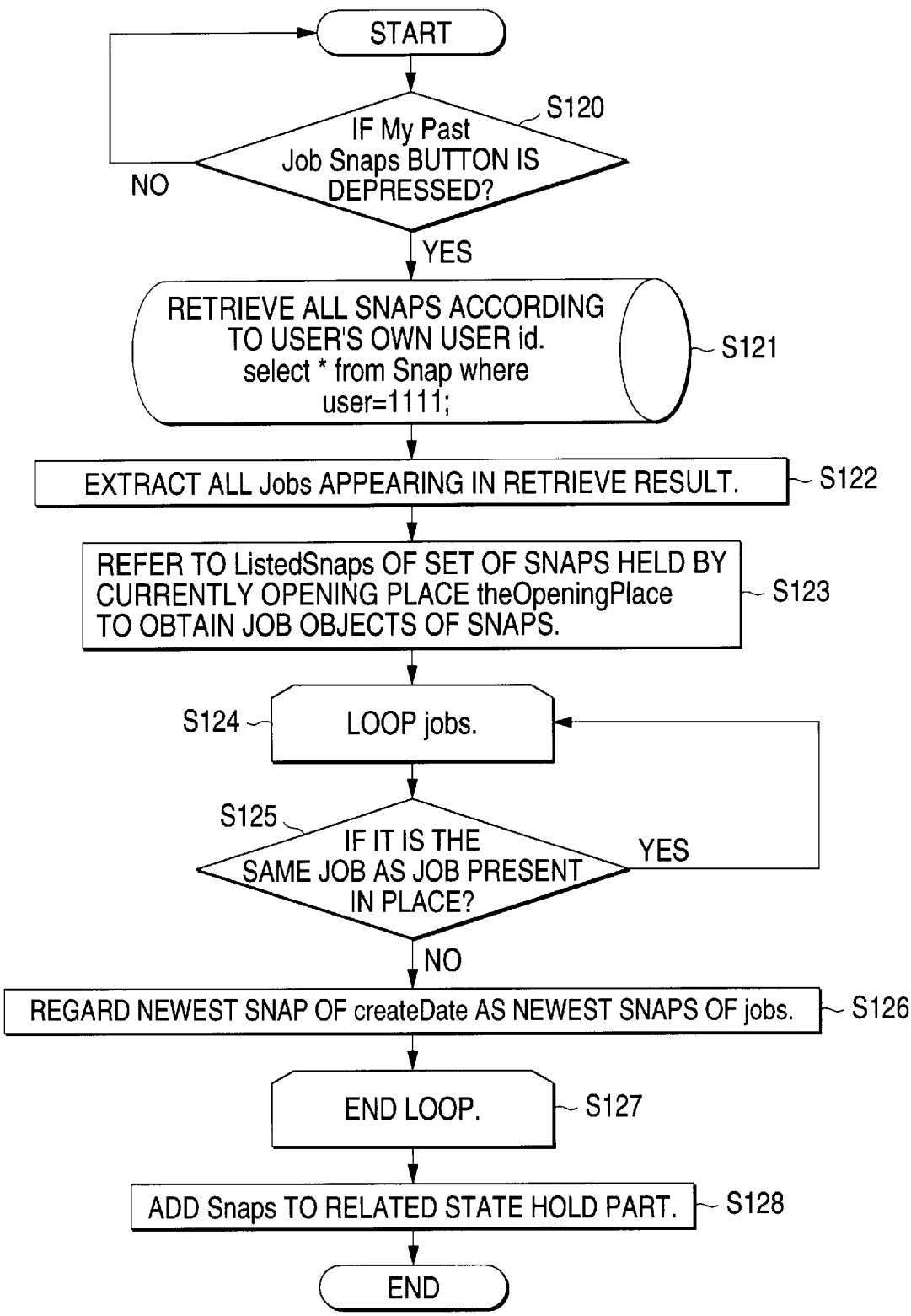
FIG. 51 is a flow chart of a procedure for an environment extract processing in which a user extracts the work environments of the work that the present user executed in the past.

Now, description will be given below in more detail of this retrieval processing with reference to a flow chart shown in FIG. 51.

At first, if a MyPastJobSnap button 119 is pressed down (Step S120), then the Snaps stored in the database 61 are retrieved by means of the user id of the user (in this example, the id of a user nomura, that is, "1111") (Step S121). In this case, as a retrieval equation, for example, there is used an SQL statement, "select*from Snap where user=1111".

And, on receipt of the retrieval results, the related state extract part 64 extracts all the Jobs that appears in the retrieval results (Step S122), and further refers to "listedSnaps" which is a set of Snaps held by the currently opening Place (theOpeningPlace), thereby obtaining the Job objects that are indicated by the respective Snaps (Step S123).

Next, the respective Jobs are individually looped (Step S124) to thereby check whether the Snaps of the Jobs are identical with the job indicated by the Snap in the currently opening Place (that is, the Job Snaps are identical with any one of the Jobs1, 2, 3) (Step S125). As a result of this, if it is found identical, then nothing is executed but the looping operation is repeated and, on the other hand, if it is found that they are not identical with any one of the Jobs1, 2, 3, then, a Snap having the newest data of creation (createDate) is regarded as the newest Snap in each of the Jobs (Step S126).

And, at the time when the above-mentioned loop processings are all ended (Step S127), all the extracted Snaps are additionally stored into the related state hold part 65 and they are also displayed on the list display part 66 (Step S128).

Next, description will be given below of an introduction processing to be performed by the current state introduce part 67.

While a user is executing a work, sometimes, there arises the need to share a job in common by introducing a related state into a current state. In the present embodiment, the sharing of a Job (that is, collaboration) can be realized by introducing a Snap from the related state hold part 65 into the current state hold part 62.

Figure 52:
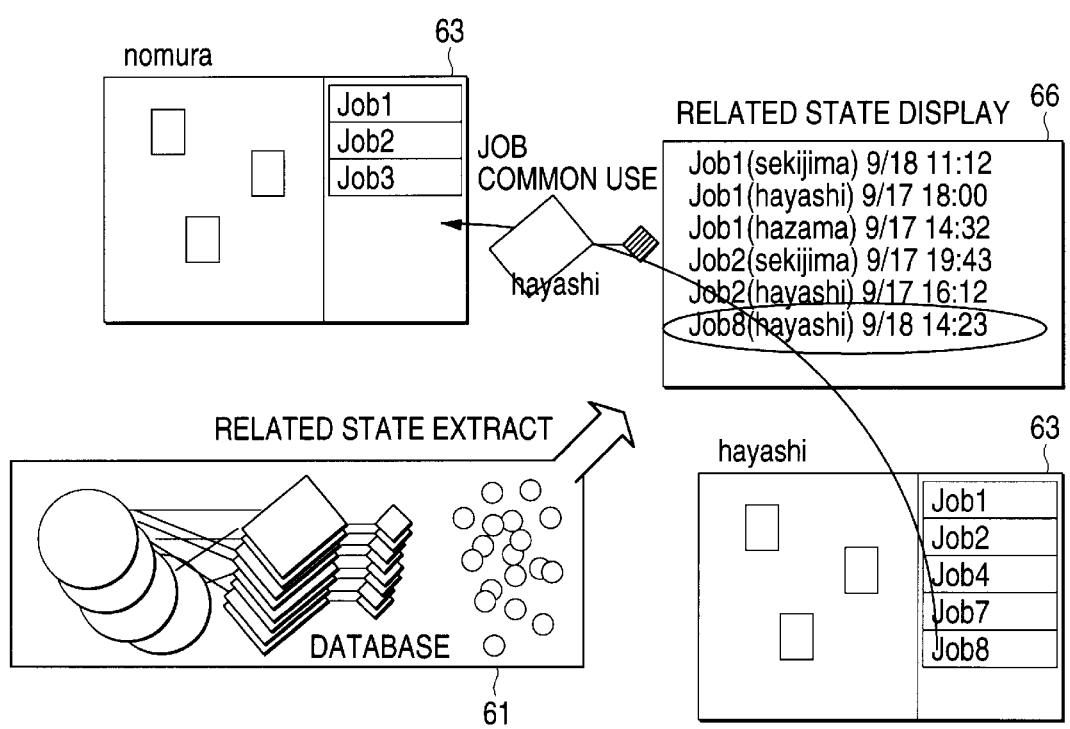
FIG. 52 is an explanatory view of a processing for introducing a related state into a current state.

As an example of this, in FIG. 52, there is shown a case in which, in a state that six Snaps are extracted into the related state hold part 66, a user nomura selects [Job8 (hayashi) 9/18 14:23] out of the six Snaps and presses down a ImportSnap button 91 to thereby try to introduce this Snap into the Place (current state hold part 62) that is opened by the user nomura. If this Snap introduction is executed, then the selected Snap is copied and a Snap indicating a Job8 can be held in the Place opened by the user nomura, thereby realizing the indirect Job sharing with respect to the Place that is opened by another user hayashi. This makes it possible to make use of the above-mentioned related work environment extract function and the like.

Figure 53:
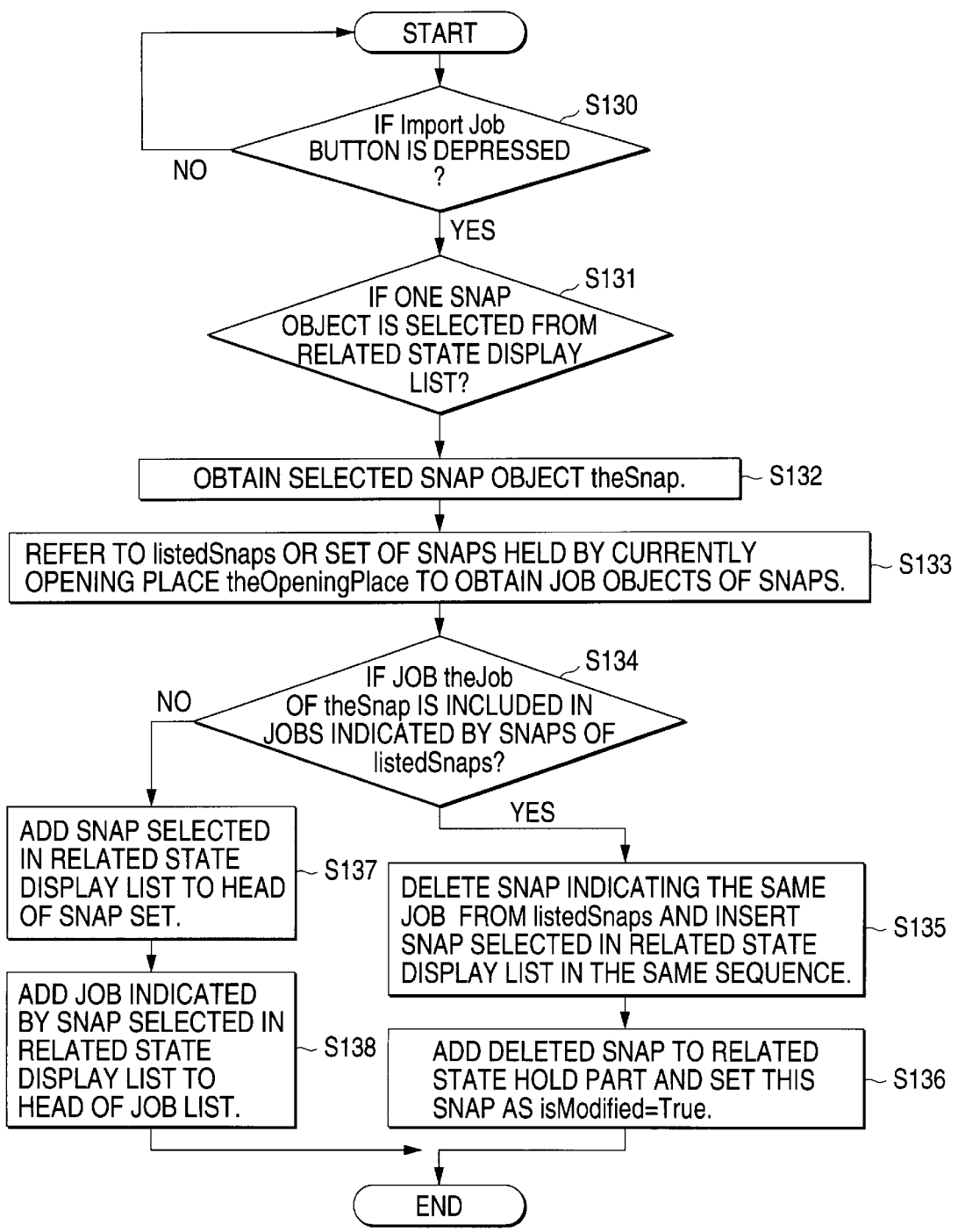
FIG. 53 is a flow chart of a procedure for a processing for sharing a job by means of introduction.

Now, description will be given below in more detail of this introduction processing with reference to a flow chart shown in FIG. 53.

At first, if the ImportJob button 91 is pressed down (Step S130), then it is checked whether one Snap object is selected from the related state display list 101 (Step S131). If it is found not selected, then an instruction given by pressing down this button is ignored. On the other hand, if it is found selected, then the current state introduce part 67 obtains the Snap object (theSnap) that is selected there (Step S132).

After then, the current state introduce part 67 refers to "listedSnaps" which is a set of Snaps held by the currently opening Place (the OpeningPlace) (Step S133) and checks whether a Job object (theJob) indicated by theSnap is included in the Jobs that are indicated by the respective Snaps of listedSnaps (Step S134).

If it is found included, then a Snap indicating the same job is deleted from the listedSnaps of the Place and a Snap selected in the related state display list is inserted into the same sequence of the Place (Step S135). And, the deleted Snap is added to the related state hold part 65 and the id of the present Snap is set for isModified=True (Step S136).

On the other hand, if it is found that theJob is not included, then a Snap selected in the related state display list is added to the head of the Snap set (Step S137) and, further, a job indicated by the Snap selected in the related state display list is added to the head of the job list (Step S138).

Next, description will be given below of a concrete application example according to the above-mentioned third embodiment of the invention. A prototype shown in this example is programmed in the Java language developed by Sun Mircrosystems.

Figure 54:
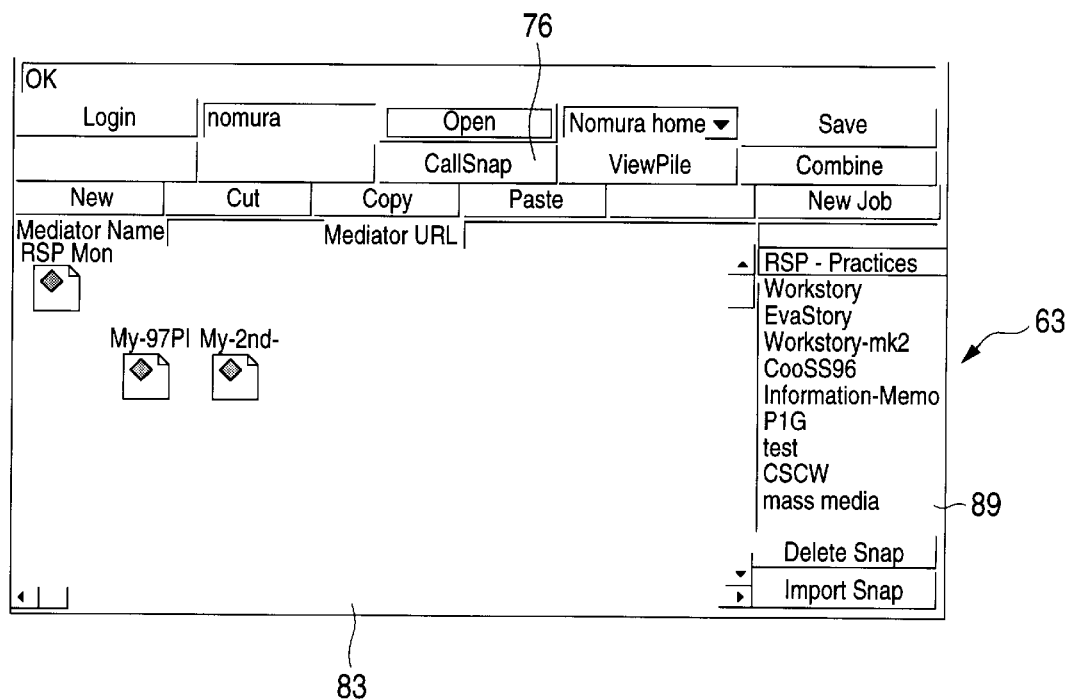
FIG. 54 is a view of an example of a display of a main screen.

Here, let us take an example in which a user nomura and a user hayashi work together. At first, in FIG. 54, there is shown a screen display example in which the user nomura logs in a Place called "Nomura home". In a job list 89, there are displayed ten Jobs, that is, RSP-Practices, Workstory, EvaStory, Workstory-mk2, CooSS96, Information-Memo, PIG, test, CSCW, and mass media. This means that the Place "nomura home" holds the ten Snaps in the current state hold part 62 as the current states and these Snaps respectively indicate Jobs displayed in the job list 89. In FIG. 54, there is selected a Job called RSP-Practices and three Mediators are displayed in the snap view 83.

Figure 55:
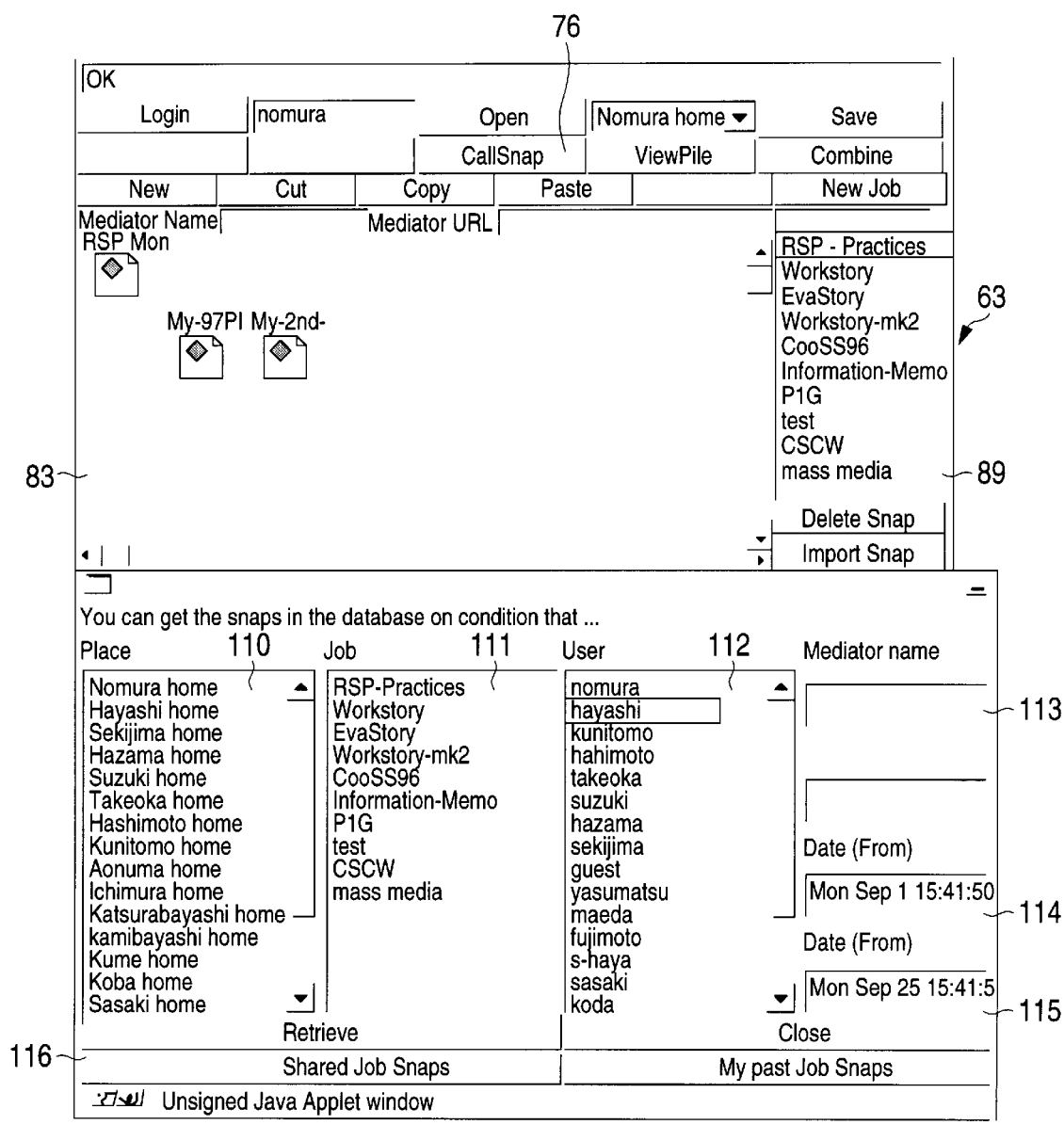
FIG. 55 is a view of an example of a display of a retrieval instruct screen for displaying Snaps already stored.

In this condition, if a CallSnap button is depressed, then there is provided such a screen display as shown in FIG. 55 and a window (see FIG. 44) for giving a retrieval instruction for extraction of the related states is raised and displayed on the same screen. In this window, not only there are displayed the list of all the instructable Places, the list of the Jobs of the currently opening Place, and the list of all the instructable Users, but also there are included a field 113 for instructing the name of a Mediator, and fields 114, 115 for specifying a period between the Date(From) and Date(To). Here, in FIG. 55, a user hayashi gives Snaps that wereto retrieve the Snaps that were created from 9/1, 15:41 to 9/25, 15:41.

Figure 56:
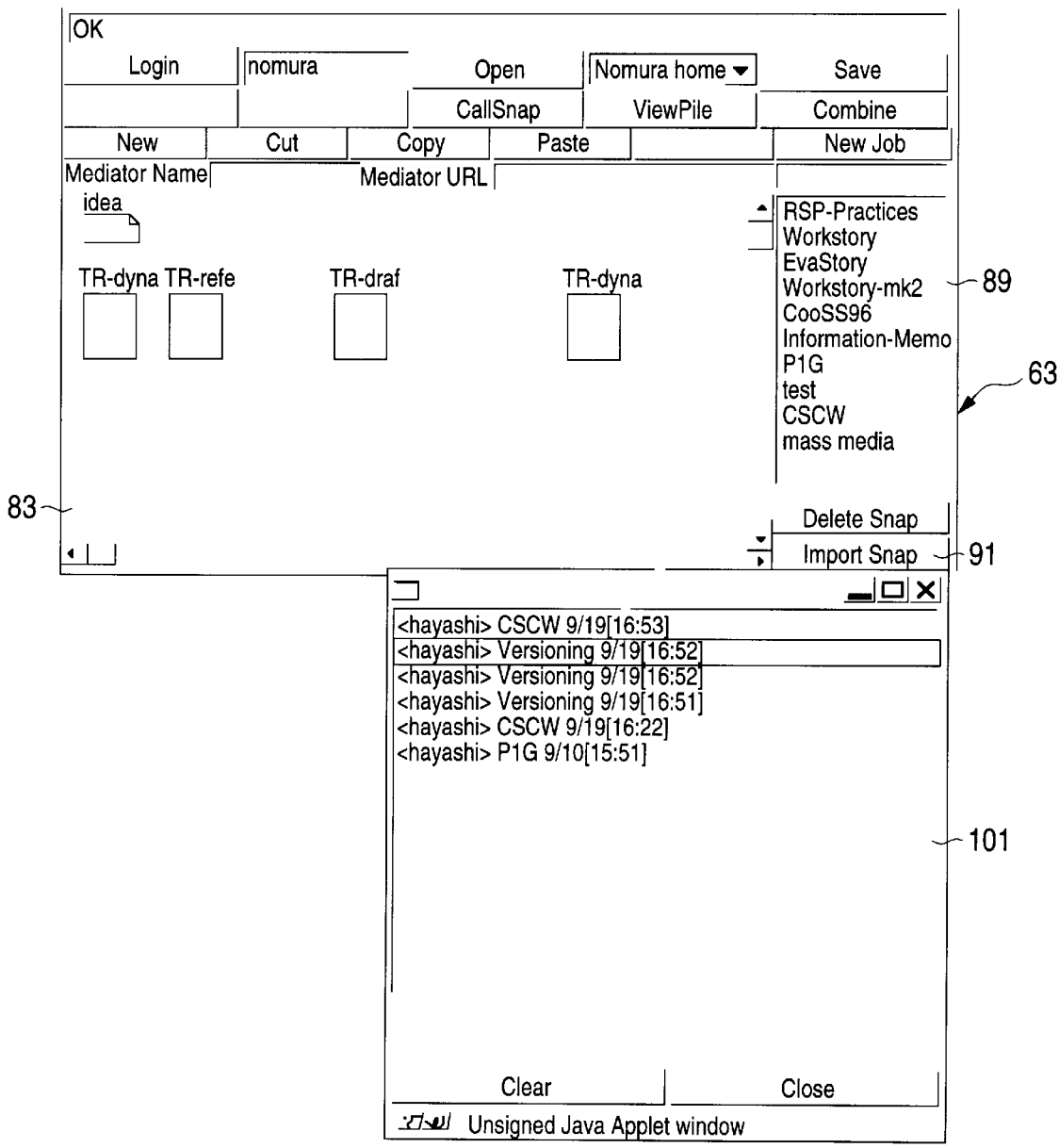
FIG. 56 is a view of an example of a screen display in which one of the retrieve results is specified and Snaps are displayed in snap view.

And, in this state, if a Retrieve button 116 is pressed down, as shown in FIG. 56, the retrieve instruction window (FIG. 55) is closed and a retrieve equation is given to the storage part 61. If the retrieve result is returned, as shown in FIG. 56, a window (see FIG. 43) having a display list of the related states is popped up and displayed on the same screen. In FIG. 56, "<hayashi> Versioning 9/19 [16:52]" is selected from this diplay list and Mediators held by the Snap are displayed in the snap view 83.

Figure 57:
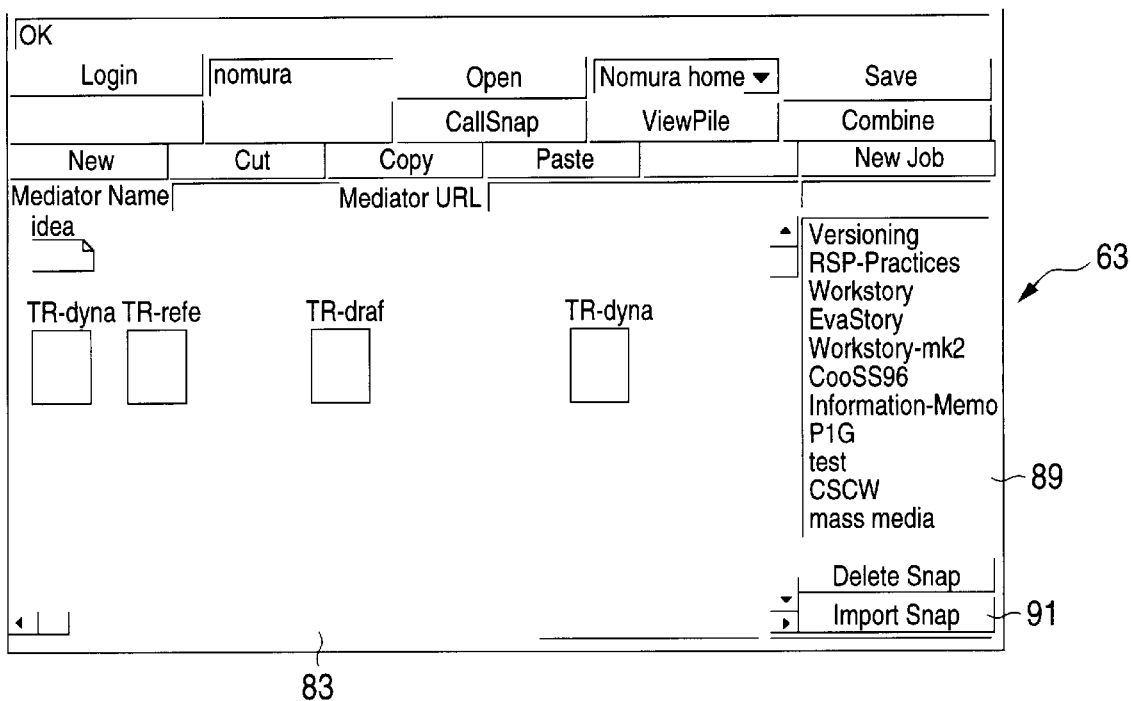
FIG. 57 is a view of an example of a screen display when Snaps are introduced into a current state hold part.

When the users nomura and hayashi are going to start a joint operation with respect to the work "Versioning" the user hayashi is executing, if the ImportSnap button is pressed down, then the Snap that has been selected in the related state display list can be added to the current states, that is, the currently opening Place. A screen display after execution of the Snap addition is shown in FIG. 57. In this manner, the user nomura is able to start the work "Versioning" together with the user hayashi.

After then, by using a What's New function at any time, the user nomura can know what new information the user hayashi has added with respect to the work "Versioning". Further, after the works of the two users have progressed to a certain degree, by using a Gather Job function, that is, by obtaining a sum set of the work environments of the two users through a processing to be performed by a state synthesize part 70, as will be described later, a common work scene can be produced and the final output can be shaped.

Figure 58:
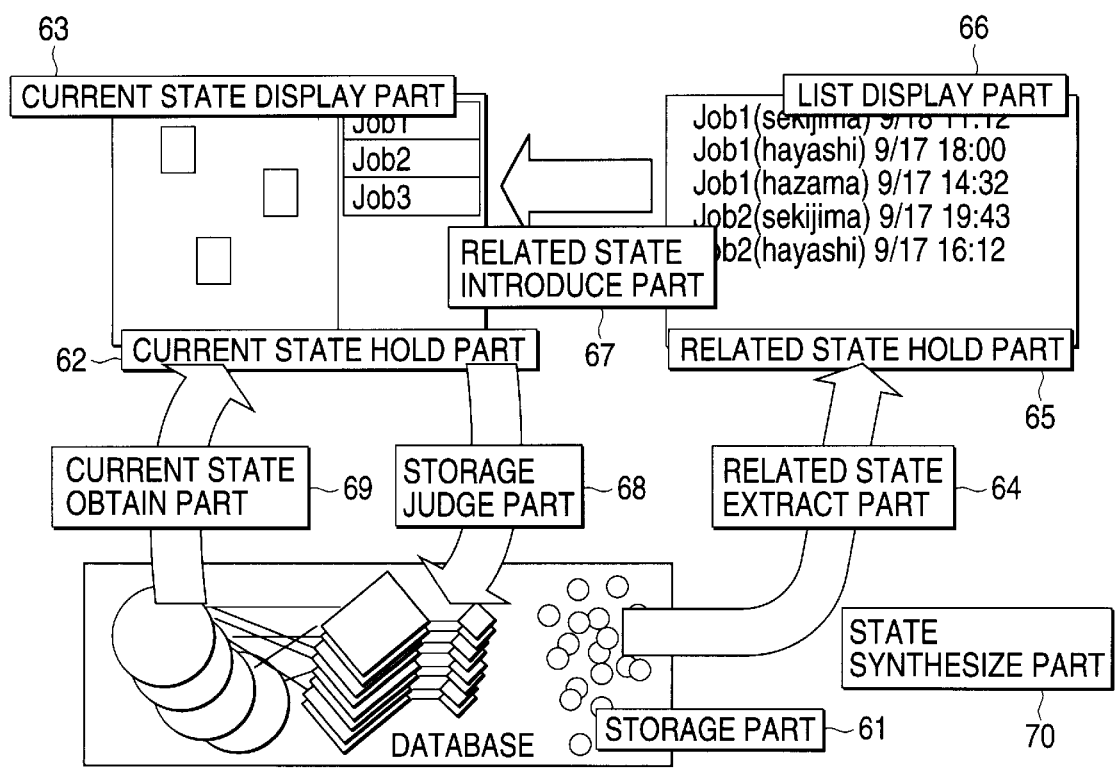
FIG. 58 is a schematic view of the structure of a fourth embodiment of an information processing unit according to the invention.

Now, in FIG. 58, there is shown an information processing unit according to the fourth embodiment of the invention. In the fourth embodiment, the same parts thereof as in the above-mentioned third embodiment are given the same designations and the duplicated description thereof is omitted here.

The information processing unit includes not only the structure of the third embodiment but also a state synthesize part 70 which enforces a set operation on the information units that are included in two or more information unit sets held by the current state hold part 62.

The state synthesize part 70 is function means which performs a processing on a plurality of Snaps held by the current state hold part 62, that is, executes a set operation on the Mediators that are included in these Snaps, and also executes a processing to allow the current state hold part 62 to hold the results of the set operation.

Figure 59:
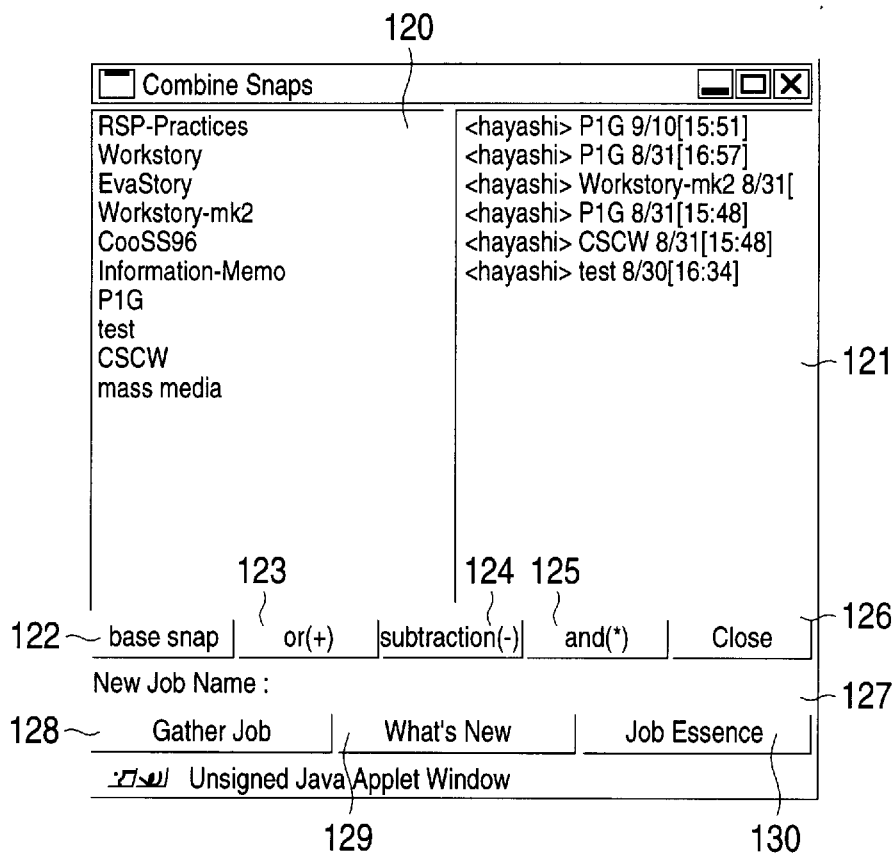
FIG. 59 is a view of an example of a state synthesis instruct screen.

Also, if a Combine button 78 on the display screen (see FIG. 42) is depressed, then the state synthesize part 70 displays such a state synthesis instruct screen window as shown in FIG. 59 and, if a user inputs an instruction to synthesize a plurality of Snaps in the thus displayed window, then the state synthesize part 70 executes a given set operation processing.

In the state synthesis instruct screen window, there are provided a list part for displaying various pieces of information, a field for inputting the various information, and buttons which are respectively used to execute various functions. The functions of these window parts are as follows:

That is, a current state list part 120 is an area for displaying a list of Job names indicated by all the Snaps held by the current state hold part 62, while a related state list part 121 is an area for displaying a list of the attributes (selection information) of all the Snaps held by the related state hold part 65.

A base snap button 122 is a button which, for example, when a difference between two Snaps is operated, is used to instruct one Snap to be held as a base. That is, normally, there is employed a single selection mode and, therefore, if, after one Snap is selected, the other Snap is selected, then the selection state is changed. In view of this, if the button 122 is pressed down after one Snap is selected, then there is executed a function to regard the selected Snap as the base Snap and switch the single selection mode over to a multiple selection allowable mode in the following operations. After having pressed down this button 122, the user is able to turn a plurality of Snaps into selectable states successively. The Snap set as the base Snap is a Snap which provides a minuend when a different between two Snaps is obtained.

Here, when no character array is written in a NewJob-Name field 127, if any one of an or (+) button 123, a subtraction (−) button 124, and an and (*) button 125 is depressed, then a Snap, which is obtained as the result of the set operation by the state synthesize part 70 using the Job name of the base Snap, is inserted into and stored in the current state hold part 62.

The or (+) button 123 is a button which is used to instruct the state synthesis part 70 to execute a sum set operation with respect to Mediator sets indicated by all the Snaps selected in the current state list and in the related state list. Here, in this sum set operation, Mediators having the same content are processed so that they are excluded from the elements of a set except one. In order to judge the same content, in the present embodiment, it is checked whether the names of the Mediators are identical with URL or not. However, the judgment of the Mediators having the same content is not limited to this checking method but, for example, the memos and dates of the Mediators may also be checked for the identity of the Mediators, or the relationships of the Mediators to other objects may also be checked for the identity of the Mediators, or the versions of the reference documents of the Mediators may also be checked for the identity the Mediators.

The subtraction (−) button 124 is a button which is used to instruct a difference operation to find differences when other selected two or more Snaps are subtracted from the base Snap. That is, if the subtraction (−) button 124 is depressed, then the state synthesis part 70 is allowed to execute an operation, substractinSnap=BaseSnap-(Snap1+Snap2+−−−).

The and (*) button 125 is a button which is used to instruct the state synthesis part 70 to execute a common set operation with respect to Mediator sets indicated by all the Snaps selected in the current state list and related state list.

And, a Close button 126 is a button which is used to issue an instruction to close the present state synthesis instruct screen.

The NewJobName field 127 is a field in which, when the set operation result is inserted into and held by the current state hold part 62, the Job of a Snap that is the operation result is provided with the job name of a character array written in the present field 127. When the field 127 is empty, the operation result provides the job name of the baseSnap.

A GatherJob button 128 is a button which is used to call up a job result aggregate function, which will be described later in detail.

A What's New button 129 is a button used to call up a What's New function, which will be described later in detail.

A JobEssence button 130 is a button used to call up a Job Essence function. When a plurality of users are executing a work while sharing a job, the Job Essence function is used to obtain a common set of the newest Snaps of the respective users with respect to the job and to display the common set. This makes it possible to confirm whether necessary information such as a shared mission, reference literatures, the destination of presentation and the like are shared in order or not. Also, a new user, who newly takes part in the job, is able to introduce a scene from the shared information to thereby arrange a work environment in order.

Next, description will be given below of a set operation processing to be performed by an information processing unit according to the present embodiment.

Figure 60:
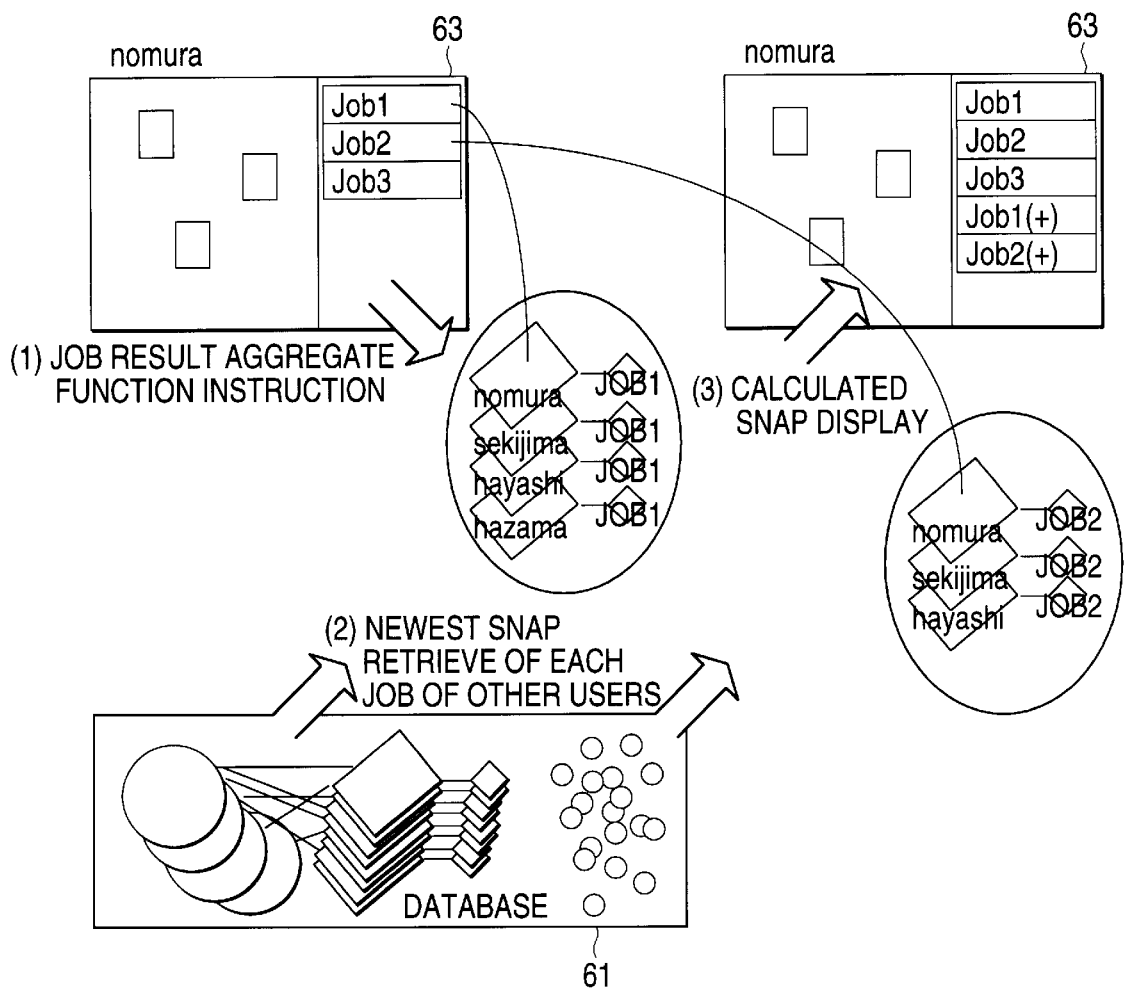
FIG. 60 is an explanatory view of state synthesis for collecting the results of jobs.

At first, a sum set operation (a job result aggregate function) will be described below with reference to a state synthesis example for aggregating the job results, which shown in FIG. 60. In this example, in a scene where a user nomura holds three Jobs, namely, Job1, Job2, and Job3 in the current state, if a job result aggregate instruction is issued, with respect to the three Jobs, namely, Job1, Job2, and Job3, the newest Snaps of the other users are retrieved out from the database 61.

In this example, with respect to Job1, the newest Snaps of three users, sekijima, hayashi and hazama are retrieved, while the newest Snaps of the users, sekijima and hayashi, are retrieved with respect to Job 2. And, a sum set operation is performed on the retrieved Snaps including the Snaps of nomura for each of the three Jobs and the results of the sum set operations are inserted into the current state hold part 62 while they are given job names, for example, Job1 (+), Job2 (+).

Figure 61:
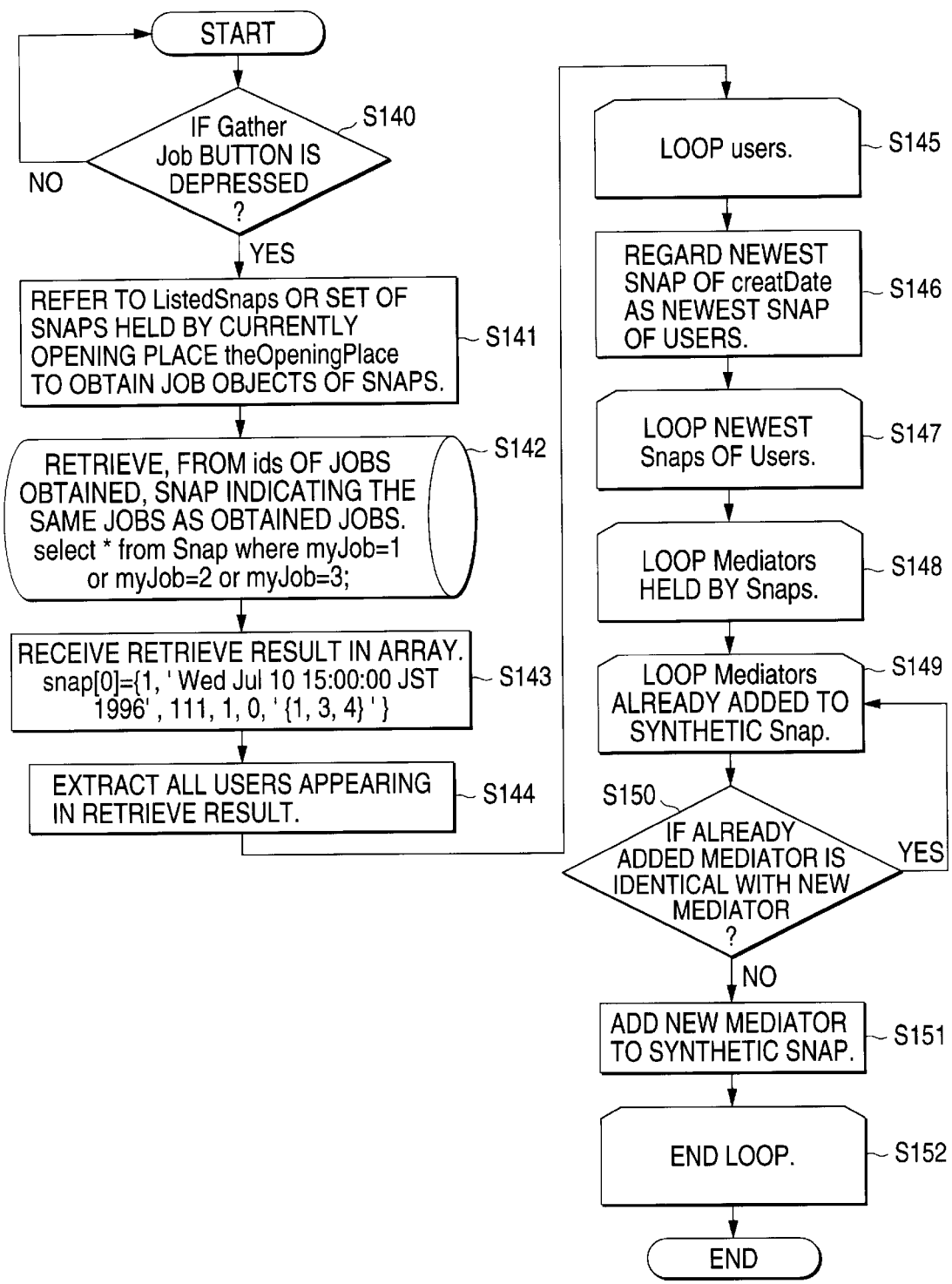
FIG. 61 is a flow chart of a procedure for a processing to be performed by a job result collect function.

This job result aggregate function (sum set operation processing) will be described below in more detail with reference to a flow chart shown in FIG. 61.

At first, if the GatherJob button 128 is depressed (Step S140), then the present information processing unit refers to listedSnaps which is a set of Snaps held by the currently opening Place (theOpeningPlace) to thereby obtain the Job objects of the respective Snaps (Step S141). And, by means of the ids of the respective Jobs obtained, a Snap indicating the same Jobs as the obtained Jobs is retrieved, for example, by use of an SQL statement, that is, select * from Snap where myJob=1 or myJob=2 or myJob=3 (Step S142).

And, the present information processing unit receives the retrieve result in an arrangement such as snap[0]={1, 'Wed Jul 10 15:00:00 JST 1996', 1111, 1, 0, '{1,3,4}'} (Step S143), and extracts all the Users that appear in the retrieve result (Step S144). Then, all the Users are respectively looped (Step S145), and a Snap having the newest createDate is regarded as the newest Snap of each of the Users (Step S146).

Next, all the newest Snaps of the respective users are respectively looped (Step S147) and, further, all the Mediators held by the respective Snaps are respectively looped (Step S148). Among them, all the Mediators already added to the Synthetic Snap are respectively looped (Step S149), it is checked whether the already added Mediator is identical with a new Mediator or not (Step S150) and, if it is found not identical, then the new Mediator is added to the synthetic Snap (Step S151). These processings are executed repeatedly until the Snaps and Mediators to be looped run out (Step S152).

Figure 62:
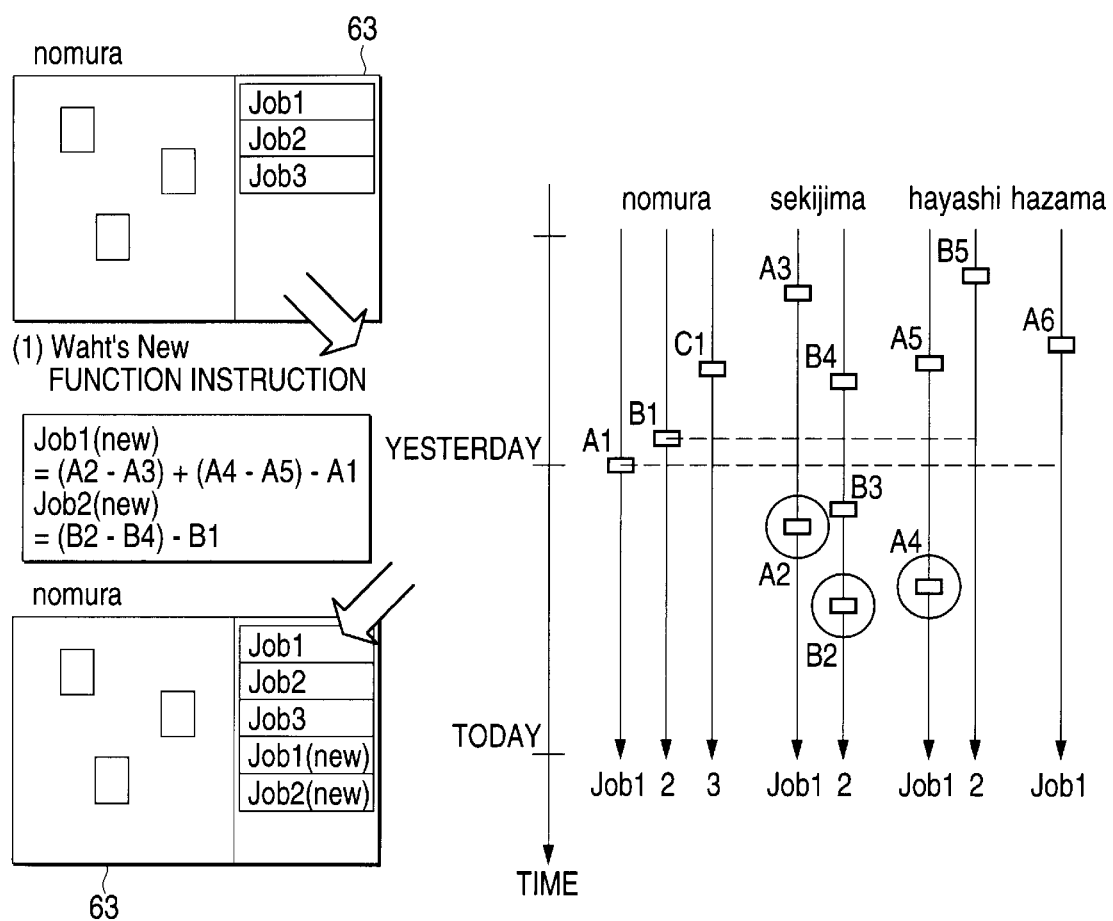
FIG. 62 is an explanatory view of a state synthesis processing in which a user extracts new information related to a job which the present user is executing.

Next, description will be given below of a difference operation processing (What's New function) with reference to a state synthesis example as shown in FIG. 62 for executing an extraction operation (that is, What's New function) to extract new information relating to the Job that is under execution by a user. In this example, for instance, let us assume that in a scene where a user nomura has three Jobs, that is, Job1, Job2 and Job3 in the current state, a What'sNew button 129 is pressed down and a What'New instruction is issued. For reference, in FIG. 62, the Snaps held by the user nomura are shown as A1, B1 and C1.

As a result of issuance of this instruction, with respect to the respective Jobs, that is, Job1, Job2 and Job3, the newest Snaps of other users that are newer than the Snaps of the user nomura are extracted from the database 61. That is, with respect to the Job1, there are extracted A2, B2 of another user sekijima and A4 of another user hayashi which are all newer than A1 of the user nomura.

Here, for example, with respect to Job 1, the information to be extracted by the What's New function is the information that has been created by the other users after the user nomura created A1. Therefore, with respect to A2, B2 of the user sekijima and A4 of the user hayashi extracted as the new Snaps, there is extracted the Snap of the Job of the other user that was created just before the Snap of the user nomura (in FIG. 62, A3, B4, A5) and there is found a difference between them, which makes it possible to know what is the new information that the user nomura has not seen. That is, according to a calculation equation, new information=Σ (new Snap of user X−just previous Snap of user X)−nomura Snap (where, "+" expresses a sum set synthetic operation, "−" expresses a difference synthetic operation, and Σ expresses a sum set of the results that are obtained when the information extraction is executed on all the users to be compared.), the new information for the user nomura can be obtained. Here, in the example shown in FIG. 62, there have been carried out calculations such as Job1 (new)=(A2−A3)+(A4−A5)−A1, Job2 (new)=(B2−B4)−B1, and the like.

Figure 63:
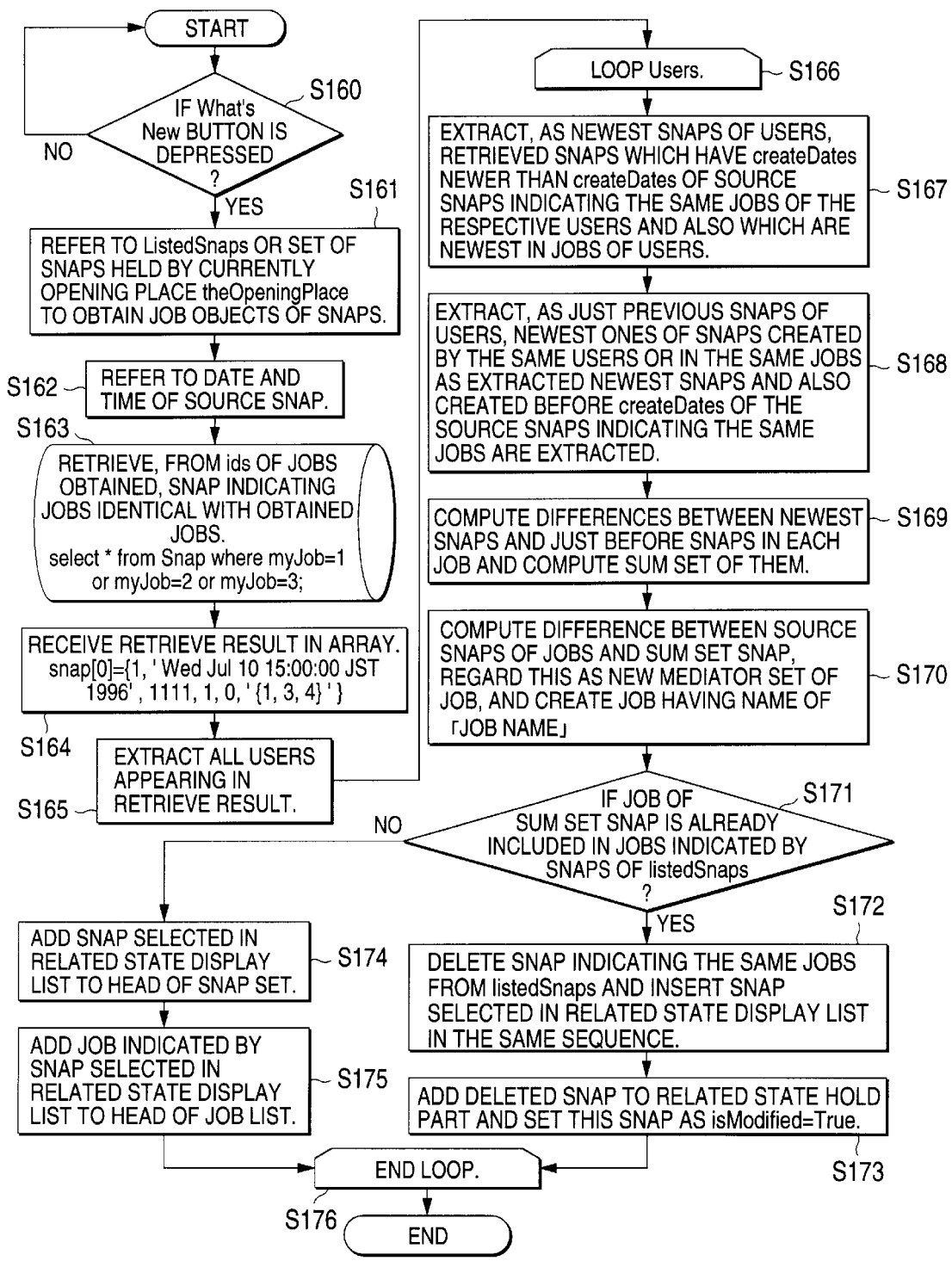
FIG. 63 is a flow chart of a procedure for a processing to be performed by a What's New function.

Now, the above-mentioned What's new function (difference set operation processing) will be described below in more detail with reference to a flow chart shown in FIG. 63.

At first, if a What'sNew button 129 is depressed (Step S160), then litedSnap, which is a set of Snaps held by the currently opening Place (theOpeningPlace) is referred to and some source Snaps are obtained from the Snap set (Step S161), and the dates and times of creation of the source Snaps are obtained (Step S162).

Next, according to the ids of the thus obtained Jobs, the Snap that indicates the same Jobs as the present Jobs is retrieved by means of an SQL statement, for example, select * from Snap where myJob=1 or myJob=2 or myJob=3 (Step S163).

And, the present information processing unit receives the result of this retrieval in a statement arrangement, for example, snap[0]={1, 'Wed Jul 10 15:00:00 JST 1996', 1111, 1, 0, '{1,3,4}'} (Step S164), extracts all the Users that appear in the retrieval result (Step S165), and loops the respective Users individually (Step S166) to thereby extract, as the newest Snaps of the respective users, the retrieved Snaps (in FIG. 62, A2, B2, A4) which have createDates newer than the createDates of the source Snaps indicating the same Jobs of the respective users and also which are the newest in the Jobs of the respective users (Step S167).

After then, the newest ones (in FIG. 62, A3, B4, A5) of Snaps which were created by the same users or in the same jobs as the extracted newest Snaps and also which were created before the createDates of the source Snaps indicating the same Jobs are extracted as the just previous Snaps of the respective users (Step S168).

And, in each of the Jobs, there is found a difference between the newest Snap and the just previous Snap and there is also found a sum set of these differences (Step S169). Also, the sum set Snap is subtracted from the source Snaps of the respective Jobs to thereby find a difference, and, with the difference regarded as the new Mediator set of the present Job, a Job having a name of [job name (new)] is created (Step S170).

Next, it is checked whether the Job (that is, [job name (new)]) is already included in Jobs indicated by the respective Snaps of the listedsnaps or not (Step S171). If it is found included, then a Snap indicating the same Jobs is deleted from the listedSnaps and a Snap selected in the related state display list is inserted in the same sequence (Step S172). Further, the deleted Snap is added to the related state hold part 65 and the present Snap is also stored there as isModified=True. On the other hand, if it is found not included, then a Job indicated by the sum set Snap is added to the head of the Job list (Step S175). The above-mentioned processing is performed repeatedly until the Users to be looped run out (Step S176).

Next, description will be given below of a concrete example according to the above-mentioned fourth embodiment. For reference, a prototype shown here is programmed in a Java language developed by Sun Mircrosystems Inc.

Figure 64:
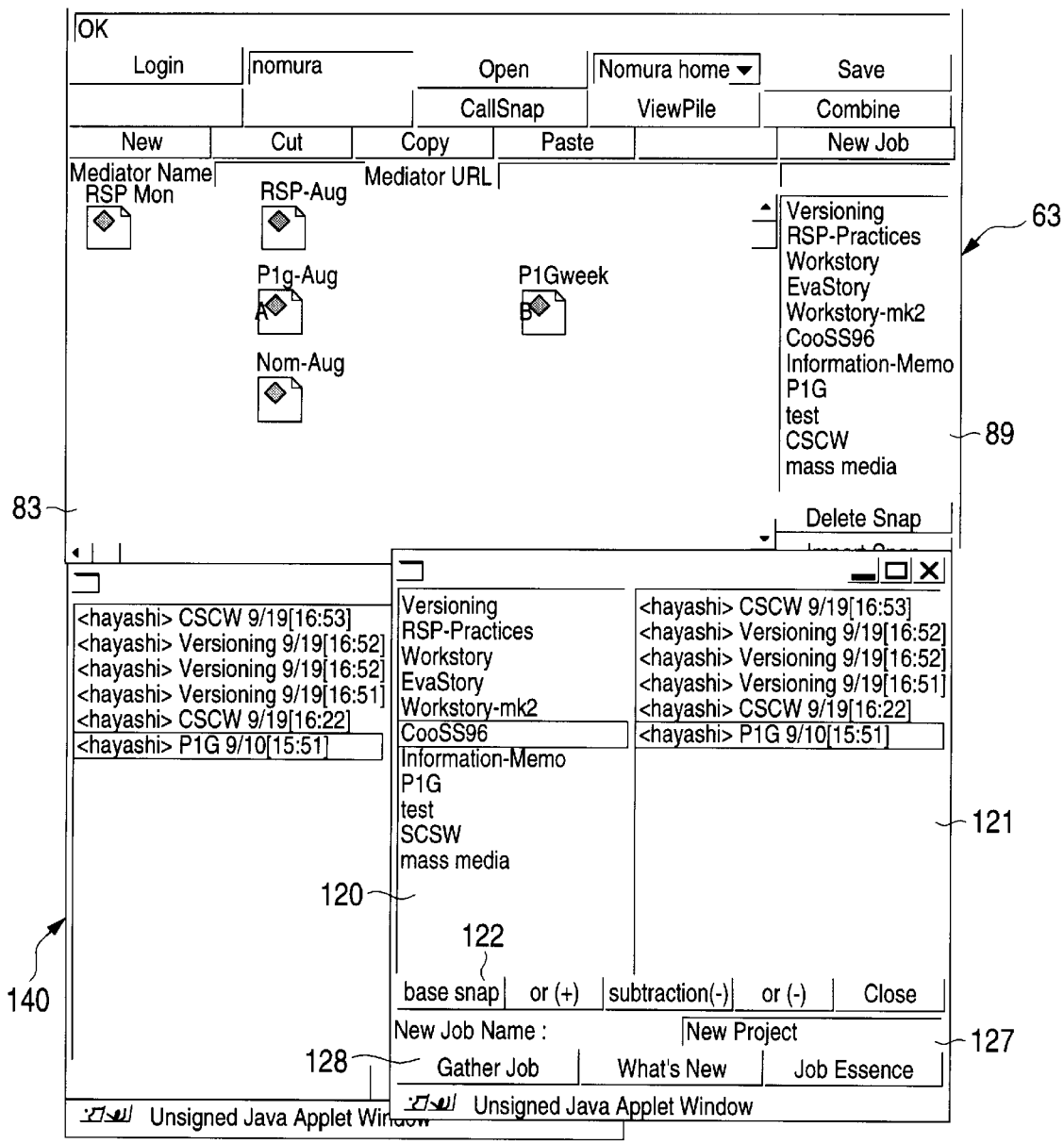
FIG. 64 is a view of a display of a screen for inputting an instruction to synthesize two Snaps.

Here, let us give an example in which a user nomura and a user hayashi are working together jointly. At first, in FIG. 64, the user nomura opens a Place63 called [Nomura home] and, further, a related state display list window 140 and a state synthesis instruct window (see FIG. 59) are opened. By the way, in a snap view 83, there is displayed a statement "<hayashi>PIG 9/10[15:51]" which is selected in the related state display list.

Now, in this state, it is assumed that the user nomura is going to start a new work by combining his or her own current work "CooSS96" with the state of the past scene of the user hayashi "<hayashi>PIG 9/10[15:51]". In this case, at first, "CooSS96" is selected from a list 120 (that is, a current state list) displayed left in the state synthesis instruct window and a base snap button 122 is pressed down, "<hayashi>PIG 9/10[15:51]" is then selected from a list 121 (that is, a related state list) displayed right in the window, "New Project" is further input into a NewJobName field 127, and a GatherJob button 128 is depressed.

Figure 65:
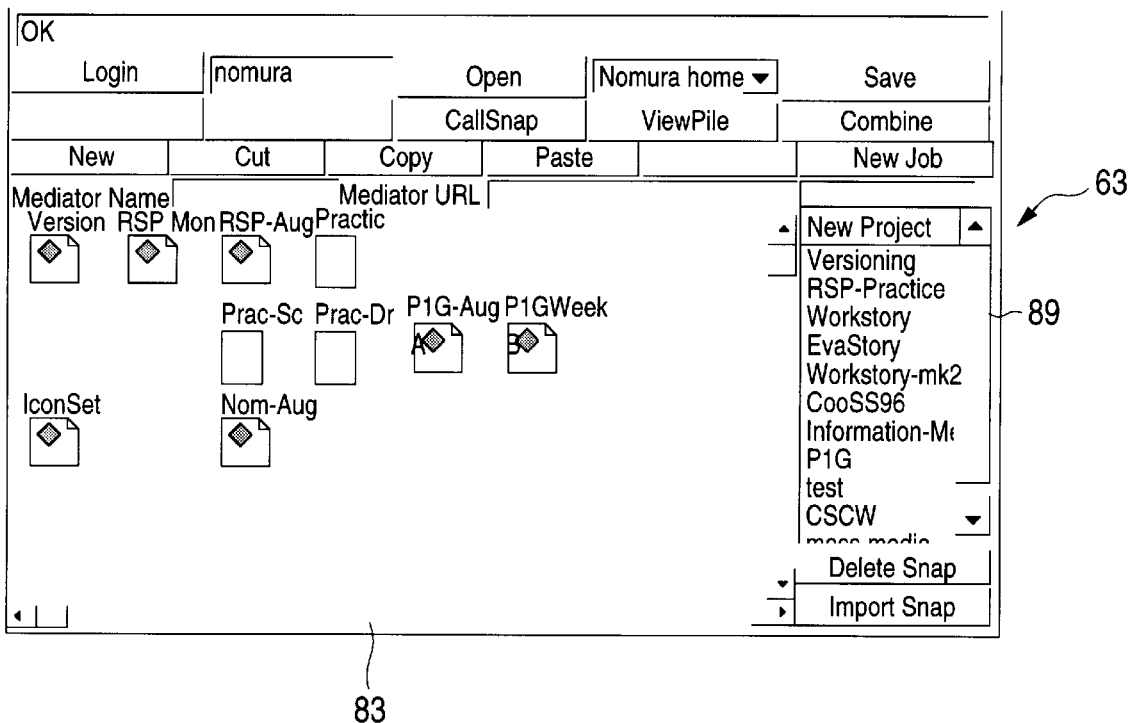
FIG. 65 is a view of a screen on which the result of the synthetic operation of the two Snaps are displayed.

Consequently, there is executed a sum set operation on the Snap indicating the Job [CooSS96] held by the current state and the Snap indicating "<hayashi>PIG 9/10[15:51]" held by the related state. As a result of this, as shown in FIG. 65, a new Job called "New Project" is created and additionally stored into the current state hold part 62, and is also inserted into the current state (that is, the currently opening Place). Also, in the snap view 83, there are displayed all the Mediators that have been held by the two Snaps. However, when the same Mediators are included in the Snap on which a sum set operation is performed, the present Mediators are not copied in a duplicate manner.

As can be clearly understood from the foregoing description, according to the information processing unit of the invention, while information necessary for execution of a certain work can be stored in information unit hold means, the work can be executed using the stored information or the work environment of the work included in the stored information and, at the same time, by specifying the selection information of the necessary information or information unit sets, it is possible to call a desired information unit set from the information unit sets stored in information unit set hold history storage means, switch the state of the scene of the work, and start a different work again at the switching time.

Also, a desired work environment can be obtained even if the work information is previously sorted, and, even after the work progresses, the work environment can be called from various viewpoint such as the name of a work, the date and time of creation, the name of a user, the name of an information unit and the like.

Further, since the states of the works executed in the past are held, a user can return to the state of a past scene of a work and can start the work there. And, by restoring the past state of a work, the user can extract information necessary for a new work from the restored work past state.

And, according to the invention, selection information apply means is used to apply selection information such as the date and time, the name of a user, the name of a work, and the like to each information unit set, such information unit sets are stored in information unit set hold history storage means, and the information unit sets are sorted into and displayed on information unit set hold history sort and display means according to their corresponding pieces of selection information. Thanks to this, the switching of the work environment can be displayed in such a manner that it is easy for a user to understand. Also, two or more pieces of selection information can be given to each of the information unit sets. Due to this, if sorting items in the information unit set hold history sort and display means are changed according to the requirements of a user, then the user can progress a work from various viewpoints.

Further, if two or more states of the scenes of a work under execution are stored, then a user can refer to any one of the states of the scenes of the work or the related information thereof, or can return the current work state to the past state of the work and start a new work at the time of the present past state.

And, since the history of the states of the work scenes is stored, it is possible to extract and reuse the know-how of the works executed in the past, such as, what information is necessary for a certain work, what information is frequently used in a certain work, or what information is peculiar to a certain work. Also, by extracting necessary information from the states of the scenes of works executed in the past, a user is able to build a new work environment.

Further, by synthesizing together some of the states of the past work scenes, a user can also build a new work environment.

In more particular, a user can makes use of the activity histories and results of the user as well as other users from the past down to the present to thereby create an environment necessary for a new work, and then the user can start the new work in the thus created work environment.

Also, even between loosely cooperating members (communities), it is possible to provide a system which allows the members to exchange their mutual knowledge with ease.

Further, referring to information sharing and progress management by a group of users, differently from collaboration in a single work which is conventionally employed, it is possible to provide synthetic collaboration which permits a user to reflect the actions, states, and progresses of the works of the other users on the work of the present user.

Moreover, according to the invention, there is provided a system in which, even if all the jobs except for a job being currently executed are deleted from the current state, they can be restored easily. Thanks to this, the efficiency of the work to be executed by a user can be enhanced greatly.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information processing unit including data objects and application objects for operating the data objects and further including a work space for collecting and creating the data objects using the application objects, said information processing unit comprising:

information unit set hold means for holding a set of information units consisting of said data objects or said application objects;

information unit set hold history storage means capable of storing a plurality of said information unit sets;

storage instruct means for instructing that said information unit sets held by said information unit set hold means should be stored into said information unit set hold history storage means;

selection information apply means for applying selection information to said information unit sets stored into said information unit set hold history storage means by said storage instruct means;

select means for selecting said information unit set to be stored into said information unit set hold means from said information unit sets stored into said information unit set hold history storage means using said selection information applied by said selection information apply means; and read means for reading out said information unit set selected by said select means into said information unit set hold means.

2. An information processing unit as set forth in claim 1, further including information unit edit means for editing information units with respect to said information unit set held by said information unit set hold means, and increased or decreased information unit name storage means for storing the names of said information units added to or deleted from said information unit edit means;

wherein said selection information apply means applies said information unit names stored as said selection information by said increased or decreased information unit name storage means to said information unit set as selection information, and said select means selects said information unit set using said information unit name applied by said selection information apply means.

3. An information processing unit as set forth in claim 1, further including:

information unit specify means for specifying an information unit held by said information unit set hold means;

second select means for selecting one of said information unit sets stored in said information unit set hold history storage means, said selected information unit set serving as the destination of the movement or copy of said information units specified by said information unit specify means;

information unit move means for adding said information unit specified by said information unit specify means to said information unit set selected by said second select means; and movement source information unit set name storage means for storing said information unit set names of the movement source and movement destination of said specified information unit in accordance with the movement of said specified information unit between information unit sets by said information unit move means;

wherein said selection information apply means stores therein, as said selection information, the information unit set name of the movement source stored by said movement source information unit set name storage means, and said select means selects said information unit set using said movement source information unit set name applied by said selection information apply means.

4. An information processing unit as set forth in claim 1, further including:

information unit instruct means for receiving an instruction to perform a processing on said information unit held by said information unit set hold means;

information unit process means for performing a processing on the information unit instructed by said information unit instruct means; and execution information unit name storage means for storing therein the name of the information unit on which said processing was executed by said information unit process means, wherein said selection information apply means applies said information unit name stored as said selection information by said execution information unit name storage means to said information unit set as selection information, and said select means selects said information unit set using said information unit name applied by said selection information apply means.

5. An information processing unit as set forth in claim 4, further including execution command name storage means for storing the name of a command executed on said information unit by said information unit process means;

wherein said selection information apply means applies said command name stored as said information selection by said execution command name storage means to said information unit set as selection information, and said select means selects said information unit set using said command name applied by said selection information apply means.

6. An information processing unit as set forth in claim 1, further including:

selection information sort and display means for sorting and displaying said selection information applied to said information unit set stored by said information unit set hold history storage means;

selection information sort and display format hold means for holding the display format of selection information displayed by said selection information sort and display means; and selection information specify means for specifying said selection information displayed by said selection information sort and display means;

wherein said information unit set hold history storage means stores said selection information in such a manner that said selection information is divided to one or more selection information attributes and said selection information attributes are respectively applied to said information unit sets; said selection information sort and display means a first hierarchy of selection information attribute display area and a second hierarchy of selection information attribute display area, a list of selection information having said selection information attributes is displayed as a first hierarchy in a format decided by said selection information sort and display format hold means in said first hierarchy of selection information attribute display area, a list of selection information having said selection information attributes is displayed as a second hierarchy in a format decided by said selection information sort and display format hold means in said second hierarchy of selection information attribute display area, and in accordance with the fact that said selection information of said first hierarchy is specified by said selection information specify means, only a second hierarch of selection information applied to information unit sets stored in said information unit set hold history storage means including said specified selection information is displayed on said second hierarchy of selection information attribute display area; and, said select means selects one of said information unit sets stored by said information unit set hold history storage means using both of selection information specified in said first hierarchy and selection information specified in said second hierarchy.

7. An information processing unit as set forth in claim 6, further including selection information newest date and time hold means, with respect to all of said selection information applied to said information unit sets stored by said information unit set hold history storage means, for holding the newest dates and times of creation of said information unit sets respectively having their respective pieces of selection information applied thereto, wherein said selection information sort and display means displays said selection information in such a manner that said selection information is re-arranged according to said newest dates and times of creation held by said selection information newest date and time hold means.

8. An information processing unit as set forth in claim 6, further including selection information application date and time hold means, with respect to all of said selection information applied to said information unit sets stored by said information unit set hold history storage means, for holding the dates and times of application of said information unit sets in correspondence to the dates and times of creation of said information unit sets, wherein said selection information sort and display means displays said selection information in such a manner that said selection information is re-arranged according to said dates and times of application held by said selection information application date and time hold means.

9. An information processing unit as set forth in claim 6, wherein said information sort and display means displays said selection information applied to said information unit sets stored by said information unit set hold history storage means, and said select means selects the newest one of said information unit sets having said selection information specified according to said selection information applied to said information unit sets to be read into said information unit set hold means, among said selection information displayed by said information sort and display means.

10. An information processing unit as set forth in claim 6, further including selection information input means which, in accordance with the fact that said storage instruct means instructs the storage of said information unit sets into said information unit set hold history storage means, allows a user to input or specify selection information to be applied to said information unit sets to be stored into said information unit set hold history storage means, wherein said selection information input means accepts the input of the name of a work being executed by said user at the time of the storage of said information unit sets, and said selection information sort and display means sorts and displays said information unit sets according to the display of said work name or according to said work name to be stored into said information unit set hold history storage means.

11. An information processing unit as set forth in claim 6, wherein said selection information sort and display means sorts and displays said information unit sets according to the display of a user name or according to a user name to be stored into said information unit set hold history storage means.

12. An information processing unit as set forth in claim 6, wherein said selection information sort and display means sorts and displays said information unit sets according to the display of said information unit name or according to said information unit name to be stored into said information unit set hold history storage means.

13. An information processing unit as set forth in claim 1, further including third select means for selecting two or more of said information unit sets held by said information unit set hold means or by said information unit set hold history storage means, and information unit set synthesize means for executing a set operation on said information units held by two or more information unit sets selected by said third select means;

wherein a new information unit set created by said set operation is read into said information unit set hold means to thereby make the same said information unit set held by said information unit set hold means.

14. An information processing unit as set forth in claim 13, further including:

fourth select means for selecting said information unit sets held by said information unit set hold means or by said information unit set hold history storage means;

confinement condition specify means, with respect to the set of information units held by information unit sets selected by said fourth select means, for specifying a condition to confine said information units; and confinement execute means for deleting the information unit set that does not satisfy said confinement condition specified by said confinement condition specify means from said information unit sets selected by said fourth select means, wherein said information unit confinement processing is performed on said information unit sets to thereby create a new information unit set, and said new information unit set is read into said information unit set hold means to thereby make the same said information unit set held by said information unit set hold means.

15. An information processing unit as set forth in claim 1, further including storage execution judge means, in accordance with the occurrence of an event due to an instruction from a user or from a command, for judging based on a previously set rule whether information unit sets are to be stored into said information unit set hold history storage means or not;

wherein said information unit edit means, in accordance with the judgment by said storage execution judge means, stores said information unit set held by said information unit set hold means into said information unit set hold history storage means.

16. An information processing unit as set forth in claim 15, wherein said storage execution judge means executes said judgment in accordance with the occurrence of an event to read said information unit set stored by said information unit set hold history storage means into said information unit set hold means, and said information unit edit means, at the time of occurrence of said event, stores said information unit set held by said information unit set hold means into said information unit set hold history storage means.

17. An information processing unit as set forth in claim 15, further including change declare means for receiving from a user a declaration of change of the kind of a work, wherein said storage execution judge means executes said judgment in accordance with the occurrence of a declaration event from said change declare means, and said information unit edit means, at the time of occurrence of said event, stores said information unit set held by said information unit set hold means into said information unit set hold history storage means.

18. An information processing unit as set forth in claim 15, further including user manage means for distinguishing users uniquely, wherein said storage execution judge means executes said judgment in accordance with the occurrence of an event in which the change of users is distinguished, and said information unit edit means, at the time of occurrence of said event, stores said information unit set held by said information unit set hold means into said information unit set hold history storage means.

19. An information processing unit as set forth in claim 15, further including information unit change detect means for detecting addition or deletion or attribute change of the information unit of said information unit set held by said information unit set hold means, wherein said storage execution judge means executes said judgment in accordance with the occurrence of an event in which said change is detected by said information unit change detect means, and said information unit edit means, at the time of occurrence of said event, stores said information unit set held by said information unit set hold means into said information unit set hold history storage means.

20. An information processing unit as set forth in claim 15, further including information unit display detect means for detecting the display of the contents of information units to be processed, wherein said storage execution judge means executes said judgment in accordance with the occurrence of an event in which said display is detected by said information unit display detect means, and said information unit edit means, at the time of occurrence of said event, stores said information unit set held by said information unit set hold means into said information unit set hold history storage means.

21. An information processing unit as set forth in claim 15, further including storage execution cycle hold means for holding a cycle for storing information unit sets into said information unit set hold history storage means, wherein said storage execution judge means executes said judgment in accordance with the occurrence of an event at every cycle, and said information unit edit means, at the time of occurrence of said event, stores said information unit set held by said information unit set hold means into said information unit set hold history storage means.

22. An information processing unit as set forth in claim 15, further including storage execution rule hold means for holding a rule based on the number of times a command is executed, and command storage means for storing one or more commands executed, wherein said storage execution judge means executes said judgment in accordance with an event in which a preset command is coincident with the sequence of a rule held by storage execution rule hold means, and said information unit edit means, at the time of occurrence of said event, stores said information unit set held by said information unit set hold means into said information unit set hold history storage means.

23. An information processing unit as set forth in claim 15, further including information unit movement detect means for detecting that information units have moved from said information unit set hold means into said information unit set hold history storage means by said information unit move means, wherein said storage execution judge means executes said judgment in accordance with the occurrence of an event in which said information unit movement detect means detects said movement of said information units, and said information unit edit means, at the time of occurrence of said event, stores said information unit set held by said information unit set hold means into said information unit set hold history storage means.

24. An information processing unit as set forth in claim 1, wherein said information unit set hold means includes current state hold means for holding a plurality of information unit sets to be displayed together with selection information used as the attributes thereof, and current state display means for outputting and displaying information unit sets which are included in said information unit sets held by said information unit set hold means and correspond to selection information input from a user, and also wherein said storage instruct means includes storage judge means, when the number of information units included in information unit sets is changed, for judging according to a preset rule whether the information unit set just before said change is to be stored or not, and storage means for allowing the information unit sets judged to be stored by said storage judge means to be stored into said information unit set hold history storage means.

25. An information processing unit as set forth in claim 24, wherein said current state display means outputs and displays information for identifying all the information unit sets held by said current state hold means.

26. An information processing unit as set forth in claim 24, wherein said information unit set hold history storage means further includes current state obtain means which stores a plurality of places each consisting a further aggregated set of a plurality of information unit sets, and also which allows a place selected by a user from said places to be held by said information unit set hold means.

27. An information processing unit as set forth in claim 24, wherein said information unit set hold history storage means further includes current state obtain means which stores a plurality of places each consisting a further aggregated set of a plurality of information unit sets, and also which, based on a preset condition, allows one of said places to be held by said information unit set hold means.

28. An information processing unit as set forth in claim 24, wherein said storage judge means judges said storage when the number of information units in said information unit sets is changed from increase to decrease.

29. An information processing unit as set forth in claim 24, wherein said select means includes related state extract means for extracting information unit sets corresponding to a preset extraction rule about said selection information from said information unit sets held by said information unit set hold history storage means, related state hold means for holding said extracted information unit sets, list display means for displaying the selection information of said extracted information unit sets to a user, and related information specify means for specifying information unit sets corresponding to the requirements of the user for said displayed selection information from said information unit sets held by said related state hold means, and also wherein said read means includes related state introduce means for reading out information unit sets specified by said related information specify means from said related state hold means and allows the same to be held by said current state hold means.

30. An information processing unit as set forth in claim 29, wherein said current state hold means includes a work name as said selection information, said related state introduce means copies said information unit sets specified from said information unit sets held by said related state hold means and the work names thereof and allows the same to be held by said current state hold means, and said related state extract means extracts one or more related information unit sets respectively including the same work names as the work names of said information unit sets held by said current state hold means.

31. An information processing unit as set forth in claim 30, wherein said related state extract means extracts, for each user, the newest one of the information unit sets created by other users and having the same work name as the selection information or work name of said information unit sets held by said current state hold means.

32. An information processing unit as set forth in claim 30, wherein said related state extract means extracts, for each work name or selection information thereof, the newest one of all the information unit sets created by a user himself or herself from said information unit set hold history storage means.

33. An information processing unit as set forth in claim 24, further including state synthesize means for executing a preset set operation on the elements or information units of two or more information unit sets held by said current state hold means, wherein said state synthesize means adds an information unit set synthesized by execution of said set operation to said current state hold means to be held thereby.

34. An information processing unit as set forth in claim 33, wherein said set operation of said state synthesize means, according to the selection information or work name of said information unit sets held by said current state hold means, extracts, for each user, the newest one of information unit sets created by other users and having the same work name as the work name of said information unit sets held by said current state hold means from said information unit set hold history storage means, and finds a sum set of information units included in said information unit sets having said same work name.

35. An information processing unit as set forth in claim 33, wherein said set operation of said state synthesize means, according to the selection information or one work name of said information unit sets held by said current state hold means, extracts a first information unit set not only newer than information unit sets held by said current state hold means and having the same work name among information unit sets created by other users and having the same name as said one work name but also newest in the information unit sets of the present user, extracts a second information unit set not only belonging to information unit sets having the work name of the present user but also newest in information unit sets created before information unit sets held by said current state hold means, subtracts information units held by said second information unit set from information units held by said first information unit set to find a difference, thereby extracting a third information unit set, subtracts the information units held by said first information unit set from information units held by said third information unit set to find a difference, thereby extracting a fourth information unit set, and adds said fourth information unit set to said current state hold part so that said fourth information unit set can be held by said current state hold part.

36. An information processing unit as set forth in claim 33, wherein said set operation of said state synthesize means, according to the selection information or one work name of said information unit sets held by said current state hold means, extracts a first information unit set not only newer than information unit sets held by said current state hold means and having the same work name among information unit sets created by other users and having the same name as said one work name but also newest in the information unit sets of the present user, extracts a second information unit set not only belonging to information unit sets having the work name of the present user but also newest in information unit sets created before information unit sets held by said current state hold means, subtracts information units held by said second information unit set from information units held by said first information unit set for each of two or more other users to find a difference, thereby extracting a third information unit set for each of two or more other users, finds a sum set of all of said third information unit sets to thereby extract a fifth information unit set, subtracts the information units held by said first information unit set from information units held by said fifth information unit set to find a difference, thereby extracting a fourth information unit set, and adds said fourth information unit set to said current state hold part so that said fourth information unit set can be held by said current state hold part.

37. An information processing unit as set forth in claim 33, wherein said set operation of said state synthesize means extracts, for each of users, the newest one of information unit sets created by other users and having the same work name as the work name specified by the selection information of the information unit sets held by said current state hold means, and finds a comment set of information units held by the information unit sets that have the same work name.

* * * * *